US011750617B2

(12) United States Patent
Boland

(10) Patent No.: US 11,750,617 B2
(45) Date of Patent: Sep. 5, 2023

(54) IDENTITY AUTHENTICATION AND INFORMATION EXCHANGE SYSTEM AND METHOD

(71) Applicant: Michael J. Boland, Drexel Hill, PA (US)

(72) Inventor: Michael J. Boland, Drexel Hill, PA (US)

(73) Assignee: MICHAEL J. BOLAND, INC., Drexel Hill, PA (US)

( * ) Notice: Subject to any disclaimer, the term of this patent is extended or adjusted under 35 U.S.C. 154(b) by 252 days.

(21) Appl. No.: 17/349,994

(22) Filed: Jun. 17, 2021

(65) Prior Publication Data

US 2022/0060478 A1  Feb. 24, 2022

Related U.S. Application Data

(63) Continuation of application No. 16/167,572, filed on Oct. 23, 2018, now Pat. No. 11,063,952, which is a (Continued)

(51) Int. Cl.
*H04L 9/40* (2022.01)
*H04L 9/32* (2006.01)
(Continued)

(52) U.S. Cl.
CPC .......... *H04L 63/102* (2013.01); *G06F 16/252* (2019.01); *G06F 21/31* (2013.01); (Continued)

(58) Field of Classification Search
CPC .................................................... H04L 63/102
See application file for complete search history.

(56) References Cited

U.S. PATENT DOCUMENTS 7,162,649 B1 * 1/2007 Ide .................. H04L 63/102
709/227
7,945,511 B2  5/2011 O Brien et al.
(Continued)

OTHER PUBLICATIONS

European Patent Office, Supplementary European Search Report (dated Sep. 30, 2019) for corresponding European Patent Application No. 17796850.0.
US Patent Office (ISA), International Search Report and Written Opinion (dated Sep. 13, 2017) issued in corresponding International Application No. PCT/US2017/032184.

*Primary Examiner* — Simon P Kanaan
(74) *Attorney, Agent, or Firm* — Duane Morris LLP

(57) ABSTRACT

An apparatus for use in an identity management system includes a storage device; a network interface; and a processor, the storage device storing software instructions for controlling the processor to: process a request, received via a network interface, for an exclusive claim to a unique identifier associated with an individual; verify the individual's claim to the unique identifier is proper; if the individual's claim is verified, create a user account, wherein the user account is associated with the respective individual's claimed unique identifier; provide a look up service for responding to external queries regarding whether individual unique identifiers of the type claimed by the individual have been claimed; and provide proof of the identity of the individual based on the individual's exclusive claim to the claimed unique identifier in response to a request to provide said proof if authorized by the individual through the user account.

10 Claims, 32 Drawing Sheets

Related U.S. Application Data continuation-in-part of application No. PCT/US2017/032184, filed on May 11, 2017.

(60) Provisional application No. 62/335,249, filed on May 12, 2016.

(51) Int. Cl.
  *G06Q 20/40* (2012.01)
  *G06F 21/31* (2013.01)
  *G06F 16/25* (2019.01)
  *G06F 21/62* (2013.01)

(52) U.S. Cl.
  CPC ......... *G06F 21/6245* (2013.01); *G06Q 20/40* (2013.01); *G06Q 20/4014* (2013.01); *H04L 9/321* (2013.01); *H04L 9/3218* (2013.01); *H04L 9/3226* (2013.01); *H04L 9/3247* (2013.01); *H04L 9/3297* (2013.01); *H04L 63/123* (2013.01)

(56) References Cited

U.S. PATENT DOCUMENTS

| | | | |
|---|---|---|---|
| 11,012,436 B2 * | 5/2021 | Hamel | H04L 63/06 |
| 2003/0229783 A1 | 12/2003 | Hardt | |
| 2006/0101508 A1 | 5/2006 | Taylor | |
| 2006/0161435 A1 | 7/2006 | Atef et al. | |
| 2007/0250920 A1 | 10/2007 | Lindsay | |
| 2009/0222897 A1 | 9/2009 | Carow et al. | |
| 2011/0119744 A1 | 5/2011 | Cho et al. | |
| 2012/0265684 A1 | 10/2012 | Singh | |
| 2013/0227286 A1 | 8/2013 | Brisson | |
| 2014/0230051 A1 | 8/2014 | Vallinayagam et al. | |
| 2015/0026474 A1 | 1/2015 | Irvine | |
| 2015/0220917 A1 | 8/2015 | Aabye et al. | |
| 2016/0125412 A1 | 5/2016 | Cannon | |
| 2019/0311145 A1 | 10/2019 | Baskaran | |
| 2019/0362086 A1 * | 11/2019 | Van | H04L 63/104 |
| 2022/0060478 A1 * | 2/2022 | Boland | H04L 63/102 |

* cited by examiner

Generate Targeted Data Disclosure Token

Recipient Identifier Type: Subscriber ID
Recipient Identifier: 1-$TROPICANA  select — 906
☑ One-Time Use Sender Identifier Type: General Data Sender ID — 903
Sender Identifier: 6296835024 — 904
Optional PIN: — 907
Expiration Date: / / — 908

Disclose / Verify:
☐☐ Name
☐☐ Age
☐☐ Date of Birth
☐☐ Gender
☐☐ Driver License No
☐☐ Me-To-Recipient ID
☐☐ Proxy NID
☐☐ Full SS No
☐☐ Partial SS No Disclose:
☐ ID Picture
☐ Email Address
☐ Postal Code
☐ Full Address
☐ Phone (Home)
☐ Phone (Cell)
☐ Phone (Work)

Additional Data Items — 905

Submit   Cancel 900
901
902

FIG. 9

Generate Time-STamped Signature

Signature Target (optional): — 1004

Target Country:
[1 - United States of America ∨]  ← 1001

Target ID Type: — 1005    Target ID — 1006
[ ∨ ]    [        Select ]

ID-Related Data Items to Link:  ← 1002

☐ Gender    ☐ Me-To-Recipient ID    Link Additional Data Items
☐ Age       ☐ Proxy NID
☐ Date of Birth  ☐ Full Social Security #   Last [0] Digits of SS#

◉ Restrict Disclosure to Target
○ Disclose to any User                ← 1008
○ Open Disclosure Other Options:  ← 1003

Link My Document #: [    Select    ]

☑ Position Name on Separate Line
☑ Short Time Stamp Format (YYMD:HsssZ)
☑ Restrict Verification to Registered Users  ← 1007
☐ Include Image of Handwritten Signature
☐ Include Me-To-Recipient ID with Name
☐ Include Me-To-Recipient ID instead if Name Dates Signature in Force:  Start Date: [  /  / ∨]   End Date [  /  / ∨]

Included Memo: [                    ]

Linked Memo: [                    ]

[ Submit ]   [ Cancel ]

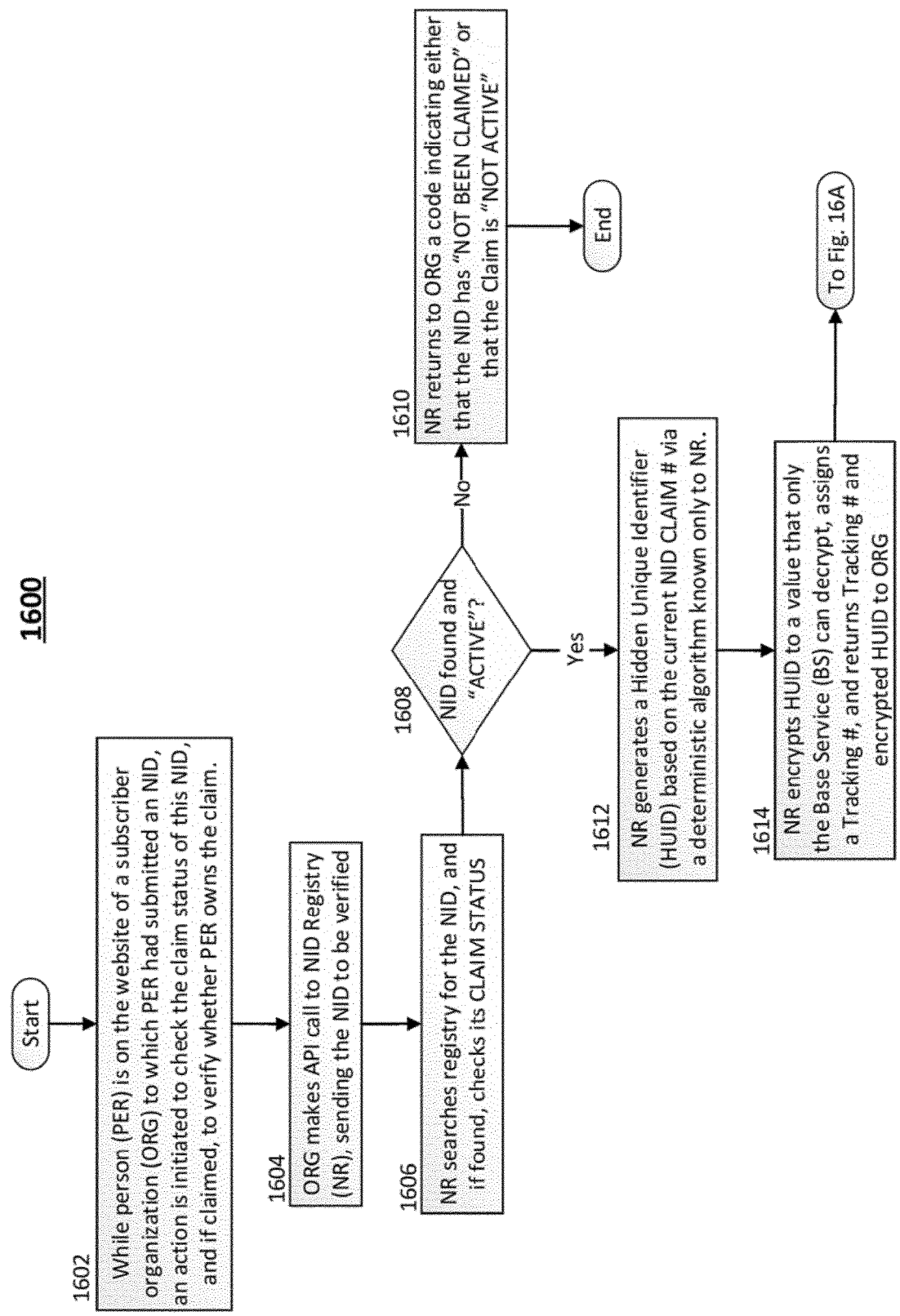

IDENTITY AUTHENTICATION AND INFORMATION EXCHANGE SYSTEM AND METHOD

CROSS-REFERENCE TO RELATED APPLICATION

This application is a continuation of U.S. patent application Ser. No. 16/167,572 filed Oct. 23, 2018, which is a continuation-in-part of PCT Patent Application No. PCT/US2017/032184 filed May 11, 2017, which claims priority to U.S. Provisional Patent Application Ser. No. 62/335,249 filed May 12, 2016, the entirety of each of which is incorporated herein by reference.

FIELD

The present disclosure generally relates to the technical field of personal information management. More specifically, the present disclosure is directed to systems and methods for identity security, identity verification, and personal information disclosure and transmission.

DESCRIPTION OF THE RELATED ART

Despite numerous services designed to provide a solution to identity fraud, it still remains a huge problem, even among those who subscribe to such services. The potential for identity fraud increases significantly for (but is not limited only to) those that regularly use online services. One of the critical reasons identity fraud remains a problem is that security solutions focus on reactive measures as opposed to proactive measures. Specifically, security services focus primarily on detecting identify fraud, instead of actively preventing it. Common to such services is the automated tracking of personal transactions and automated triggering of alerts when suspicious activity is detected. This type of service may well reduce the impact of identity fraud, but it does little to prevent it from happening in the first place.

The use of biometrics has been offered as a more proactive solution to identity fraud and theft, but this too is not without its problems and limitations. Biometrics often require significant intrusive gathering of personal identity information in the form fingerprints, palm veins, facial recognition, DNA, palm prints, and/or iris detection. This level of personal identity information is inconvenient and impersonal to the average user. Furthermore, biometrics are costly and not easily implemented on various computer systems. Finally, many users are unable to gain access to the reading devices associated with biometrics. Additionally, biometrics require routine maintenance to function properly. Thus, use of biometrics is cost prohibitive and requires a high level of social acceptability that prevents effective use in preventing identity fraud for the average user.

Current identity fraud and theft solutions do not meet the need of providing a universally effective and truly proactive approach to identity security. In addition, current identity security systems fail to provide an easily accessible, simple to use, non-intrusive, affordable solution that is not dependent on biometrics or other overly intrusive measures. Consumers have been seeking innovative practical solutions that current identity security systems fail to provide. Public trust in identity management systems starts by incorporating proactive initiatives aimed at improving identity authentication and providing secure disclosure of personal information. Without public trust, identity management systems will fail to solve the persistent and growing problem of identity fraud and theft.

SUMMARY OF THE INVENTION

In embodiments, an apparatus for use in an identity management system includes a storage device; a network interface; a processor coupled to the storage device and communicably coupled to the network interface, the storage device storing software instructions for controlling the processor that when executed by the processor configure the processor to: process a request, received via a network interface, for an exclusive claim to a unique identifier associated with an individual; verify the individual's claim to the unique identifier is proper; if the individual's claim is verified, create a user account, wherein the user account is associated with the respective individual's claimed unique identifier; provide a look up service for responding to external queries regarding whether individual unique identifiers of the type claimed by the individual have been claimed; and provide proof of the identity of the individual based on the individual's exclusive claim to the claimed unique identifier in response to a request to provide said proof if authorized by the individual through the user account.

In embodiments, an apparatus for use in an identity management system, includes a storage device; a network interface; a processor coupled to the storage device and communicably coupled to the network interface, the storage device storing software instructions for controlling the processor that when executed by the processor configure the processor to: maintain a user account database comprising a plurality of user accounts, wherein a respective user account is associated with a respective individual national identification that has been claimed and comprises a respective individual's personal data for conditional distribution subject to authorization by the respective individual; maintain an institutional subscriber account database comprising a plurality of subscriber accounts; process an information request received from a subscriber account, wherein processing the information request includes: receiving parameters for an information request; assigning the information request a request ID; receiving the request ID from a user who is logged into a user account; presenting the user with the information request; receiving responsive information from the user to the information request; and storing the responsive information for provision to the institutional subscriber associated with the subscriber account. The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

Various aspects of the present disclosure will be or become apparent to one with skill in the art by reference to the following detailed description when considered in connection with the accompanying exemplary non-limiting embodiments, in which:

FIG. 9 is an example of a user interface for generating a targeted data disclosure token in accordance with some embodiments of the present disclosure.

FIG. 10 is an example of a user interface for generating a time-stamped signature in accordance with some embodiments of the present disclosure.

FIGS. 16 and 16A depict a flow diagram illustrating a method for a subscriber organization to acquire a real-time online verification of a submitted NID in accordance with some embodiments of the present disclosure.

DETAILED DESCRIPTION

This description of the exemplary embodiments is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

The following description is provided as an enabling teaching of a representative set of examples. Many changes can be made to the embodiments described herein while still obtaining beneficial results. Some of the desired benefits discussed below can be obtained by selecting some of the features discussed herein without utilizing other features. Accordingly, many modifications and adaptations, as well as subsets of the features described herein are possible and can even be desirable in certain circumstances. Thus, the following description is provided as illustrative and is not limiting.

As used herein, use of a singular article such as "a," "an" and "the" is not intended to exclude pluralities of the article's object unless the context clearly and unambiguously dictates otherwise.

A universal, web-based solution to identity fraud apparatus and method are provided by the present disclosure. The apparatus and method, proactively protects individuals via an identity authentication solution based on a centralized publicly accessible national registry that holds exclusive individual claims to a national identification and provides a lookup service that indicates a claim status for any given national identification. The inventor has determined that the apparatus and method provided herein provides secure identity exchange by permitting the transfer of identifiers that represent contexts for a given information request. By way of example, the inventor has determined that the apparatus and method provide additional security features such as tokens and electronic signatures that enhance identity disclosure security.

The inventor has developed systems and methods for identity authentication and information exchange. The systems and methods are an adaptable multi-purpose network solution to identity management that is customizable for a user's desired level of privacy. The identity authentication and information exchange systems and methods disclosed herein provide for a proactive solution over, for example, current services that only send alerts when suspicious activity is detected.

System Environment Overview

Figure 1:
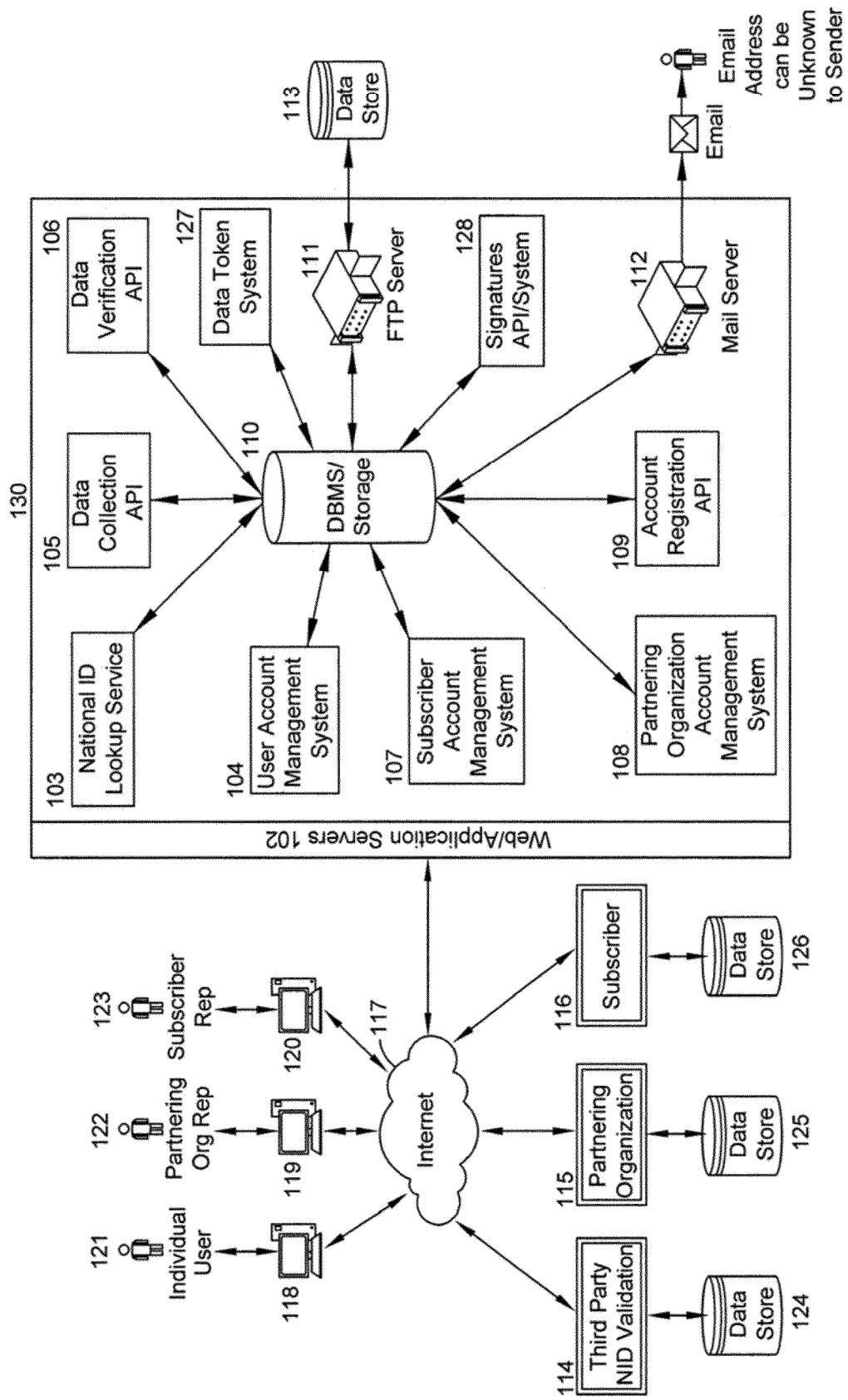
FIG. 1 is a diagram of a system in accordance with some embodiments of the present disclosure.

FIG. 1 is a block diagram representing a system 100 in accordance with some embodiments of the present disclosure. System 100 may be a computing environment including client devices, 118, 119, and 120, management system 130, one or more peer systems 103, 104, 105, 106, 107, 108, 109, 127, 128 and a communication network 117 connecting various components of system 100. Although three client devices 118, 119, and 120 are shown in this example, any number of client devices may be present. At least one of client devices 118, 119, and 120 is a user device capable of connecting to the Internet.

Various components of the computing environment 100 are configured to address problems associated with identity authentication and protection and personal information disclosure and transmission. Various components of computing environment 100 address these problems by providing a centralized publicly accessible database, wherein users maintain exclusive individual claims to a national identification and other identifications. Additionally, various components of computing environment 100 provide a look up service that indicates a claim status for a respective individual's national identification.

The resulting processing architecture of computing environment 100 facilitates identity authentication by permitting users to claim a national identification and create a user account associated with the claimed national identification. Computing environment 100 maintains a database of user accounts that each hold an exclusive individual claim to a national identification number (NID). NIDs are unique, verifiable, country specific identifiers (e.g., social security numbers). Computing environment 100 is further configured to prevent users from claiming a previously claimed NID. Holding an exclusive claim to a NID provides a solution that allows for proactive identity management by reinforcing the verification aspect of identity security.

In various embodiments, as shown in FIG. 1, each of client devices 118, 119, and 120 may include a computing device such as a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), or any other suitable computing device configured to store data and software instructions, execute software instructions to perform operations, and/or display information on a display device. Client devices 118, 119, and 120 may be associated with one or more users 121, 122, and 123, as shown in FIG. 1. For example, user 121 operates client device 118, causing it to perform one or more operations in accordance with various embodiments.

Each client device 118, 119, and 120 includes one or more tangible, non-transitory memories that store data and/or software instructions, and one or more processors configured to execute software instructions. Client devices 118, 119, and 120 may include one or more display devices that display information to a user and one or more input devices (e.g., keypad, keyboard, touchscreen, voice activated control technologies, or any other suitable type of known input device) to allow the user to input information to the client device.

Embodiments of the subject matter described in this specification can be implemented in a system 100 that includes a back end component, e.g., as a data server, or that includes a middleware component, e.g., an application server, or that includes a front end component (e.g., a client device 118, 119, and 120) having a graphical user interface or a Web browser through which a user can interact with an implementation of the subject matter described is this specification, or any combination of one or more such back end, middleware, or front end components. The components of the system can be interconnected by any form or medium of digital data communication, (e.g., a communication network 117). Communications network 117 may include one or more communication networks or media of digital data communication. Examples of communication network 117 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet an combinations thereof. In accordance with various embodiments of the present disclosure, communications network 117 may include the Internet and any publicly accessible network or networks interconnected via one or more communication protocols, including, but not limited to, hypertext transfer protocol (HTTP) and transmission control protocol/internet protocol (TCP/IP). Communications protocols in accordance with various embodiments also include protocols facilitating data transfer using radio frequency identification (RFID) communications and/or NFC. Moreover, communications network 117 may also include one or more mobile device networks, such as a GSM or LTE network or a PCS network, allowing a client device to send and receive data via applicable communications protocols, including those described herein. For ease of illustration, communication network 117 is shown as the Internet.

System 100 can include client devices 118, 119, and 120 and servers 102, 111 and 112. A client device and server are generally remote from each other and typically interact through a communication network 117. The relationship of client device and server arises by virtue of computer programs running on the respective computers and having a client-server relationship to each other. Server 102 is illustrated as a web/application server and in embodiments is used to gain access to many services provided by management system 130.

In one aspect, client devices 118, 119, and 120 store in memory one or more software applications that run on the client device and are executed by the one or more processors. In some instances, each client device stores software applications that, when executed by one or more processors, perform operations that establish communications with management system 130 (e.g., across communication network 117 and through server 102) and that obtain, from management system 130, information or data in accordance with various embodiments.

In various embodiments, client devices 118, 119, and 120 may execute the stored software application(s) to interact with management system 130 via an Internet connection. The executed software applications may cause client devices 118, 119, and 120 to communicate claim information comprising a NID and identity information that can be used to verify a claim to the NID. As will be described in embodiments below, executed software applications may be configured to allow users associated with client devices 118, 119, and 120 to populate user accounts with additional identity information, following a claim to a NID. After creating and populating this user account, the system can be used as the tool by which the user can safely share selected personal data from the user account with others, and do so in embodiments without divulging the user's claimed NID. Stored software application(s) on client devices 118, 119, and 120 are configured to access webpages on the Internet or other suitable network based communication capable of interacting with communication network 117, as would be understood by one of ordinary skill in the art. For example, user 121 may access a user account on management system 130 via an Internet webpage. In this example, management system 130 is configured to render the Internet webpage for user 121 on client device 118.

In some embodiments, system 100 includes management system 130 configured to perform identity authentication and information exchange processes, as described throughout this specification. Management system 130 may be a computing system configured to execute software instructions to perform one or more operations in accordance with various embodiments. Management system 130 is configured to communicate with a third party NID service 114 (e.g., a government entity or NID verification service) that has access to data store 124. NID service 114 provides verification and authentication of an individual's NID. In some embodiments, management system 130 is a distributed system that includes computing components distributed across one or more networks (e.g., across communication network 117). Managements system can also communicate with partnering organizations 115, which have access to data stores 125, and with subscribers 116, which have access to data stores 126, as will be described in connection with various embodiments.

The management system includes database management system/storage 110 for managing and storing data, such as user accounts and other data maintained by the management system 130. The database management system and/or storage are referred to herein simply as DBMS 110 for convenience. The DBMS is communicatively coupled with various processes, systems, modules and APIs as illustrated in FIG. 1.

It should be understood that various forms of data storage or repositories can be used in system 100 that may be accessed by a computing system, such as hard drives, tape drives, flash memory, random-access memory, read-only memory, EEPROM storage, and so on, as well as any combination thereof. Stored data may be formatted within data stores in one or more formats, such as flat text file storage, relational databases, non-relational databases, XML, comma-separated values, Microsoft Excel files, or any other format known to those of ordinary skill in the art, as well as any combination thereof as is appropriate for the particular use. Data stores may provide various forms of access to the stored data, such as by file system access, network access, a SQL protocol (e.g., ODBC), HTTP, FTP, NES, CIFS, and so on, as well as any combination thereof.

In various embodiments, management system 130 includes computing components configured to store, maintain, and generate data and software instructions. For example, management system 130 may include or have access to one or more processors, one or more servers (e.g., web/application servers 102, ftp server 111 and/or mail server 112) and tangible, non-transitory memory devices (e.g., local data store (in addition to DBMS 110) for storing software or code for execution and additional data stores 113 and 127). Servers may include one or more computing devices configured to execute software instructions stored on to perform one or more processes in accordance with various embodiments. In some embodiments, server 111 is an FTP server that executes software instructions to perform operations that provide information to at least one other component of computing environment 100, for example providing data to a data store 113 (e.g., in the form of XML outputs) or to third party recipients through a communication network, such as network 117.

Management system 130 may be configured to provide one or more websites, digital portals, or any other suitable service that is configured to perform various functions of management system 130 components. In embodiments, management system 130 maintains application programming interfaces (APIs) through which the functionality and services provided by system 130 may be accessed through one or more application programs executed by client devices 118, 119, and 120. Exemplary APIs include but are not limited to a Data Collection API 105, a Data Verification API 106 and an Account Registration API 109. Exemplary services and systems provided by management system 130 include National ID Lookup Service 103, User Account Management System 104, Subscriber Account Management System 107, and Partnering Organization Account Management System 108, each of which is described herein.

Client device 118 may execute an application program associated with and provided by user account management system process 104, such as the NID claim process and/or NID claim status look-up service, to provide services in accordance with various embodiments. In some embodiments, server 102 provides information to client devices 118, 119, and 120 (e.g., through the API associated with the executed application program). Client devices 118, 119, and 120 present portions of the information to corresponding users 121, 122, and 123 through a corresponding respective graphical user interface (GUI) or webpage.

In various embodiments, management system 130 is configured to provide or receive information associated with services provided by management system 130 to client devices 118, 119, and 120. For example, client device 118 may receive information via communication network 117, and store portions of the information in a locally accessible store device and/or network-accessible storage devices and data stores (e.g., cloud-based storage). For example, client device 118 executes stored instructions (e.g., an application program, a web browser, and/or a mobile application) to process portions of stored data and render portions of the stored data for presentation to user 121. Server 102, 111, or 112 may be incorporated as a corresponding node in a distributed network or as a corresponding networked server in a cloud-computing environment. Furthermore, servers may communicate via communication network 117 with one or more additional servers (not shown), that may facilitate the distribution of processes for parallel execution by the additional servers.

In further aspects, management system 130 may represent a "controlling entity" capable of storing, managing, distributing, and safeguarding information (e.g., account data, identity information, NID, tokens, etc.) in accordance with various embodiments.

System Overview

The present disclosure describes systems and methods that provide a universal, web-based solution to identity fraud that proactively protects individuals via a method of identity proofing that is based a centralized (one-per-nation) publically accessible national registry that holds exclusive individual claims to National ID (hereinafter "NID" or "National Identification") numbers (e.g., Social Security Numbers or other similar country specific identifier) and that provides a lookup service that indicates the claim status of any given NID (ideally submitted without an associated identity-related data). This lookup service is made available to anyone who has access to the internet and it is critical to the effectiveness of the solution. As will be further described below with reference to FIG. 1, the system described in the present includes a management system configured to perform identity authentication, protection and information exchange processes, as described throughout this specification.

The foundation for the management system and the ecosystem it provides is the claiming of a NID. The claiming of a NID involves a simple registration whereby a person enters his/her NID, full legal name, date of birth, and, depending on the nation, any other identity-related data that is that is routinely used to verify ownership of a NID. These items are then electronically submitted to an authorized third party that determines their collective validity. If the NID has not already been claimed and the entries are verified as valid, a NID claim is granted (and locked) upon completion of the setup of a management system user account.

Assuming public acceptance of this centralized NID-claim scheme, whenever a person presents a NID without proof of ownership, the receiving party can query its status and, if identified as "CLAIMED", can require the NID presenter to provide management system-generated proof of ownership, which is available in multiple text-string forms (e.g., a data disclosure token, a PIN, an electronic signature). This text string would then be submitted to a management system service that provides the necessary disclosure and/or verification. Such a process protects both parties. Receiving parties would have no sound reason not to always use this service, as it clearly protects them from fraud. In fact, it would basically be irresponsible for them not to use it. And for individuals who have claimed their NID, they are safe in the knowledge that if someone else attempts to use their NID, the receiving party will ask for management system-generated proof of ownership, and the would-be identity thief would not be able to provide such proof.

This scheme also allows for individuals to avoid exposing their NID in a transmission by simply providing a targeted data disclosure instead of providing a NID. (The NID gets disclosed after the receiving party submits the token to the management system service). This approach would have particular utility for use with tax returns, job applications, credit applications, etc. and is particularly beneficial when transmitting a NID (or other sensitive personal data) via email, paper form, phone, or in person. Also, by providing proof of ownership upfront, the receiving party is spared the steps of having to use the NID claim status lookup service and then getting back to the provider to ask for proof of ownership.

In embodiments, claiming of a national identification allows for other personal ID number types to be registered. Similar lookup service protection is afforded for other personal ID number types after they are registered with management system. This includes ID numbers for credit cards, bank accounts, passports, insurance policies, brokerage accounts, licenses, certifications, memberships, etc. Registration of such numbers is accomplished with the cooperation of the organization that issued them (e.g., a bank, a government agency, an insurance company, a trade association, etc.) and simply involves an API call that compares a person's identity-related data on file in the management system with that on file with the ID-issuing organization (for a given ID). If the data is found to match, the ID is successfully registered. As with NID numbers, whenever one of these additional ID personal ID types is presented, the receiving party can use a management system lookup service to determine the registration status of the submitted ID, and if identified as "REGISTERED", can require the person who presented the ID to provide proof of ownership (i.e. when proof is not provided upfront).

In addition to proactively protecting important personal ID numbers, management system also functions as a general, multi-purpose, identity proofing, personal information disclosure/transmission service that, with each disclosure, can accommodate an individual's desired level of privacy (including anonymity) while providing an information recipient with solid protection against false personation by the information sender. This capability is enabled by the generation and use of "Context Specific Identification Numbers" (described in more detail below), which are sent with personal responses to information requests from management system (institutional) subscribers and management system-registered individuals. A Context Specific Identification (hereinafter "CSID") is a personal ID number that uniquely identifies a person within a specific context. Each is cryptically derived from a numerical representation of the context and a unique personal identifier (e.g., a NID Claim Number, which is uniquely assigned to an individual upon completion of a NID claim).

This centralized NID registry model (thus far described) allows for solutions to a vast number of individual and institutional related problems that are associated with the exchange of information coming from or going to individuals, as will be described in this disclosure.

In addition to those solutions already identified, the management system can be used to provide individuals with foolproof protection against identity thieves ever being able to fraudulently file tax returns in their names. It can be used to help eliminate election voter fraud. It can be used to eliminate the need for a person to be required to disclose a NID for the purpose of running a credit history or some other type of background check. It supports requests for information via email without needing to supply an email address. It provides for identity proofing, greater convenience, and greater control with the collection of personal information via online forms (e.g., for job applications, airline reservations, credit applications, etc.) It provides businesses with greatly enhanced online marketing capabilities (without infringing on anyone's desired level of privacy). It supports the creation of digital signatures without the need of a third party certificate authority. It provides knowledge of (and control of) repeat participation in online surveys, product reviews, marketing promotions, votes, etc., all while supporting participant anonymity. It allows a person to positively identify themselves without any other forms of identification. It provides for protection against online predators. It enhances security, where needed, in many types of face-to-face and over-the-phone interactions. It supports "Alternative Identifier" initiatives (e.g., the one promoted by the U.S. Social Security Administration) by providing an incredibly simple and reliable alternative personal ID assignment process.

Figure 2:
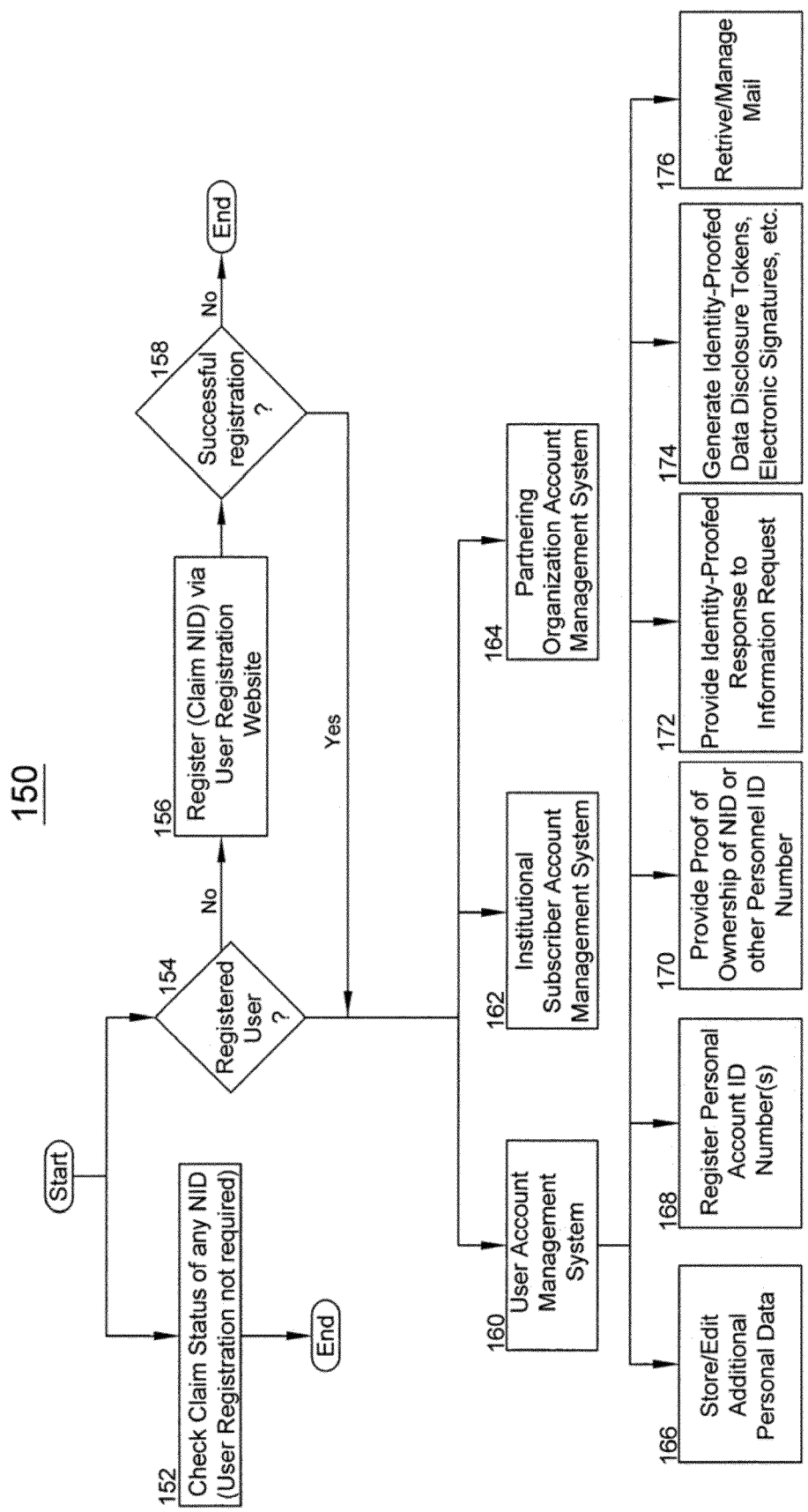
FIG. 2 is a flowchart showing general user functionality of the management system.

With all of its capabilities, the management system 130 is designed to provide services that are secure, simple to set up, easy to access, adaptable, and inexpensive—while being capable of seamless coexistence with existing personal information transmission methods. FIG. 2 is a flowchart 150 showing general user functionality of the management system 130 that will be described in more detail in the sections below. At 152, the management system provides a NID lookup services that allows for any person (whether a registered user or not) to check whether a NID has been claimed through the management system 130. In various embodiments, the lookup service is publicly accessible on the Internet via communication network 117.

In certain embodiments, additional functionality is available only to registered users. At 154, the management system determines if a person is a registered user. If the person is not a registered user, the user can register with the system 130 a claim to his/her NID at 156. If the registration is successful at 158, additional functionality available to registered users can be used. For example, the registered user can access at 160 the user account management system (104 in FIG. 1). At 162, services provided through institutional subscriber account management system (107 in FIG. 1) can be used. At 164, services provided through partnering organization account management system (108 in FIG. 1) can be used. Through user account management system, various functionality can be accessed, including store/edit additional personal data in a user account (166), register personal account ID number(s) (168), provide proof of ownership of NID or other personal ID number (170), provide identity-proofed response to information request (172), generate identity-proofed data disclosure tokens, electronic signatures etc. (174) and/or retrieve/manage mail (176), for example.

Claiming a National ID Number

Identity protection from the management system begins after a simple straightforward registration, which essentially involves little more than the exclusive claiming of one's government issued National ID Number (e.g., Social Security Number in the United States). This is suggested to be required for anyone who desires to use the core services offered by the system (except for the publically accessible NID lookup service), either as an individual or as a person representing a management system subscribing institution or a management system partnering organization. Once a National ID Number (NID) is successfully claimed, it is locked from being claimed by anyone else. This simple concept is important to the effectiveness of every service provided by the management system. Claims can be disputed, and subsequently revoked, but at any given time, a claim to a NID can be locked by no more than one person.

Claimed with a NID is a person's full legal name, date of birth, and, depending on the nation, any other identity-related data that is that is routinely used to verify ownership of a NID. These items are then electronically submitted to an authorized third party (e.g., Third Party NID Validation 114 in FIG. 1) that determines their collective validity. Such third parties may include government agencies, credit bureaus, banks, or any organization that possesses a validated list of these identity-related items. If the third party verifies the entries as valid and the NID has not already been claimed, a new NID claim is granted (and locked) upon the person completing the setup of a management system user account Note that a person's NID, name, and date of birth are not made visible on any management system user interfaces after registration. This provides for an extra layer of protection in the event that someone fraudulently gains access to a management system user account.

In cases where a person has a change of name, revalidation by an authorized third party is required. So a change of name must first be filed and accepted by the NID-issuing agency (e.g., a government agency by way of example) before such a change can be made in the management system.

A more thorough description of the registration process is described below in reference to FIG. 3. This includes a description on how the management system user accounts are set up and on how disputed NID claims are managed and resolved.

Of course, a NID can be fraudulently claimed. But this, at worst, presents a situation that is no more problematic than what already exists. Either way, stealing an identity requires knowledge of the same 3 identity-related data items. However, what separates the management system in this regard is that a stolen identity can very easily be detected. As indicated in the previous section, the management system provides a lookup service that indicates the claim status of any given NID. With this service being made available to anyone who has access to the internet, without the need to be registered with the management system, a non-registered person can, at any time, determine if someone else has fraudulently made a claim to his or her NID. If so, this person can quickly put the wheels in motion to resolve the problem. This lookup service also allows parents, legal guardians, powers of attorney, etc. to check the claim status of NID numbers belonging to those in their charge. As a result, would-be identity thieves must consider the higher likelihood of getting caught when using the management system as a vehicle to steal an identity. Such thieves, when they have the required data to steal one's identity, are actually better off not making a fraudulent claim in the management system, as they are more likely to be able to use the stolen identity for a longer period of time when not making such a claim.

As is described herein, whenever a person presents a NID without any proof of ownership (e.g., as part of a transaction (commercial or non-commercial)), the management system NID lookup service allows the receiving party to query the claim status of the NID, and, if identified as "CLAIMED", the receiving party can require the NID presenter to provide management system-generated proof of ownership. Such proof can only be acquired via a management system logged-on session, during which the NID provider would be required to key in and match the NID, name, and date of birth that are stored in the management system database under his/her account. Also, if previously chosen as an additional security option, answers to one or more security questions would be required. (Note that such answers are not made visible on any management system user interfaces after original entry.) This may appear a bit cumbersome, but, in reality, it is not very often that a NID is actually needed. When it is, the extra layers of protection are well worth the minor inconvenience. In this scenario, not only does a would-be identity thief need to know the intended victim's name, date of birth, and NID, but also the person's management system log on credentials and answers to as many security questions as was deemed necessary by that person. And, as another layer of protection, individual management system users can opt to have an email, text, and/or voice message sent to them as an alert every time a management system verification (or disclosure) of their NID is attempted or executed. In the case where a NID verification or disclosure was attempted but not completed, the alert would state just that (e.g., "SS # verification attempted but not completed—04/01/2016 10:03 am"). In the case of a completed verification or disclosure, the alert would identify the entity that received the verification or disclosure, the date/time of the transmission, and a list of any other personal information that was verified or disclosed.

As discussed above, claiming a NID means that an individual has registered a user account with a NID, effectively making an exclusive claim to the NID for use with the system features, such that no other individual may register and take advantage of the protective services in management system 130 that are tied to a claim to that NID. Management system 130 is configured to prevent registering a user account with a NID that has been previously claimed. According to various embodiments, a NID is a unique government issued identification number (e.g., social security number). A NID by its nature is a number issued to only one person. In embodiments, the claimed unique identifier may be other unique numbers that are issued to only one person by some controlling entity (e.g., national or local government, or other entity).

An overview of the registration process will first be described and then illustrated in connection with FIG. 3. As previously stated, registration for use of the management system 130 essentially involves the claiming of one's government issued National ID (NID) Number. To make such a claim, individuals would go to a User Registration website. Here they would first select their country. Then, depending on the country selected, they are prompted for their country's NID Number. For example, U.S. residents would be prompted for a "Social Security Number". They are also prompted for their full legal name, date of birth, and, depending on the country, any other identity-related data that is routinely used to verify ownership of a NID.

Note that registration can also be accomplished through the web site of a partnering organization which would already have verified the NID (and other key identity-related data) of the registering individual—e.g., a Credit Card Company, a Bank, a Credit Bureau, or even the individual's current or former employer.

Upon submitting the required entries, a database table in DBMS 110, NID_CLAIM, is searched to determine if the current National ID Number has already been claimed. If the ID number has not been claimed, it will be checked for validity (collectively with the other required identity-related items) via electronic submittal to a third party validation service entity 114, such as a credit bureau or a government agency, or via a partnering organization (if such is used as the vehicle for registration). If the entries are collectively found to be valid, the registrant will then be guided through the setting up of a user account at management system 130. This setup entails the entry of a User ID (required to be unique within one's country), a password, security question/answer pairs, and either an email address or a telephone number (to provide a medium for resets of a forgotten user ID or password). Also requested would be the selection (or upload) of a security image (with a personalized caption) and the entry of the person's gender and postal code. Optional security-enhancing features will also be available for implementation during (and any time after) the setup process. For example, an editable User ID suffix and/or one or more additional passwords can be applied to the account.

Figure 11:
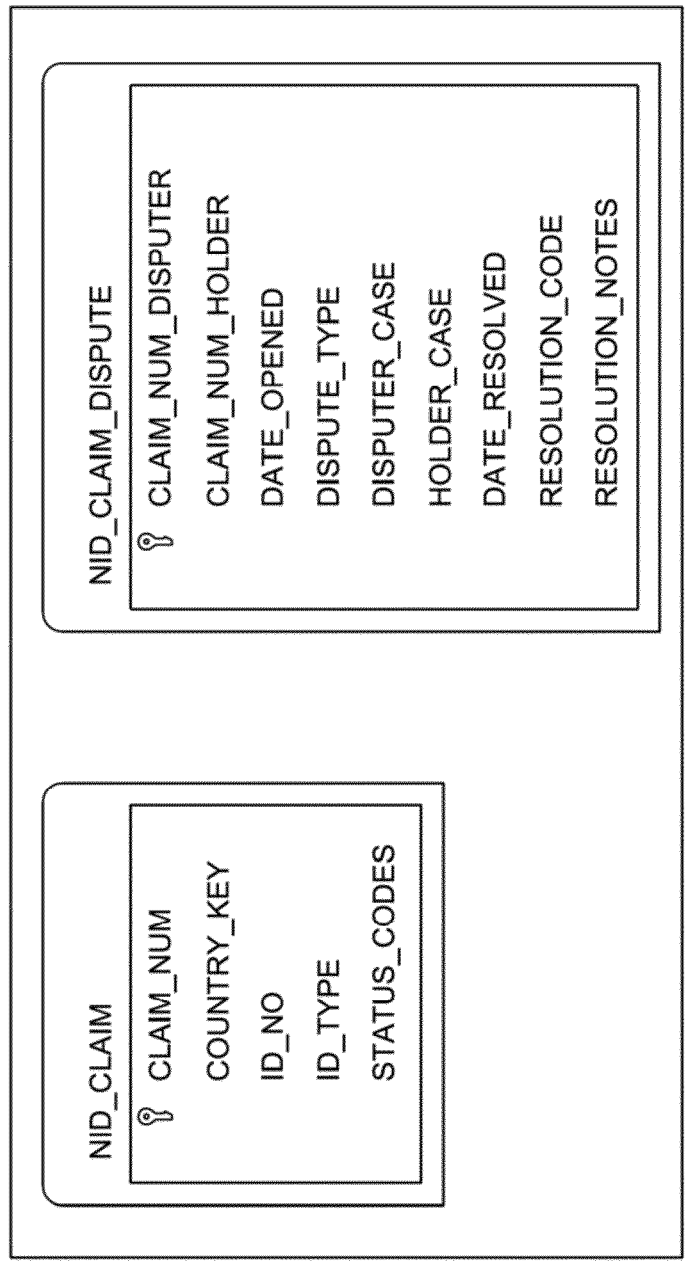
FIG. 11 depicts part of the database schema, specifically a NID claim table and NID dispute table.

Upon completion of the registration process, a new row will be inserted into the NID_CLAIM table (FIG. 11). The primary key, CLAIM_NUM, is assigned by the system. COUNTRY_KEY is a foreign key to a COUNTRY lookup table. ID_NO holds the National ID Number. ID_TYPE may or may not apply, depending on whether the country issues more than one type of ID number. STATUS_CODES holds one or more status codes relating to the claim—e.g., "A" (Active), "D" (Deceased), "P" (Protected), "DS" (Disputed).

The storage of the other data elements collected during registration, though logically belonging in a single table (except for the security question/answer pairs), is spread among multiple tables, without any logical database-defined links (i.e. foreign key links) between them. This method of data separation is a key part of the security aspect of the system and is explained in detail in the section DATA STORAGE SCHEME. This section also details how and where the remaining registration data is stored.

In cases during registration where the submitted NID is found in the NID_CLAIM table, meaning that it had been previously claimed, the associated name and date of birth of the previous claim are checked to determine if they match the entries made by the current registrant. If the entries do not match, the person is notified that the National ID Number has already been claimed, and, upon acknowledgement, the registration session is terminated. The registrant is not given an opportunity to dispute the previous claim, as the stored name and date of birth would have been validated as correct when the previous claim was made. If the name and date of birth entries do match, an appropriate message is displayed and the registrant is given an opportunity to dispute the claim. In this case, the claim would be identified with one of the 3 following statuses. 1) The claim is "Active". 2) The claimed ID belongs to someone who is identified as "Deceased". 3) The claimed ID is identified as "Protected", which means that someone other than the owner of the ID number has control over the user account. Examples of this would be a parent having control of his or her child's account, a power of attorney having control (for any number of reasons), or just a friend of someone who does not have a computer or who is not computer savvy. In the first 2 cases, it is quite certain that at least one of the claims is fraudulent. In any event, the current registrant can file a dispute of the original claim (although if the new registrant is the fraudulent one, it is unlikely that he or she will dispute the claim). If a dispute is filed, the associated NID_CLAIM row is so noted (via an entry in the STATUS_CODES column) and a row is inserted in the NID_CLAIM_DISPUTE table (depicted in FIG. 11), which contains columns necessary to manage the dispute process. The other data elements collected during registration are stored in the same tables as those for all other registrants. So the disputing individual is registered, but he/she is red-flagged as a "DISPUTER". As such, some very limited uses of the system may be allowed (depending on the strength of the dispute), but none that would compromise any protections guaranteed to the original claimant. Depending on the ID strength of the original claimant, he/she may also be red-flagged, in which case, certain limitations on his/her use of the system may be triggered.

Note that NID_CLAIM_DISPUTE→CLAIM_NUM_DISPUTER is assigned the value which would have been assigned to NID_CLAIM→CLAIM_NUM if a new NID_CLAIM row was being inserted instead of a new NID_CLAIM_DISPUTE row. This is done because, in the case that the disputing individual wins the dispute, the CLAIM_NUM entry in the associated NID_CLAIM row is overwritten by the CLAIM_NUM_DISPUTER value. This scheme is employed because the value for NID_CLAIM→CLAIM_NUM provides the basis for identifying an individual within the ecosystem of the management system 130. This scheme is also the reason that the database schema clip presented in FIG. 11 does not show NID_CLAIM_DISPUTE→CLAIM_NUM_HOLDER as a foreign key to NID_CLAIM→CLAIM_NUM, as one might reasonably expect. This is because a foreign key relationship would not allow NID_CLAIM→CLAIM_NUM to be overwritten unless the NID_CLAIM_DISPUTE row is deleted, which is not done because the NID_CLAIM_DISPUTE row needs to remain for audit trail purposes.

Resolution of disputed claims may be facilitated (semi-automated) by comparing the generated "ID Strengths" between the disputer and the disputed. It is anticipated, however, that most disputes will require intervention by an authorized third party. ID strength is a function of the number of identity-verified personal accounts, licenses, etc. that are registered in the management system 130 and the length of time that the individual has held such accounts.

Figure 3:
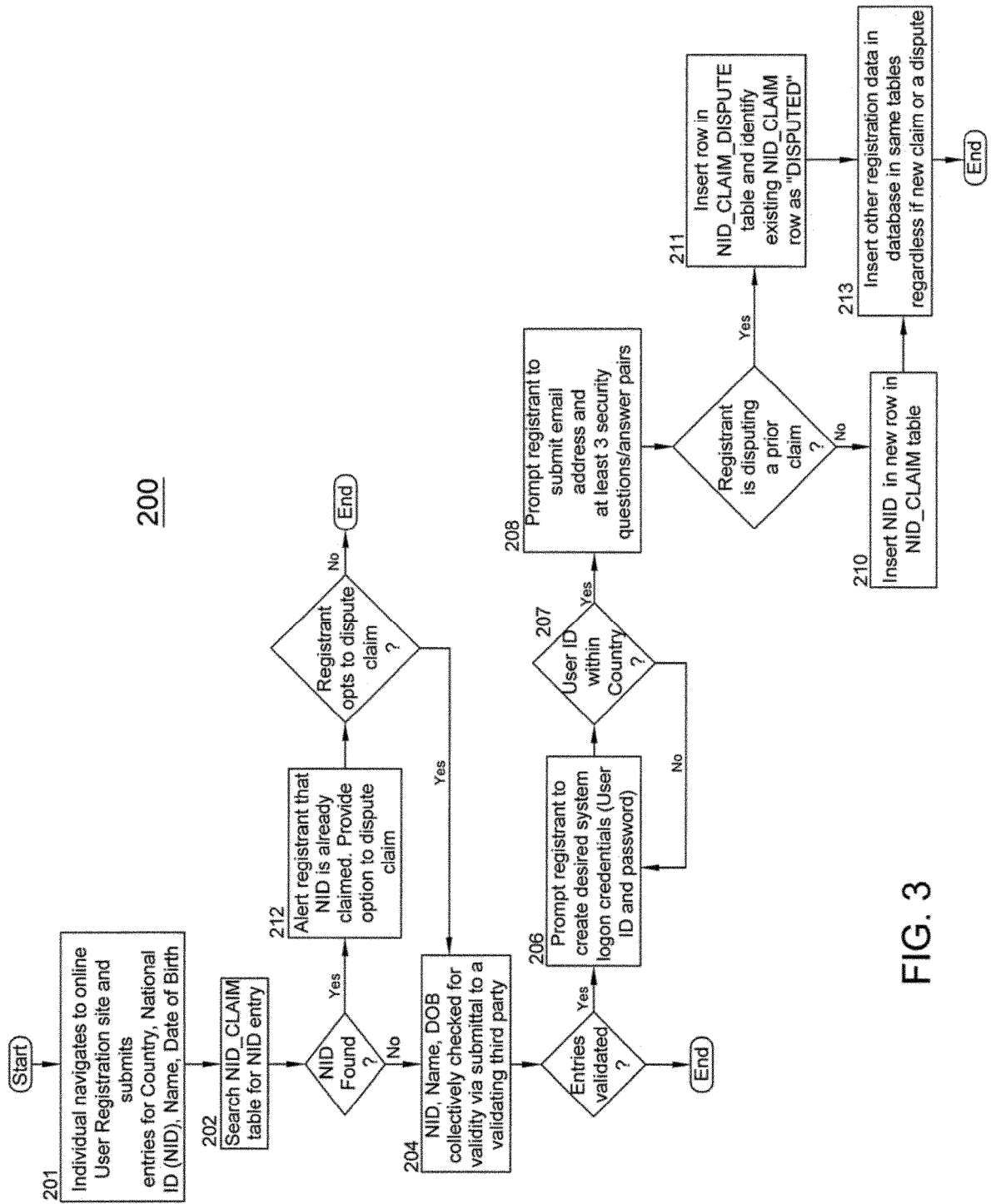
FIG. 3 is a flow diagram illustrating a process of user account registration in accordance with some embodiments of the present disclosure.

As previewed above, FIG. 3 is a flow diagram illustrating a process 200 of account registration in accordance with some embodiments of the present invention. The process may utilize functionality of, for example, user account management system 104 and national ID lookup service 103 of FIG. 1. At 201, user 121 accesses a user account registration site provided by management system 130, such as through application server 102. The registration process begins by submitting a respective NID of the user 121 and identity information that is requested and then used to verify the user's claim to the NID. Management system 130 is configured to request identity information that will be associated with the submitted NID to verify an individual's identity. Identity information that may be requested is one of at least a full legal name, date of birth, NID nation, and/or any other suitable identity information that may be used to verify ownership of a NID.

At 202, the submitted NID is searched by management system 130 to determine whether the NID has already been claimed in a previous registration. A NID may not be claimed in a registration process where a successful claim to a NID has been completed (e.g., a registered user account corresponds to the submitted NID). A claimed NID is locked and is not permitted to be claimed in a subsequent registration. It should be appreciated that maintaining a registry of exclusive claims to respective NIDs has significant advantages to safeguarding identity. Specifically, identity authentication and verification is enhanced because a NID may only correspond to one individual within a given country and additional services (e.g., services related to safeguarding additional identity information of the user (e.g., license number, credit card information, etc.), information exchange services, etc.) can only be used with respect to registered users.

If the NID submitted does not correspond to a previously claimed NID, a third party (or optionally intra-party if the service is managed by a verifying entity) validation occurs at 204, using the submitted NID and identity information. Management system 130 is configured to communicate the submitted information via communication network 117 to third party NID validation system 114. Third party NID validation system 114 retrieves identity information associated with the submitted NID from data store 124. The retrieved information from third party NID validation system 114 is compared with the submitted identity information from user 121 in order to validate or verify that submitted identity information. In some embodiments, third party NID validation system 114 is a country specific government system corresponding to the submitted NID. In various embodiments, third party NID validation system 114 is a trusted repository configured to provide a validated source for verifying a NID (e.g., government agency, credit bureaus, bank, etc.). It should be appreciated that verification of submitted information using a third party is an effective means of claiming a NID while ensuring that a registered account with management system 130 is authenticated to a user of that account.

Once the submitted information is validated by management system 130 via a third party NID validation system 114, user 121 is prompted to create user account login credentials at 206. User account login credentials may comprise a user log in identification and password. User account login credentials may further comprise a pin or any other suitable means of identifying and verifying a user during the log in process associated with a user account that has been registered with management system 130. At 207, the requested user identification is verified to be unique. At 208, management system 130 prompts user 121 to submit an email address and submit a security questionnaire. The security questionnaire may include submitting challenge-response pair security questions and answers as an additional identity verification step to the login credentials.

As described above, a claimed NID is not permitted to be claimed in a subsequent registration process. If, during an attempted registration process, an individual submits a NID that has been previously claimed (e.g., some other user has completed a registration process for the respective NID), an alert will be generated and displayed indicating the claim status for the submitted NID at 212. Management system 130 is configured to provide a method to dispute a claimed NID. At 212, an alert will accompany an option to dispute the claim status of the respective claimed NID. Optionally, if user 121 disputes a claim status to the respective claimed NID, identity information submitted with the NID is validated by third party NID validation system 114. Verifying submitted identity information when disputing the status of a claimed NID is an important aspect intended to prevent fraudulent disputes. Without this safeguard, management system 130 may be inundated with disputes by individuals who are not verified to be associated with the submitted NID.

Assuming the NID is not being disputed (e.g., no previous claim to the submitted NID exists), then a user account is created at 210. When the user account is created via registration process 200, the NID is understood to be claimed (and thus locked) according to various embodiments. At 211, for a claim dispute, identity information that was successfully validated by third party NID validation system 114 is stored by management system 130 to process the disputed claim. At 213, management system 130 stores all information submitted during registration process 200.

From the foregoing, it should be appreciated that determination of identity theft can occur in a more rapid fashion (e.g., through the lookup service and/or account registration process). Additionally, individuals who engage in identity theft are more likely to be apprehended because the system can help determine who fraudulently claimed a respective NID.

Referring back to FIG. 2, registration process 200 will end if the third party NID validation system 114 is unable to verify submitted identity information at step 201 against stored third party identity information on data store 124. Additionally, the registration process 200 will end where a user does not dispute a previously claimed NID.

In some embodiments of the present disclosure, user account information may be populated with other identity information. In various embodiments, identity information that may be stored in a user account may be an email address, mailing address, phone number, picture, signature, marital status, income, education, profession, gender, skill, hobby, or any other suitable identity information that would be understood by one of ordinary skill in the art.

It should be appreciated that after a user has registered with the management system 130, the user, when logged in, can store in his or her user account in DBMS 110 any personal information that the user may have to share. In various embodiments, DBMS 110 may store additional user account identity information than collected during the initial registration. In embodiments, identity information may be any information that can be used to characterize an aspect of an individual (e.g., age, height, job status, date of birth, hobbies, job related information, personal habits, address information, familial relationships, etc.). Identity information may be any suitable descriptive characteristic of an individual as would be understood by one of ordinary skill in the art. Each respective identity information item is, in embodiments, preferably is stored in DBMS 110 in a separate database object or table. In some embodiments, date of birth, gender, and postal code identity information may be stored in the same object or table. In this embodiment, these items may be stored together for efficiency because they do not have an association to key personal identity information (e.g., NID, name, etc.).

Registration of Personal Accounts, Licenses, Memberships, Etc.

Following successful processing of an exclusive claim to a NID by a user, the management system 130 allows for other important services that protect the identity and personal information of a registered user. With the goal of preventing the unauthorized use of important personal accounts, licenses, and memberships (collectively hereinafter referred to as "account" or "accounts") the management system provides for the registration of such accounts (e.g., credit cards, bank accounts, insurance policies, driver licenses, passports, union memberships, etc.) with the cooperation of the organization that issues them.

The process begins with an account issuing organization (e.g., a credit card company, a bank, an insurance company, a union, a government agency, etc.) setting up an account on the management system, referred to herein as a partnering organization account on the management system. The functionality described herein can be implemented through, for example, the Partnering Organization Account Management System 108 of management system 130, which has access to DBMS 110.

Having a partnering organization account allows an organization to set up an account registration service for each type of account they offer. To do this, they would need to integrate a management system-provided "Account Registration API" into one or more of their online account management sites. Also, an authorized representative of the organization would need to log on to the management system partnering organization management system and select the option to set up an account registration service. In doing this, the following would be prompted for:

1) Account Type (e.g., Credit Card, Bank Account, Driver's License, Passport, etc.)
2) Account Sphere ID
3) List of personal ID-related data item types to verify in the management system before a registration is granted
4) Checkbox indicating weather account numbers can be recycled
5) Rules (restrictions) regarding management system-generated PINS.

An Account Sphere ID represents what is needed as a prefix to an Account ID in order to make the combination globally unique within the given Account Type. The wording, "Account Sphere ID", however, is not what is actually prompted for on the screen. What is actually prompted for depends on the Account Type that is selected. For instance, if "Bank Account" is selected, the screen would prompt for the Organization's "Routing Number". For a Driver's License the screen would first prompt for a Country Code and then, if necessary, a specific type of Territory ID (e.g., "State" for US Driver's Licenses). For a Credit Card, no Sphere ID entry is required, as credit card numbers are themselves globally unique by design (with the first 6 digits being reserved for a globally unique Issuer ID Number and the remaining digits being unique within the given Issuer ID Number).

The "list of personal ID-related data item types to verify" represents data that the account-issuing organization would have on file for each account holder and where it is deemed necessary that each of these data items be verified (by a match in the management system database) before a successful registration is granted. This list can include "NID", "Last Name", "First Name", "Date of Birth", etc. For account types where a National ID Number is required to obtain an account (e.g., a credit card or a bank account), the list need only include "NID". For account types where a National ID Number is not required to obtain the account type, the list can include a type of account that does require a National ID Number. In this case, during the registration process, if the ID of such an account type is found have a match for the registrant in the management system database, this is as effective as having and verifying a National ID Number.

Once the above data is submitted, an Account Registration Service Number will be assigned by the system to uniquely identify the Account Registration Service. Then all that is needed is for the organization to provide a link on their online account management website (e.g., website that is part of Partnering Organization 115) that would allow for account holders to register their account with the management system via a call from Partnering Organization 115 to the management system Account Registration API 109 of FIG. 1.

Each call to the management system Account Registration API 109 involves the passing of, for example, the following parameters:

1) Account Registration Service Number
2) Account Number
3) Expiration Date
4) Member-Since Date
5) Name-value pairs of the personal data items needed to be verified in the management system The Member-Since-Date (if it is available) is important because such dates are used in establishing Identity Strength Ratings for management system users. The longer an account has been held (with key accompanying Personal ID data), the more positive an effect it has on a person's Identity Strength Rating, which is generated by the management system.

The "name-value pairs of personal data items needed to be verified" corresponds to the list identified when the partnering organization set up the Account Registration Service.

A simple implementation of the account registration process would be for the issuing organization to provide something similar to "Register Account with the management system" as a link on their online account management website after a person has successfully logged on to this site. A click of the link would trigger a procedure to collect all of the necessary data (which the organization would have on file for the logged on individual) and then make a call to the management system Account Registration API 109 with the required parameters.

To accommodate account holders who are not signed up for online management of their accounts, the organization can provide the link anywhere on a website that is available without a login. Upon clicking this link, a dialogue box needs to be presented prompting for the manual entry of the account number that the person wishes to register, along with whatever other information the organization determines to be necessary to provide positive identity (e.g., all or part of NID, Name, Date of Birth, Postal Code, Credit Card Number, etc.). Upon submittal of this information, the website would pass control to a procedure which would verify whether the data entered matches what they have on file for the person. In the case of a match, the procedure would then call the management system Account Registration API 109 with the required parameters.

In the two scenarios presented above, once a call to the management system Account Registration API 109 is made, the person requesting the account registration will be prompted for management system logon credentials associated with the user's registered user account with management system 130. Upon a successful log on, the API 109 would then check each personal ID-related data item for a match with the person's same identity-related data item stored in the management system database 110. If a match is found for each data item, the specified account number (along with their corresponding Expiration Date and Member-Since Date) will then be registered in the management system. The API would then return a code indicating success or failure. If the registration fails, the API 109 would also send back a list of the personal ID-related data items that did not match (and thus caused the registration to fail). In receiving the returned code, the organization's website should notify the account holder of the result of the registration request.

Though not required, it is suggested that registered account numbers be stored via the database storage guidelines described in the DATA STORAGE SCHEME section below. It is also suggested that such numbers be stored in encrypted format.

Once a personal account is registered, one of the important methods that the management system employs to safeguard it is via the assignment and use of one or more PINs. Several options exist regarding the nature of such PINs and how they can be assigned.

For certain types of accounts (e.g., credit cards) that have been registered, the primary account holder (the person who registered the account) can add additional persons as authorized users of the account. For those additional persons who are not registered with the management system 130, the primary account holder must manage the management system PIN assignment process for them. For those additional persons who are registered with the management system 130, the primary account holder can either manage the PIN assignment process for them or grant them control over the process. The process of how registered personal accounts are safeguarded is described in further detail below.

Protection of Registered Personal Accounts, Licenses, Memberships, Etc.

The registration of personal account, license, and membership numbers in the management system (per the discussion above) makes it possible for subscribing organizations (i.e., organizations that have subscribed to the management system 130) to verify, via the management system 130 "Account Verification Service", that a person presenting an account number to them is, in fact, the person who owns the account (or is an authorized user of the account). This obviously benefits both the account holder and the subscriber organization which needs to verify the account. This verification capability is made possible by way of a management system Data Verification API 106, which is made available for integration on the websites of subscriber organizations after they sign up for the service.

Before an organization can sign up for the management system Account Verification Service, it must first be registered as a management system subscriber. The process of registering an organization as a management system subscriber is described in further detail below. Subscriber registration is handled through the Subscriber Account Management System 107.

In signing up for the management system Account Verification Service, an authorized user of the organization's management system subscriber account (with sufficient privileges) would log into the management system Subscriber Account Management System 107, identify the subscriber organization (i.e. if more than one is assigned to this user) and then select the option to set up this type of service. In doing so, the person would merely be prompted to select the desired account type (e.g., "Credit Card", "Bank Account", "Driver License", etc.) for which the verification service is desired. Other than acceptance of terms and conditions, this is all that is required. Once this is successfully submitted, the system will assign a unique Verification Service Number to the account type selected for the subscribing organization.

To support online personal account verification, the subscribing organization's website must accommodate for the entry of an Account Sphere ID (if applicable), an account number, and a PIN. They can either provide the interface for these entries or they can allow for the management system Data Verification API 106 to do this for them. Then, to finalize implementation of the account verification capability, the subscribing organization needs to add to their website a call to the Data Verification API 106 and incorporate a simple script to handle the code returned by the Data Verification API 106. This Data Verification API 106 should be triggered to be called upon a person's submittal of a personal account related data, and the passing of the following parameters needs to be accommodated:

1) Verification Service Number
2) Account Number
3) Account Sphere ID (if applicable)
4) PIN (if presented for entry)

As noted above, a Verification Service Number is the unique number assigned separately to each account type that an organization signs up for use of the verification service. Safeguards are put into place to help ensure that this number is not used by any entity other than the one it was assigned to.

When a person submits an account number, along with an Account Sphere ID (if applicable), and possibly a PIN on a website that is set up for use of the management system Account Verification Service, a call is made to the management system Data Verification API 106 (with the input parameters identified above). This API first looks up the Verification Service Number to determine the Account Type. Then the service searches the management system database 110 for the Account Sphere ID/Account Number combo for the given account type. If not found, the service returns a code indicating that the account is not registered. If the account is found to be registered, the service will check if a PIN has been passed. If a PIN has been passed, it will be checked for whether it is valid (for the given account number). If not valid, a code will be returned indicating that the account is registered but lacks a valid PIN. If the PIN is valid, a code will be returned indicating that the person is an authorized user of the account.

When a PIN is not passed, the API will present a page providing the person presenting the account with the option of either entering a PIN or providing his/her management system user login credentials. If a PIN is entered here, the API will provide the same PIN-handling logic as presented above. If valid logon credentials are entered, the API will check if the identified person is an authorized user of the account. If the person is found to be authorized, a code indicating valid authorization will be returned. If found not to be authorized (or if the person did not provide valid login credentials), a code will be returned indicating that the account is registered but authorization has not been verified.

Figure 4:
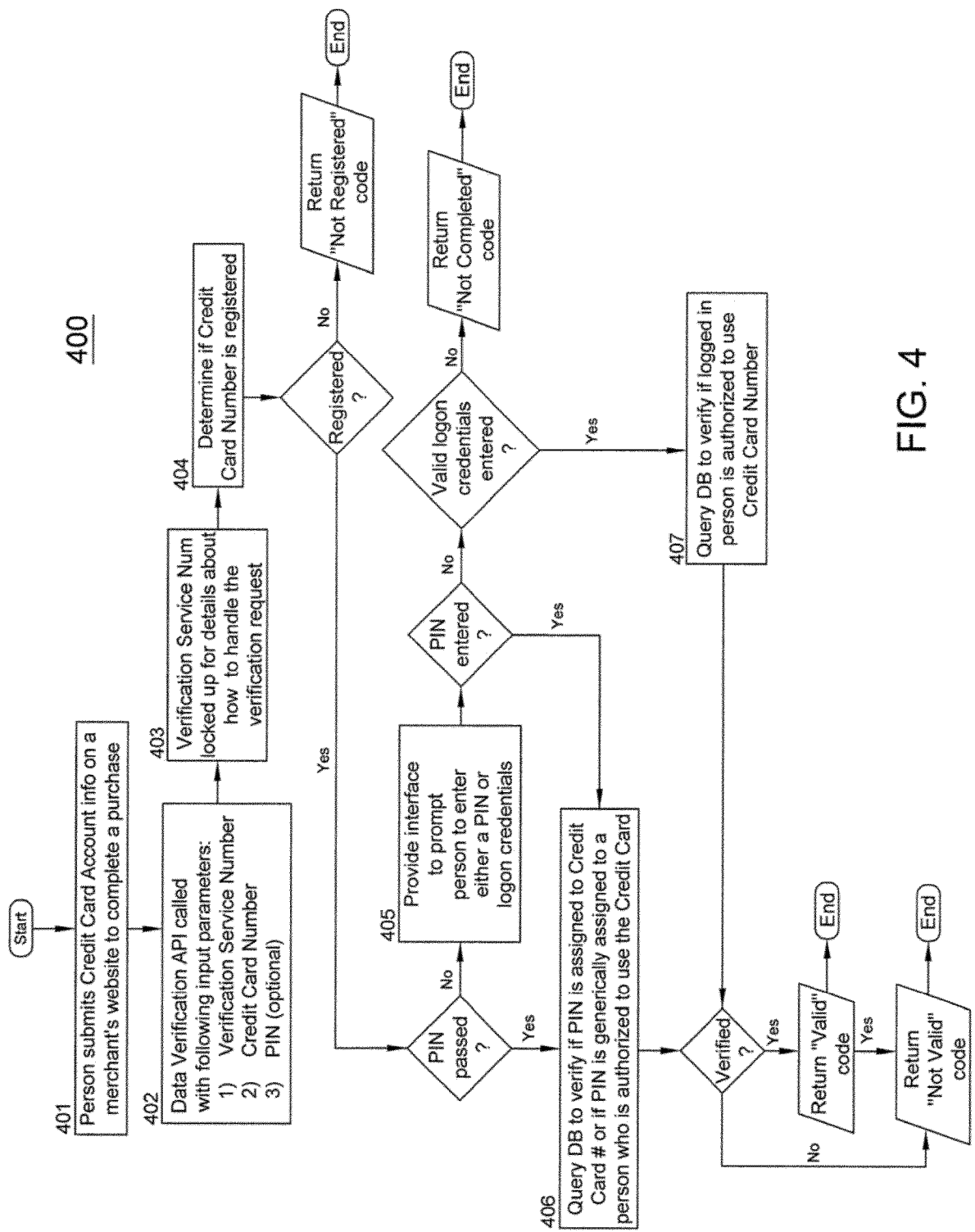
FIG. 4 is a flow diagram illustrating an example process for system verification of a credit card account in accordance with some embodiments of the present disclosure.

Credit Card Account Number Verification Example Through Call to the Data Verification API FIG. 4 is a flow diagram of a credit card account verification example process 400 in accordance with some embodiments of the present disclosure. At 401, a user 121 submits a credit card account information on a subscriber organization's website to, for example, complete a purchase. At 402, Data Verification API 106 is called with the following input parameters: (i) verification service number, (ii) credit card number and (iii) a pin. At 403, the management system 130 looks up the verification service number for details about how to handle the verification request. At 404, an evaluation is made as to whether the credit card number is registered. For example, it is determined whether the submitted credit card number matches a credit card number stored in DBMS 110 as part of the user's user account. Assuming that the credit card number matches and a PIN is passed, then at 406 the pin is evaluated. Specifically, the DBMS 110 is queried to verify if the PIN is assigned to the credit card number of if the PIN is more generally assigned to a person who is authorized to use the credit card. If a PIN is not passed, then at 405, a PIN and/or management system 130 login credentials are requested. If a PIN is entered, then step 406 is performed. If login credentials are entered, then at 407 the DBMS 110 is queried to verify if the logged in person is authorized to use the credit card number. The outcome of the verification of authorization to use the credit card number is returned to the subscriber organization requesting such verification. Exemplary return values illustrated in FIG. 4 include not associated, not completed, valid, and not valid. Any suitable value to describe the validation status of credit card account information with a user account and/or partnering organization 115 may be used as would be understood by one of ordinary skill in the art.

Note that this scheme makes the requirement of using a PIN for online transactions entirely optional for users registered with management system 130 (by allowing them to enter management system logon credentials instead). For online transactions, entry of a PIN is required only for those who have been granted authorization by the account owner to use an account but are not registered management system users. Such a scenario could apply in the case of a parent providing a son or daughter with use of a credit card account or a health insurance account.

Importantly, the system can also be used with over-the-phone interactions or transactions. For over-the-phone interactions, signed-up subscribers have the option of integrating the management system Data Verification API 106 with the application they use to enter the personal account-related data that is verbally supplied to them. In this scenario a PIN (or a data disclosure token) is always required to complete the verification process, as using management system logon credentials is not an option (as those should be kept secret). In embodiments, the management system makes this very easy and secure by providing support for the generation of temporary one-time use PINs (which can be quickly acquired from the management system via any web-enabled device through the User Account Management System 104) and support for the generation of ever-changing formula-based PINs that are a function of Date/Time elements (e.g., numeric day-of-week, hour-of-day, day-of-month, etc.). Such dynamically generated PINs can also be used for face-to-face transactions where a verbal transmission of a PIN may be more convenient (or in some cases even necessary).

Note that the person entering the data (for over-the-phone or face-to-face interactions) can submit an account number without a PIN, and then wait for the Data Verification API 106 to reply whether the account is registered in the management system 130. In this way, the validator need not request a PIN from the account holder until he/she knows that one is required.

Instead of providing an interface from their own website, subscriber organizations also have the option of using a web application provided by the management system 130 to collect and verify personal account-related data. To use this application, an authorized representative of the subscribing organization must navigate to this site and log on via his/her management system logon credentials. Once logged on, the application will check for all Verification Service Numbers that are assigned for the representative's use. If more than one is found, a drop-down box listing each assigned Organization/Account Type (corresponding to each Verification Service Number) will be presented for the representative to choose. Then a blank data entry screen will appear, prompting for the data that needs to be verified. This would always include prompts for an account number and a PIN, and depending on the account type, it may also include a prompt for a Sphere ID (with appropriate wording based on the account type). Upon submittal of the prompted-for data, the application will call the management system Data Verification API to verify the validity of the entries and then appropriately handle the returned code.

Note that a management system subscriber can optionally set up the Data Verification Service to have the collected data and the result codes be transmitted by the Data Verification API to a data store (e.g., data store 113), where it can subsequently be off loaded (in batch) by the subscriber.

Context Specific ID (CSID) Numbers

A NID claim allows for the generation of an unambiguous substitute NID number (or "Proxy NID"), which can be sent with responses to information requests in lieu of one's issued NID. This is significant, as shielding a NID, whenever possible, has become the single most important element in protecting a person from identity theft. When an information request calls for positive personal identification, people are resistant from giving up their NID. What happens all too often is that responses to such requests are initiated with pure intent to complete, only to be aborted when one is asked to provide a NID. In such a scenario, neither responder nor requestor benefit. The use of a substitute NID goes a long way in mitigating this problem.

In view of the overall goals of the management system 130 and the services it provides, the use of a single substitute NID may have many shortcomings. For one, it provides nothing in the way of preventing one entity from the ability to share personal information with another entity when both have the same substitute NID. Though such sharing may be viewed as beneficial for some people under certain circumstances, very often, under many circumstances, it would be considered an unwanted invasion of privacy. The management system is oriented to let the individual decide what can and cannot be shared and to always let the individual know upfront the extent to which information can be shared before it is sent. To this end, instead of routinely sending a broad-based substitute NID number with responses to information requests, the management system generates and sends a personal ID number that is unique within a specific context. Such a number is aptly called a "Context Specific ID Number" (or CSID number). CSID numbers have a multitude of uses in the management system 130.

There are a number of options in the way CSID numbers can be generated. Such numbers should be assigned chaotically (e.g., having the appearance of being random but not actually random), but, for many uses, this is not a hard requirement. Always required is that within any given context, each person's CSID is unique and reproducible (e.g., for a given person within a given context, the same unique number is always produced). Reproducibility can be achieved in two ways: 1) via initial assignment and then storage of the CSID (with reproducibility being accomplished by retrieval of the stored CSID) or 2) via a deterministic algorithm (with reproducibility being accomplished by re-execution of the algorithm, making accessing the management system DBMS 110 unnecessary). In view of security issues and storage cost, method 2 (with incorporation of chaotic number assignment) offers several advantages. As such, this is the suggested method and the one that is described in this document. However, note that within both methods, there are numerous non-repeating number generation schemes that can meet the stated requirements.

Each CSID is essentially a conversion of another ID number (e.g., a NID, a NID Claim Number, a hidden personal ID, another CSID, etc.). This starting ID number ("Base Number") and an integer number assigned to the context ("Context ID" or "Context Identification") are required inputs into the management system function which generates a CSID. For most uses in the management system, each CSID number is a conversion of a hidden (non-stored) unique personal identifier (called an HUID—Hidden Unique ID), which is itself based on a unique personal identifier (e.g., one's NID, or NID Claim Number, or another number generated during the registration process).

In the management system 130, CSID numbers are generated via a deterministic non-linear algorithm which produces (over multiple calls for any given context) a chaotic distribution of non-repeating numbers. By deterministic, it is meant that the same CSID number is always generated for a given Base Number within a given context (i.e. with all other possible inputs being the same). However, for any given Base Number among varying contexts, this algorithm generates CSID numbers that vary chaotically. An example algorithm to generate a CSID number is described in further detail in the section titled GENERATING CONTEXT SPECIFIC (CSID) NUMBER. Again note that there is no requirement to incorporate the specific methods presented in these algorithms. As stated above, there are a number of options in how CSID numbers can be generated.

CSID numbers have a number of very important uses. One function is their use as primary keys for database tables which store personal identity-related data, allowing for a design where separate personal identity-related data elements can be stored in separate tables without a logical database link between them. This is a key security-related feature. Under this scheme, each table (which contains one or more personal identity-related data items) is treated as a different context, meaning that multiple, (completely different and logically unrelated) CSID numbers are used to identify the personal identity-related data of any one person. Nothing in the database (i.e. no database object) ties the separated personal identity-related data items together. To link the data associated to any one person, a call from the application code (separate from the database) is required, as the CSID generation function resides in the application code. This is an important factor in preventing prying eyes from determining which data belongs to which person, even for persons who have authorized access to information in the database of the DBMS 110 of the management system 130. As such, this is the chosen method for storing personal data in the management system. Note, however, that this is not a requirement, as the functionality of the management system can effectively be serviced by conventional data storage methods. This method is chosen because of the enhanced security it provides. An exemplary storage method is described in more detail below in the section entitled DATA STORAGE SCHEME.

Another very important use of CSID numbers is that they can be sent by the management system 130 with personal responses to information requests from outside entities. Such externally sent numbers are generated at the moment the user submits the requested information and they are not stored, in embodiments, anywhere in the DBMS 110. Not being stored in the DBMS 110 is important because, short of access to the exact decryption algorithm and various hidden input parameters, these numbers cannot be used as a link back to any personal information that is stored in the DBMS 110. And since they vary greatly in chaotic fashion for any given person among different contexts, they essentially cannot be used to link a given person from one context to another. They can, however, be used to link multiple interactions to the same person within a given context (even if the actual identity of the person is never revealed to the information-receiving entity).

The "context" (of an externally sent CSID number) essentially defines the boundaries within which multiple transmittals of personal information from the same person can be linked together by receiving entities. It is identified by a description and is assigned a unique Context ID (hereinafter "CID" or "context identification") number. A context can be very limited—for example, one online survey by a specific organization over a specified time period. Less limited would be a specific marketing campaign (by the same organization) which includes a series of online surveys. A broader context would be all marketing-related personal information requests from that organization. Broader yet would be an organization-wide context, which could include a variety of personal information disclosures (e.g., job applications, surveys, online purchases, complaints, etc.). An important aspect of this approach is that for any given CID, multiple transmissions of personal information from the same person can be linked, but information transmitted via different CID numbers cannot be linked—even if it is sent to the same entity or stored in the same database (i.e. unless the information sent via each of the different CID numbers includes a common personal identifier such as a driver's license number or a NID).

The context possibilities for CSID numbers are virtually endless. Basically any entity that requires or seeks personal information can be classified by (or included in) one or more CID numbers. Context examples include any organization, any individual, any industry, any initiative, any campaign, etc. (e.g., businesses, trade associations, charities, government agencies, unions, fraternities, community initiatives, political campaigns, fund-raising campaigns, online chat rooms, etc.). And more limited contexts can always be formed by further bounding defined entities by specific activities, geographic regions, time periods, specific purposes, etc.

In embodiments, there are 3 important policies that should be enforced regarding externally sent CSID numbers:

1) Provide no ability to the user population to use a CSID to extract information from the management system 130, specifically from the DBMS 110.

2) Never allow a CSID number to be sent without the owner's approval, which can be provided via a logged-in management system session.

3) Allow only the target of an externally sent CSID to send information back to the owner of a CSID (e.g., via email), and only if approved by the owner (i.e., a registered user having a user account in management system 130).

In enforcing these policies, externally sent CSID numbers have no value outside of their specific targeted purpose. As such, these numbers need not be hidden or guarded. And because externally sent CSID numbers are not stored anywhere in the management system database by DBMS 110, no management system security is ever breached by their disclosure. Even complete internal access to the database (authorized or unauthorized) would not be sufficient to link an externally sent CSID to personal information stored by the DBMS 110.

Receiving a CSID number with responses to information requests enables information requestors to link responses (within the same context) that belong to the same person without the information requestor needing to have any identity-related details about the person. That is, no name, address, email address, or even the smallest hint as to the identity or domicile of the person is necessary. CSID numbers allow for individuals to be completely anonymous. At the same time they provide the information requestor with solid assurance that the responder cannot impersonate someone else, as each time the same person responds to an information request within a given context, the same CSID number is generated. So even in cases where an individual submits multiple widely divergent responses to requests (that share the same Context ID), the information requestor will always be able to link those responses as belonging to the same person. Also, in cases where it is very important for a requesting entity to receive no more than one response per person (e.g., for certain online opinion polls, votes, etc.), the CSID number provides this control as well, and does so without the requirement of any identity-related data to be sent.

Of course, identity-related data (NID, name, date of birth, sex, email address, etc.) is often required by information requestors. This would certainly be the case for job applications, credit applications, and several other types of information requests. In every case, however, that which is actually sent from the management system' DBMS 110 is always at the discretion and approval of the person providing the information. No personal information can ever be extracted from the management system 130 without the expressed permission of the person who owns the data. That being said, when NID, name, and/or date of birth are granted permission to be sent, the responder has no option through the management system 130 other than to send exactly that which has been registered in the user's account. As a result, the information requestor is always assured of the validity of these three items. In like manner, the information requestor is also always assured of the validity of any personal accounts, licenses, and other personal ID numbers that have been registered in the management system 130 (with the cooperation of issuing organizations). The process of registering personal accounts, licenses, and memberships is described above in the section "REGISTRATION OF PERSONAL ACCOUNTS, LICENSES, MEMBERSHIPS, ETC." Using the management system 130 to handle information request is now described.

Managing Information Requests

How information requests are set up and implemented can be demonstrated by the following example. Consider an organization that wishes to use management system 130 to conduct an online survey from their website. If they are not already a management system subscriber, an organization representative must go to the management system Subscriber Account Management website to set up an account. This functionality is provided by Subscriber Account Management System 107 in FIG. 1. In embodiments, to gain access to the site, the representative must be registered with the management system 130 as an individual (i.e. has claimed a NID). This is an important security feature associated with the management system 130, as it poses a big deterrent to anyone considering an attempt to misuse the system. Information requesting entities (i.e., subscribers) must be represented by people who are individually registered with the management system 130. The process of setting up a management system subscriber account is discussed in further detail below in the section "SETTING UP AN INSTITUTIONAL SUBSCRIBER ACCOUNT".

After a subscriber account is set up, an authorized individual (either the same person or someone else who is individually registered with the management system 130 and has been granted authorization to the account) must log on to the management system Subscriber Account Management System 107 and set up the service for the particular information gathering project. Here the person is prompted to identify all of the data elements that the organization wishes to collect (along with the desired prompts that will precede each data element). Then the person is required to identify the context for which the information is to be gathered. In embodiments, this context can be selected from a list of contexts already on file (having previously been defined by the organization) or a new context can be created and defined. The selected context can be identified as being very specific (e.g., limited to the current survey); or it can be broader (e.g., applying to all of the surveys conducted by the organization or perhaps applying to all information requests from the organization). Regardless, any individual responding to the survey will be made fully aware of the breadth of the context. Once a context is defined, it is assigned a unique context ID number (CID).

When all of the survey parameters are submitted, the management system assigns a unique integer number (a "Request ID Number") to the request. Note that this number can be represented more descriptively in user interfaces by the combination of the entity's Subscriber Tag (which uniquely identifies the subscriber) and the ordinal request number of that specific subscriber. For example, "ACME-PARTS-12" could be used to identify the twelfth information request composed by an organization named "Acme Parts".

Responses by individuals to information requests (from the management system subscribers) are handled via a call to a management system-provided Data Collection API 105, which can be triggered via a link on the subscriber's website, for example. A Request ID Number is sent as a required input parameter with this call.

When the user clicks on a link to respond to a request, the respondent user is taken to a management system information request site that prompts the respondent for management system logon credentials. Upon a successful logon, the Request ID will be looked up in the management system DBMS 110 and then the survey (dynamically created based on the organization's setup preferences) will be presented for the individual to complete, with certain fields being prefilled by data stored in the user's account in the management system DBMS 110. When the individual submits the responses, the appropriate CSID number will be generated and stored with the entries in a management system managed holding location (e.g., data store 113 or other data store) for the information requestor to retrieve (individually or in batch) at a later time. The CSID number and the responses will also be sent as output from the API call. This output is useful if the Data Collection API 105 was integrated into the subscriber's website and if additional code was added to the site to determine how the received data is to be handled. Such code could have the data being sent directly to a specified database 126 of the subscriber 116 or it could use the data to prefill the information requestor's own data collection form (which would likely reside on the same web page that contains the management system link).

The storage of the responses to a management system holding location (e.g., a managed data store) allows for complete management of the survey without the need for the information requestor to make any changes to their website other than providing the link to the management system service. In fact, an information requestor can set up a survey (or any other type of information request) without any interface at all from a website. One option is that they can provide the link in emails sent to targeted individuals. Another option is to just publish their unique Request ID via any fixed medium (e.g., email, newspaper, television, billboard, etc.) or even broadcast over the air via radio or in a telephone message or by word of mouth, whereupon an interested respondent would go directly to the management system site (via a logged-on session to the management system through User Account Management System 104 website) and manually enter the published Request ID. For instance, a small business, which may not even have a website, could, after signing up for the service, tape a notice on storefront windows that read something like "Now Hiring! Submit Job Application via management system 130 website using Request ID: ABC-CO-1". In this simple scenario, not only will interested applicants be presented with a familiar online form (with potentially several fields prefilled), but the business will be assured that each applicant is who they say they are (because they are registered users). Another advantage is that the form can be tailored to the specific job at hand. And all of this could be set up in a matter of minutes (with or without the help of job application templates that can be accessed via management system 130, in embodiments). And of course, these advantages apply to any entity, large or small, that chooses to use this management system service for any conceivable information gathering need. And, though an interface from the information requestor's website would usually make sense, it is not required. The personal information response process starting from either the requestor's website or a management system user account is described in detail below with reference to FIG. 8.

Figure 8:
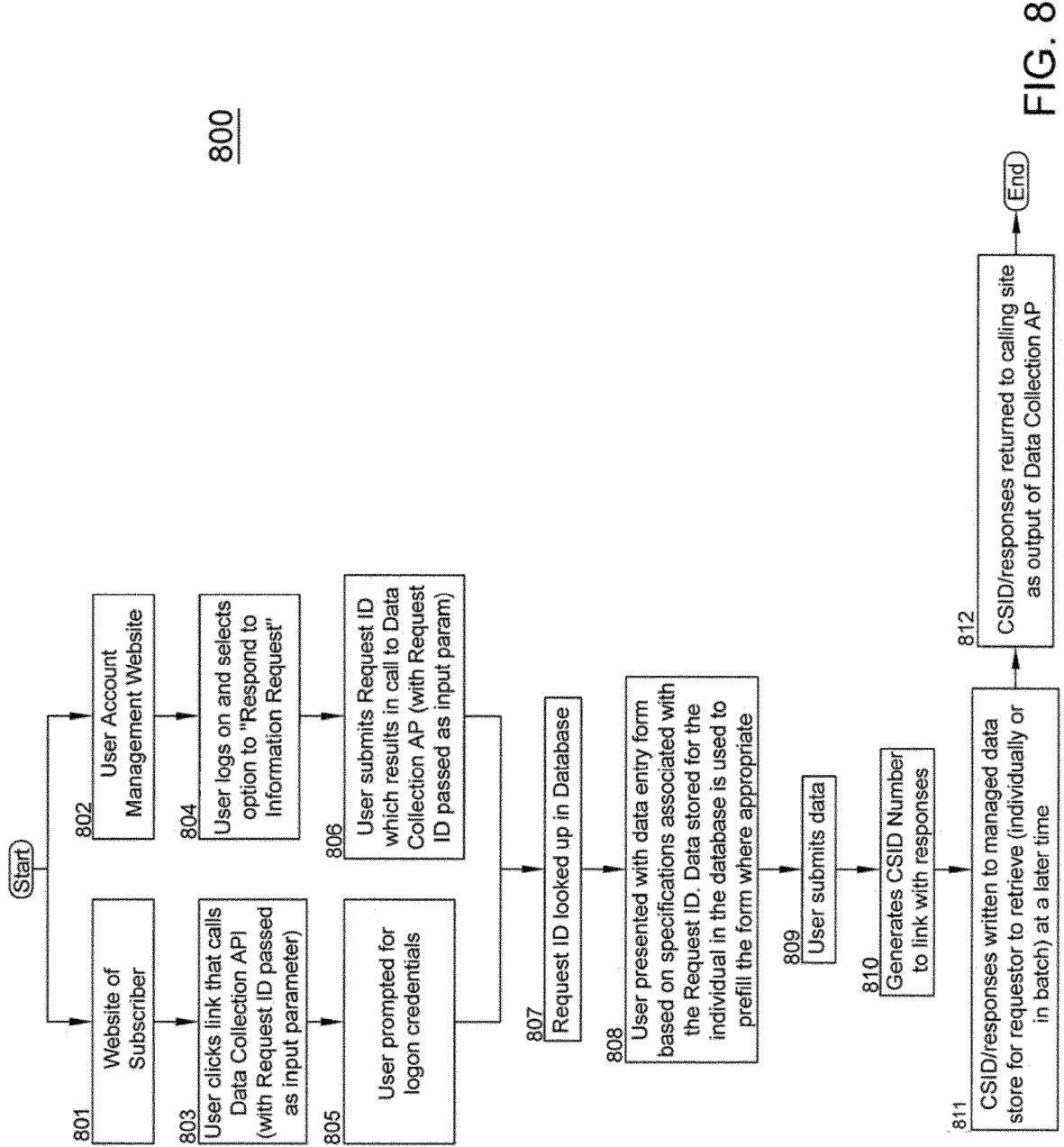
FIG. 8 is a flow diagram illustrating a process for personal information request response in accordance with some embodiments of the present disclosure.

Referring to FIG. 8, assume a system subscriber account has generated an information request that is to be responded to by a user having a user account with management system 130. At 801, user 121 accesses via communication network 117 a webpage on subscriber system 116. At 803, user 121 selects a link on the webpage of subscriber system 116 that calls Data Collection API 105 of management system 130. In various embodiments, a respective request identification (Request ID) associated with the information request is passed to the Data Collection API 105. At 805, user 121 is prompted to enter his or her login credentials for management system 130.

In an alternative flow of FIG. 8, assume the user access the management system's user account website (provided by User Account Management System 104) at 802. The user logs into the user's account on management system 130 at 804 and selects the option to "Respond to Information Request." At 806, user 121 submits the Request ID, which results in the call to the Data Collection API 105, with the Request ID passed as an input parameter. In embodiments, the user can also opt to respond to an information request from a queue of recent or archived information requests, by doing a search for an information request or by any other manner of presenting a user with an option to respond to a given information request.

At 807, management system 130 looks up the received Request ID in the DBMS 110 and retrieves the request parameters (e.g., questions and other request parameters) from DBMS 110. At 808, user 121 is presented with a data entry form based on specifications associated with the Request ID. In various embodiments, management system 130 is configured to pre-populate respective portions of the data entry form associated with the Request ID from information stored in the user's user account in DBMS 110. A CSID can be generated and included. Through the use of a CSID number, the user may respond with complete anonymity and still be linked to previous and future correspondence with the requester (given the same context). This includes the ability to provide support for the user to indicate an authorization to receive email without the need to disclose the user's actual email address, as will be described further herein.

At 809, the user 121 enters any missing data that is requested and submits the data entry form to management system 130 (e.g., by selecting complete or in any other manner of submitting the response). If the user opts to send a NID, name and/or birthdate as part of the response information, these items are sent exactly as they are stored in the DBMS 110. In order to consistently insure solid identity proofing. The altering of these items is not allowed. They always remain exactly as they were when originally registered and validated. At 810, management system 130 is configured to generate a CSID to link with the submitted data entry form responses submitted by user 121. At 811, management system 130 stores the generated CSID and data entry form responses submitted by user 121 in managed data store for example in DBMS 110, in database 113, or in another data store for retrieval by the subscriber information requester. In embodiments, at 812, the CSID and data entry form responses are returned through communication network 117 to the site that called the Data Collection API 105 as output of the Data Collection API.

Note that the management system 130 optionally accommodates the storage of much more personal information than what is collected during the registration of one's NID Number and other personal account/ID numbers. This includes home address, phone number(s), an ID picture, and varied personal profile-related data. And as the system grows, many other forms of personal data can be supported (e.g., job history, education history, medical history, etc.). What this optional data provides is a huge convenience factor in that it can be used to automatically prefill any information request forms that require such data, whether as part of a survey, as part of a commercial transaction or any other request.

An important feature of the management system information request/response process is that information requestors can opt to allow non-management system registrants to participate. When this is the case, the screen which prompts for management system logon credentials will provide an option for respondents to fill out the information request without logging in. Of course, without a logon, no CSID will be generated, and all of the features associated with it will be lost. However, this problem can be somewhat mitigated by requiring the respondent to enter an email address, which is commonly used as a substitute ID when it is not very feasible for an information requestor to get something more definitive.

Obviously, using an email address as a personal ID has its limitations, as email addresses are often shared and many people have more than one email address. Also, they can be discontinued at any time. Despite this, it is often the best that online information seekers can expect in the way of linking multiple responses from the same person.

Of course, organizations request email addresses not just to serve as an ID, but also (and often more importantly) to allow for a means of communicating back to respondents. However, asking for an email address, in and of itself, is often a big deterrent in getting people to complete information requests. It is not all that uncommon that individuals fill out a lengthy online form only to stop when they are required to supply an email address. This is because they fear that they may be inundated with unwanted emails, not just from the information requestor, but from various other entities to which they fear their email address will be "sold", "shared", or otherwise forwarded. This issue is addressed through the proxy email address described in the PROXY EMAIL ADDRESS section below.

It should be appreciated that the methodology described above, through which the management system acts as a middleman between a subscriber information requester and a registered user, can be used for any information request purpose, whether the user is to remain anonymous or not. The method can be used to conduct surveys, accept job applications, credit applications, fill in tax information, apply for a passport, VISA or other government document, to name a few.

It should be appreciated that management system 130 is configured to store various types of personal identity information associated with a user account. However, a significant advantage of system 100 is the ability to permit user 121 discretion in authorizing access to identity information in response to an information request.

Proxy Email Address

The management system 130 provides a useful solution to the above problems that people perceive with sharing an email address. It allows for individuals to request (or permit) emails to be sent to them from management system subscribers and other management system users without the need to reveal their email address, nor anything else about themselves. This is accomplished via the generation and use intermediary (or proxy) email addresses.

In embodiments, part of the management system registration process is for the individual to provide an email address (to allow for the recovery of an account when a logon credential is forgotten). The combination of a stored email address and CSID logic allows for the formation of a proxy email address that is chaotically assigned and reproducible. This proxy address is composed of a domain that identifies a server controlled by the management system (e.g., "xxx.com" by way of example) and a local-part that is made up of a user-chosen tag and a management system generated CSID. The CSID uniquely identifies an individual within a context that is defined by the combination of the tag and the domain. Essentially, the tag/domain combo is converted to a number that is inputted into the CSID-generation function as the Context ID (CID).

The tag can be any combination of characters that meet email naming standards except for a specified character (e.g., a dot) that needs to be used as a delimiter between the tag and the CSID and a few other special characters that need to be reserved to identify specific types of uses. The following shows examples of what proxy email addresses (for the same person) may look like. These examples show a dot (".") as the delimiter.

1) CAT.8462189076@xxx.com
2) CAT-1.3119874021@xxx.com
3) MOUSE-1.7250274771@xxx.com
4) MOUSE-2.4481300743@xxx.com To generate a proxy email address, a management system user need only select or manually enter a desired tag. Optionally, the user may enter a tag description, category-related data, and some address-associated handling instructions (which may be initialized to user designated default values). Included among these instructions are an "enable/disable" switch, identification of where an email sent via the proxy address should be forwarded, and limitations on email from-addresses and/or from-domains. Upon submittal, a record of the tag and the associated information is added to the user's tag list in the management system database (e.g., if not already in the list) and the proxy email address is generated. Depending on the use at hand, this address may be automatically sent to the intended entity and/or it may be presented to the user in order that it can be copied and then distributed via whatever medium is convenient.

When an email with a proxy address is received by the management system mail server 112, the CSID is decrypted to identify the individual who is the target of the email. Then the tag is searched for in the person's list of designated tags. If not found, or found but marked as disabled or there is an indication that the sending address is blocked, an "address not valid" message is sent back to the sender. Otherwise, the email is forwarded either to the designated external email address (owned by the targeted individual and retrieved from DBMS 110), management system's own internal mail system, or both, depending on the target's preferences.

When responding to an information request from a management system subscriber, the Data Collection API 105 allows a respondent to permit email correspondence from the requester via a proxy email address that is based on a preset tag that serves to identify the requesting entity. Such tags help the responder to determine the degree to which a furnished email address can be used to link past or future interactions with this subscriber. Preset tags are prefixed by a reserved special character (e.g., "$") to distinguish them from user-created tags. Offered as preset tags are the Subscriber ID, the Subscriber Request ID, and the Context ID (e.g., "CID" or "context identifier") associated with the information request.

Not only does this proxy email address scheme eliminate the need for an individual to reveal a real email address, it allows for a real email address to be changed without the need to notify any entities that have received an active proxy address from the individual. All that is needed is for the individual to mass change the forward-to addresses associated with each proxy address. And, in doing so, the person will continue to receive all of the email that had been authorized via these proxy addresses. The proxy email address scheme also discourages the "selling" or "sharing" of addresses. In addition to the ability to limit the addresses and/or domains that can send an email via a specific proxy address, the owner can also disable a proxy email address as soon as any misuse is discovered.

Taking the concept of proxy email addresses a step further, the management system 130 may also provide its own electronic mail system 112 where all mail sent via the management system proxy email addresses are sent. Such a mail system provides several big advantages over conventional email systems. For one, it allows for individuals to classify such mail (before it is sent) into one or more categories. This option is offered when a person initially grants an entity permission to send email. It is also made available from within the mail management system of the management system 130. To demonstrate, consider the following. After requesting information online from a golf equipment company, a person may classify future electronic mail from this source by setting BUCKET="Inbox"; CATEGORY1="Sporting Goods"; CATEGORY2="Golf"; PRIORITY="Medium"; and FORWARD TO EMAIL ADDRESS="No". The entity providing the email can also send (and in some cases be required to send) an expiration date as well as certain preset keywords to classify each piece of email—e.g., TYPE="Promotional"; ATTACHMENT="Coupon"; and EXPIRATION="12/31/2015". All of this just makes the management of emails (searching, deleting, moving, reclassifying, etc.) so much easier. And regardless of the "FORWARD TO EMAIL ADDRESS" setting, an individual may subsequently forward any management system mail to any other internal or external email address.

Note that the email-related services discussed above could be included in a separate system, disconnected from the management system 130 (or any other personal-identity-based system), as none of these services are dependent on the positive identification of individuals receiving them. The only dependency is an email address. Instead of being based on a unique personal identifier like a NID or a NID Claim Number, the CSID numbers included in proxy email addresses could each be based on a unique number associated with the registration of each email address.

Identity Proof Data Disclosure Tokens

Management system 130 is further configured to provide additional methods of securely passing identity information and authenticating receipt of that information. As a secure means for passing personal data and for proving one's identity, the management system 130 provides a feature for users to generate and distribute "data disclosure tokens". A data disclosure token is a text string, which when submitted to the management system Data Token System 127, which for example provides a Data Token Submittal website for receiving data tokens to allow an authorized recipient to verify and/or retrieve designated personal data associated to the person who generated the token. Data Token System 127 also provides functionality to or for User Account Management System 104 to allow a user to generate tokens and to or for Subscriber Account Management System 107 to submit tokens. These tokens vary by person, timeframe, and purpose, and, depending on the desired balance of security and convenience, can take on different formats. They can be designated for repeated use (with or without an expiration date) or for one-time use only. They can also be restricted (targeted) for use to a specific individual or entity. Targeted tokens can only be used by the targeted individual or an authorized representative of the targeted entity. In both cases, this person must be a registered user of management system 130. Untargeted tokens can also be produced. At the discretion of the provider, these tokens can be provided for use to anyone, even if the recipient is not a management system registered user. Both targeted and untargeted tokens may additionally be protected by a PIN, but depending on what data they are designated to verify or reveal, this may often not be desired. For instance, in providing a one-time-use token to quickly verify just name and age, many people would probably consider a PIN to be inconvenient and unnecessary.

Individual recipients of data disclosure tokens may be registered or unregistered users of management system 130. Data disclosure tokens enable an individual to retrieve identity information from a user account that created the respective data disclosure token via management system 130. For example, a loan officer who does not have a registered account (user account, subscriber account, etc.) on management system 130 may need identity information from user 121. Because the loan officer does not have an account with management system 130, the management system 130 does not permit an information request to be generated. However, it may be advantageous to user 121 to share identity information with the loan officer in a secure manner. User 121 may authorize generation of a data disclosure token via a data disclosure interface. The data disclosure token interface is configured to receive parameters from user 121 for generation of the data disclosure token by management system 130. The parameters may identify what identity information is permitted to be associated with the generated data disclosure token. The generated data disclosure token may be sent to the loan officer. The loan officer uses the received data disclosure token to retrieve authorized identity information from management system 130 via a webpage or online portal. As will be described below, because the data disclosure token is specific to the user 121 that authorized generation of the token, the loan officer can verify that the data disclosure token is sent from user 121 based on the parameters selected during the data token disclosure generation process. In addition, user 121 has complete discretion on specific identity information that may be authorized to be associated with a respective data disclosure token.

Management system data disclosure tokens can be easily included in online forms, email, and paper forms. And because of the availability of a very simple (abbreviated) format, they can be conveniently used when one needs to verify or supply identity-related data over the phone or in face-to-face interactions. The use of these tokens provides a valuable layer of protection from sensitive data falling into the wrong hands. And from the perspective of the recipient, they give the much needed assurance that the provider of the token is who that person says he is.

A data disclosure token will not work unless it is stored in the management system's DBMS 110 and has not yet expired. This provides intrinsic protection against counterfeiting, as the only allowable way a token can be stored is if it is created (or authorized to be created) by the person to whom the token applies.

Because data disclosure tokens must be stored in the DBMS 110 in order for them to work, they can be presented in a vast variety of formats, as long as they are each unique at any given moment in time. So the formats that are presented below are by no means fixed or exhaustive.

Figure 9A:
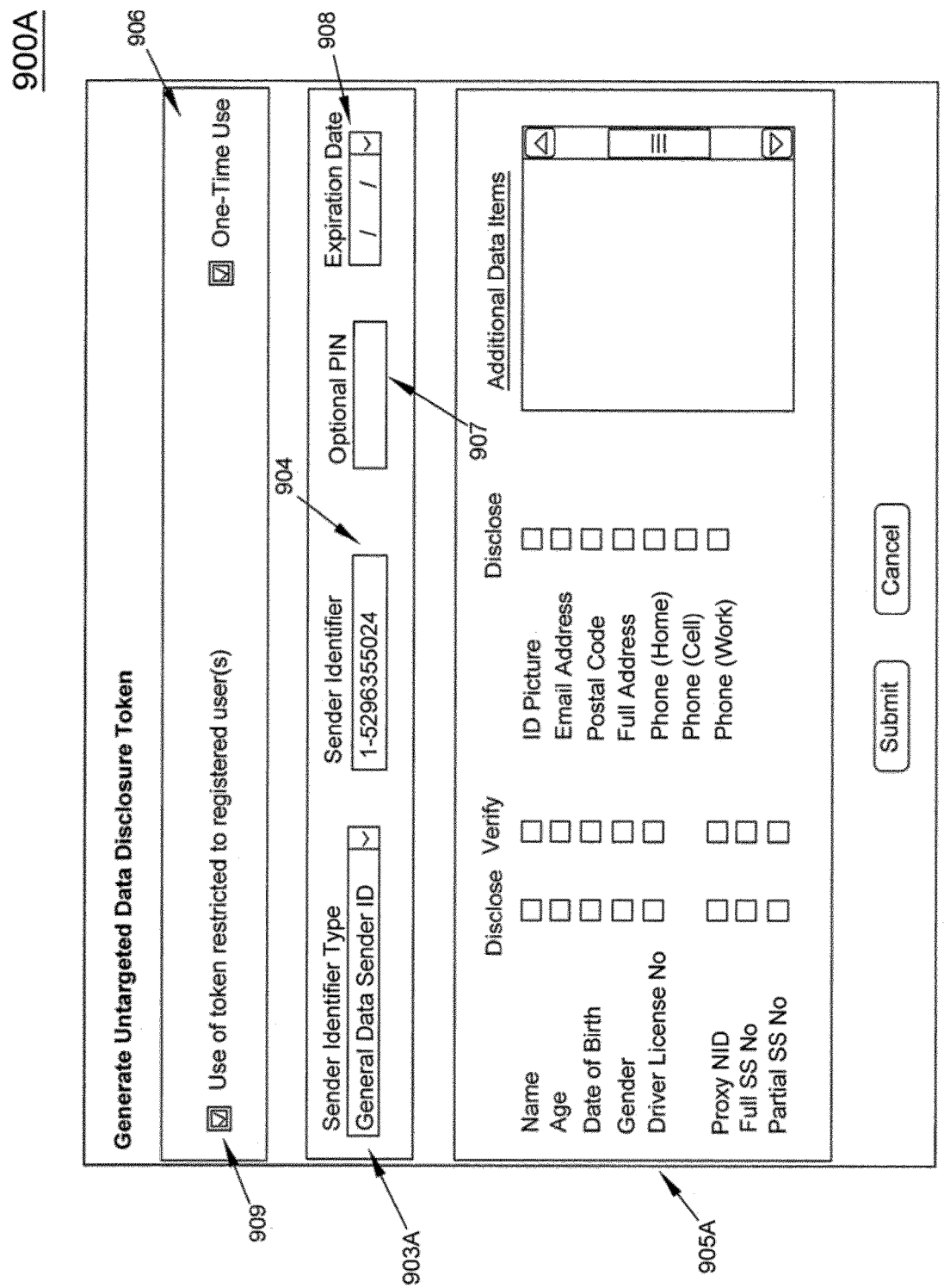
FIG. 9A is an example of a user interface for generating an untargeted data disclosure token in accordance with some embodiments of the present disclosure.

The option to generate a data disclosure token is made available within the management system User Account Management System 104. It can also be made available from an external application via an API call (that would require a management system log on). In both cases, the management system user is brought to a web page (or other portal) that prompts for the desired token type (i.e. a "Targeted Token" or an "Untargeted Token"). Then the user is presented with a user interface (UI) that prompts for options relating to the desired token. An example UI 900 for the generation of a targeted token is described below and with reference to FIG. 9.

A data disclosure token is targeted by specifying a "Recipient Identifier Type" and then a "Recipient Identifier". The Recipient Identifier Type is selectable via a drop-down list box 901 in UI 900 and the Recipient Identifier as a free-form text field 902. Recipient Identifiers can be looked up in the management system, but often they would be already known by the person preparing to generate the targeted token. In embodiments, there are 3 general recipient identifier types (though more can be added). They are as follows:

1) Subscriber ID
2) Subscriber Request ID
3) User Data Receiver ID

A Subscriber ID uniquely identifies a management system Institutional Subscriber (e.g., a business, a trade association, a union, a non-profit organization, etc.). It is prefixed by a Country Code, a delimiter (e.g., "-"), and a "$" or some other special character (e.g., "1-$976543"). The special character ("$") is used to distinguish recipient identifiers that point to an institutional subscriber. Recipient identifiers that point to an individual management system user do not include this special character.

A Subscriber Request ID uniquely identifies a specific information request from a management system Institutional Subscriber. It is made up of the concatenation of a Subscriber ID, a delimiter (e.g., "-"), and an assigned number within the Subscriber ID (e.g., "1-$976543-1", "1-$976543-2", "1-$976543-3", etc.).

A User Data Receiver ID, in its general form, is a CSID prefixed by a Country Code (e.g., "1-2672081234"). It serves to uniquely identify a management system user in the capacity to receive information from other individuals. In embodiments, every management system user has a Data Receiver ID. So, someone who wishes to receive a data disclosure token from another person would provide the sender with a Data Receiver ID. In order to get one's Data Receiver ID, a person would just select the option to "Get My Data Receiver ID" in the User Account Management System 104, and an ID will immediately be provided (e.g., displayed).

For those who may be uncomfortable with repeated use of the same User Data Receiver ID, the management system allows each individual a virtual endless supply of IDs that identify the person in the capacity to receive information. An option with "Get My Data Receiver ID" is for the individual to supply an ID modifier (which can be made up of 1 or more alphanumeric characters). Upon submittal of this modifier, the management system generates a CSID Number which is dependent on the modifier (i.e. the modifier is included in the determination of the CONTEXT that is used to generate the CSID number). As such, with each different modifier that an individual employs, a chaotically different CSID is generated. After such a CSID is generated, a "Modified User Data Receiver ID" is constructed and presented to the user. This ID is comprised of the user's Country Code, the new CSID, a delimiter, and the modifier (e.g., "1-78492929298@A1", where "A1" is the modifier).

Note that management system users and subscribers can also request a unique alphanumeric tag to be used in lieu of their Recipient ID numbers. For example, something like "1-45810972194" could be replaced with something like "1-SMITTY73" for a User's Data Receiver ID (where the "1" prefix represents the Country Code). A Subscriber ID could be replaced with the organization's name, or something close to it, preceded by a special character (e.g., "1-$IRS", "1-$CHEVY", "1-$TROPICANA"). A Subscriber Request ID could be replaced with the requested Subscriber Tag plus the ordinal request number of the subscriber ("e.g., "1-$IRS-21", "1-$CHEVY-145", "1-$TROPICANA-14"). In requesting a tag, there are 2 basic requirements. One is that the requested tag contains at least one letter of the alphabet. This is needed to allow the management system to distinguish a requested tag from an assigned ID number (which is all digits). The other basic requirement is that this tag must be unique (i.e. not already chosen) within the country identified during set up of the account. It then becomes unique worldwide by prefixing it with a country code. Take note, however, that even if these two basic requirements are met, a tag request can still be denied.

Among the reasons for such denials are: vulgarity, a potential trademark infringement, or an obvious attempt to deceive.

Note also that a Recipient Identifier can optionally be suffixed by one or more alphanumeric sub-identifiers, each separated by special-character delimiter (e.g., "1-$IRS/1040/2017", "4-$4562/MERLOT", "1-$CHEVY/MALIBU", "1-$FORD/ESCAPE/2015").

Targeted Data Disclosure tokens begin with a Recipient Identifier. In many circumstances, however, it is not necessary to provide this portion of the token, as the targeted recipient would already know what it is, and in submitting the token to the management system Data Token Submittal website (which requires a management system log on for targeted tokens), the Recipient Identifier portion of the token can be prefilled.

The Recipient Identifier is followed by a delimiter (e.g., "*") and then a Sender Identifier. A Sender Identifier is automatically provided by the management system based on the Sender Identifier Type that is desired. Described below are examples of seven sender identifier types that may be made available via a drop-down list box 903 as shown in FIG. 9. It should be appreciated that embodiments are not limited to these seven examples. They are as follows:

1) General Sender ID
2) Modified General Sender ID
3) General Sender ID Tag
4) Target Specific Sender ID
5) Modified Target Specific Sender ID
6) Target/Time Specific Sender ID
7) Target/Date Sequence Number Note that a Sender Identifier is prefixed by a Country Code only if the Country Code of the sender is different from the country code of the targeted data recipient.

A General Sender ID is a CSID that is similar in form and functionality to the general form of a User Data Receiver ID except that is used to uniquely identify an individual in the capacity to send information. Each management system user has one General Sender ID. This Sender Identifier type provides uniformity and convenience, but it does not offer as much security as some of the other types.

A Modified General Sender ID is similar in form and functionality to a Modified User Data Receiver ID except that it applies to an individual's capacity to send information. As with Modified User Data Receiver IDs, a virtual endless supply of Modified General Sender IDs is made available to an individual. When the "Modified General Sender ID" type is chosen, the user will be prompted to enter an ID modifier. Upon submittal of this modifier, the management system 130 generates a CSID which uniquely identifies the individual in a CONTEXT that is dependent on the ID modifier (i.e. the ID modifier is used in determining the CONTEXT that is used in determining the CSID). The management system 130 then generates a Sender Identifier which is comprised of the CSID, a delimiter, and the modifier (e.g., "78492929298@GOLF", where "GOLF" is the modifier).

A General Sender ID Tag is similar in form and function to a User Data Receiver Tag. It is a unique alphanumeric tag that can be used in lieu of a General Sender ID. This tag version provides even more convenience than the numeric General Sender ID, but it too does not offer as much security as other Sender Identifier types.

A Target Specific Sender ID is a CSID that uniquely identifies the individual in a CONTEXT that is dependent on the Recipient Identifier (i.e. the Recipient Identifier is used in determining the CONTEXT that is used in determining the CSTD). So for a given individual, among differing Recipient Identifiers, Target Specific Sender IDs vary (chaotically). But for any one Recipient Identifier, a Target Specific Sender ID will always be the same for a given individual. Note that in the formation of a data disclosure token, this CSID is prefixed by a special character (e.g., "$") in order to distinguish it as a CSID that is dependent on the Recipient ID (e.g., "$94793493933"). This also applies to the CSID numbers that are part of the next 2 Sender Identifier types (since they too are dependent on the Recipient ID).

A Modified Target Specific Sender ID, like a Modified General Sender ID, is a CSID combined with an ID modifier. The CSID uniquely identifies the individual in a CONTEXT that is dependent on both the Recipient Identifier and the ID modifier (i.e. the Recipient Identifier and the ID modifier are used in determining the CONTEXT that is used in determining the CSID). When this Sender ID type is chosen, the user will be prompted to enter an ID modifier. Upon submittal of the modifier, the Sender Identifier is generated. It is comprised of the CSID Number, a delimiter, and the modifier (e.g., "$51902341854@P31", where "P31" is the modifier).

A Target/Time Specific Sender ID is the current date/time combined with a CSID number that uniquely identifies the individual in a CONTEXT that is dependent on the Recipient Identifier and the current date/time (i.e. the Recipient Identifier and the date/time are used in determining the CONTEXT that is used in determining the CSTD). When this type is selected, the user will be prompted to select the desired precision of the current date/time (i.e. to the day, hour, minute, or second). Upon submittal of the desired level of precision, the management system generates a Sender Identifier which is comprised of the current date/time (down to the specified unit) and the CSID (e.g., "03/24/17*53420940042", or "03/24/17*06:30:54*30912353182").

A Target/Time Specific Sender ID is the most secure Sender Identifier type (particularly when date/time precision is down to the second). This type is particularly beneficial for use on tax return forms. It can be used in conjunction with a NID (as verification of ownership) or in lieu of it.

A Target/Date Sequence Number" indicates the order that this token was prepared for the designated recipient (among all other tokens prepared for this same recipient) on the current day. So if 321 tokens were previously prepared for this recipient and today's date is 04/20/2016, the next Sender Identifier would be set to "04/21/17-#322". Though very simple, this format still serves to uniquely identify the token to the recipient. In being simple, it lends itself very nicely for over-the-phone and face-to-face interactions (where copy/paste is not an option). Assuming the token is created right before (or during) the interaction, the token provider need only reveal the sequence number (and perhaps his/her name) to the recipient. The rest of the token (the Recipient ID and the date) will be optionally prefilled (or implied) for the recipient while logged on to the management system Data Token Submittal website (which can be left up to immediately handle such interactions). For example, consider the situation of a management system registered user applying for a mortgage over the phone to a lender which is a management system Subscriber. The applicant could generate a token with a Target/Date Sequence Number (targeted to the lender) and then just provide the number (e.g., something as simple as "6" or "23" or "655"). Obviously, this provides a huge advantage over providing a long text string, which is more likely to be misheard or mistyped.

Note that an alternate form of the above Sender Identifier type can have the number being any number that is unique for the targeted recipient on the current date. This number need not necessarily be assigned sequentially.

Upon submittal of the chosen Sender Identifier Type, the appropriate Sender Identifier will be displayed in the non-editable text box 904 of UI 900, except if "Target/Date Sequence Number" is chosen, in which case, the current date will be displayed followed by "-???" as a placeholder for the number that will be assigned (e.g., "04/22/17-???"). The actual number is generated and displayed only after the user is finished with all of the token details and clicks the "Submit" button.

Aside from the Recipient Identifier and the Sender Identifier, the only other requirement for a targeted token to be generated is for at least one personal data item to be selected for verification or disclosure through the data item selection entry area 905 of UI 900. If the "Verify" column is checked for a data item, it means that the recipient must supply a value for the item and the management system 130 will reveal if it is valid (i.e. if it matches a pre-verified piece of personal information that is stored in the user account in DBMS 110 for the individual who generated the token). The "Additional Data Items" option presents a UI for the user to attach any number of additional data items (for verification or disclosure) that may be stored in the management system database. This includes management system registered ID numbers such as Bank Account Numbers, Credit Card Numbers, Health Insurance Account Numbers, a Passport Number, etc.

Among the selectable data items presented is a "Me-To-Recipient ID" (also known as a "Provider-To-Target ID"). This is a CSID that uniquely identifies the token provider to the target (and only to the target). Each time a token is generated from the same person to the same target, the same Me-To-Recipient ID applies. However, each time a token is generated from the same person but to a different target, a different Me-To-Recipient ID applies. When disclosed, this CSID provides the targeted recipient with the ability to link previous and future tokens (and well as other types of management system data transmissions) from the same provider. This can prove to be particularly beneficial in situations where multiple communications with the same entities are the norm and ID authentication is critical (e.g., for authorizations of financial transactions; for parents/guardians in communications with schools, hospitals, day care centers, etc., for powers of attorney, estate executors, etc.).

Another selectable data item presented in area 905 of the UI 900 is a "Proxy NID". This is a CSID which uniquely identifies a person within the broad context of one's Country, just as an actual NID does.

Note that if a full or partial NID is included for disclosure or verification, the token provider must first manually enter the full or partial NID (e.g., via pop up box (not shown)). This NID entry is then verified by the management system 130 to match the registered NID on file for the person who is providing the token. This is an important security measure. In fact, this type of verification of a person's NID is required before it can be disclosed via any method. This is done to shield the NID against the possibility of someone fraudulently gaining access to another person's management system user account. Remember, a person's NID is never revealed on any management system user interface. However, if there was no requirement to enter one's NID before allowing disclosure of it, an unauthorized intruder could just include the NID in a token and then target the token to an entity to which he/she has access (either legitimately or illegitimately). Because of this required verification, a person who fraudulently gains access to a management system user account cannot gain access to the associated NID unless he/she already knows what it is. (Note that this type of forced manual entry protection can optionally be applied to other sensitive data items—e.g., Credit Card Numbers, Bank Account Numbers, etc.)

Note that the ability to generate a token that discloses only one data item can be critically useful, particularly when that one item is a NID number. For instance, when a NID number is required for completing applications online, in-person, over the phone, or via paper form, most people give little or no pause to providing all of the required information except for the NID. Being able to provide a targeted token instead of a NID can certainly relieve a lot of worry, while still being able to move along with the application process. Also, since such a token can be sent separately (via a follow-up email, phone call, etc.), even more security is afforded.

By default, a token is designated for one-time use, but this can be unchecked via box 906 in UI 900. Either way, a token's use can also be restricted by an expiration date (via box 908), but this is not a required entry. Another optional entry is a PIN, which, if entered (via box 907), is required for entry by the recipient before any data will be disclosed or verified.

Upon submittal of the desired entries, a non-editable text box containing the full token will be displayed next to the Recipient ID text box. Depending on the situation, either this full token or the Recipient Identifier can be transmitted to the targeted recipient. The following list shows examples of the different ways (identified above) that a targeted token (from the same person to the same target) may be constructed:

| | |
|---|---|
| 1-$CHEVY*98765432109 | Target*General Sender ID |
| 1-$CHEVY*84630161628@A1 | Target* Modified General Sender ID |
| 1-$CHEVY*SMITTY41 | Target*General Sender ID Tag |
| 1-$CHEVY*$83610531724 | Target*Target Specific Sender ID |
| 1-$CHEVY*$41173001252@A1 | Target*Modified Target Specific Sender ID |
| 1-$CHEVY*05/16/17*$77209614031 | Target*Target/Time Specific Sender ID |
| 1-$CHEVY*05/16/17*09:30*$98727304601 | Target*Target/Time Specific Sender ID |
| 1-$CHEVY*05/16/17-#32 | Target*Target/Date Sequence Number |

Note that in the examples above, the Sender Identifier is not preceded by a country code. A country code prefix to the Sender Identifier's required only if the sender is registered in a different country than the target (e.g., "1-CHEVY*2-39912456726")

If a PIN is required it can be given separately to the recipient or it can be attached to the token, delimited by a "/" or some other special character (e.g., "1-CHEVY*DOC41/123"). Likewise, when the recipient submits the token to the management system Data Token Submittal Website, the PIN can be entered separately or it can be attached. In essence, a PIN is part of the token. As such, the management system supports multiple active instances of the same base token as long as they each have different PIN assignments.

All of the details regarding a generated token are stored in the management system DBMS 110 and remain there at least until the token expires. Unused one-time-use tokens that have no specified expiration date should expire automatically after a specified time period, but how much time that should be must be determined by those who administer the system.

Note again that a token will not work unless it is stored in the database and has not yet expired. This provides intrinsic protection against counterfeiting, as the only allowable way a token can be stored is if it is created by the person to whom the token applies. Also, since valid targeted tokens will not work for anyone other than the designated target, an individual's personal information is solidly shielded through the use of data disclosure tokens. And restricting such tokens to one-time use and/or having a PIN attached to them provides even more security.

As stated in the beginning of this section, a management system user also has the option to generate Untargeted Data Disclosure Tokens. When this option is chosen, the user is presented with a UI that prompts for options relating to the generation of this type of token. This embodiment is further described below in reference to FIG. 9A, which shows a UI 900A that is identical to UI 900 in many respects. As such, like reference numbers are used for selectable input items shown in UI 900.

In the UI 900A used to generate Untargeted Tokens, there are no prompts regarding identification of or to a targeted recipient. Instead, there is a check box 909 indicating whether use of the token is restricted to the management system registered user(s). Otherwise, this UI is almost identical to the UI 900 used to generate Targeted Tokens. One difference is that the Sender Identifier types are restricted to the 3 "General" types (which are not dependent on a target) in drop down box 903A. The only other difference is that a checkbox for "Me-To-Recipient ID" is not included in the list of data items that can be sent, as selected in area 905A.

With Untargeted tokens, the generated token is identical to the Sender Identifier (plus a PIN if one is entered). The following list shows examples of the 3 different ways that an untargeted token (from the same person) may be constructed:

| | |
|---|---|
| 1-98765432109 | General Sender ID |
| 1-84630161628@A1 | Modified General Sender ID |
| 1-SMITTY41 | General Sender ID Tag |

Obviously, untargeted tokens are far less secure than targeted tokens, as anyone could try a number to see if it produces a hit of a valid (unexpired) token. Also if someone knows another person's General Sender ID or General Sender ID Tag, they could try to see if either one of these is valid at the time. Depending on how untargeted tokens are used, however, security may often not be much of a concern. For instance, when a token is generated just to provide proof of one's name and age, most people would not worry about this falling in the wrong hands. And for many, disclosure of items such as home address and phone number may not typically be much of a concern either. After all, this type of data is often available to others via a simple web search. In many circumstances, the primary reason for providing a data disclosure token is to provide proof of one's identity, and not necessarily to shield one's identity.

Of course, when security is a concern, particularly when sensitive data (e.g., a NID, a credit card number, a health insurance ID, etc.) is designated for disclosure, one should take extra precaution. If the token can be targeted, then it is better that it is targeted. But targeted or not, when security is a concern, choosing a "Modified General Sender ID" as the Sender Identifier and/or adding a PIN can make a big difference. Also, just specifying one-time use can greatly enhance the security of a token, particularly when the token is being used right after it is received. Another help is that when use of a token is chosen to be restricted to registered management system users only (the default choice), the token provider will have access to the name of the person(s) who used (or attempted to use) the token. This, in and of itself, may prove to be a deterrent for many would-be snoopers, particularly to those who are personally known to the token provider.

Submittal of Data Disclosure Tokens

Data disclosure tokens can be submitted one at a time or in batch. For one-at-a-time token submittals, the recipient of a token would navigate to the management system Data Token Submittal Website. Here, the submitter will be presented with a prompt to enter the token string. If the token requires the submitter to be a management system user, a management system log on will be required unless the submitter is already logged on (which is automatic if the submitter navigated to this site via a link from a logged-on session of another management system site—e.g., the User Management System 104 or the Subscriber Management System 107). If already logged on, the UI may help with the entry of the token (e.g., prefill portions of the token if appropriate). When the token is submitted, the management system will check if it is stored in the management system DBMS 110, that is has not expired, and whether the submitter is authorized to use it. If any of these conditions is not met, the submitter will be notified that the token is not valid (with potentially a reason why). If all three conditions are met, the submitter will be presented with a UI identifying the values of all of the data items designated for disclosure. If any items were designated "Verify", a prompt will be presented for each. For each value (to verify) entered, the management system will indicate whether it matches the verified value for that item entered for the token provider in the associated user account of the management system DBMS 110.

Note that the UI presented upon submittal of a token by the recipient will always show the date/time that the token was generated. This is important. In the case where the recipient of a token feels a need for making sure that the person who provided the token is the same person who generated it, a new or refreshed token can be requested. The new or refreshed token will show a new date/time, and thus assure the recipient that the token did indeed come from the same person who generated it. (A refreshed token is the same token with a new generation date/time stamp and possibly with changes to the data item disclosure/verify mix and/or the expiration date.)

Batch submittals are supported via a data disclosure option available in both the management system User Account Management System 104 and the Subscriber Account Management System 107. Among the input formats that can be supported is a CSV file, where each line would contain one token and a name/value pair for each data item that was designated by the token provider as "Verify" instead of "Disclose". (However, it is anticipated that rarely will "Verify" name/value pairs be included, as it would typically not make sense in situations where tokens are to be submitted in batch.) Output can be sent directly to the management system database upon which it can be viewed and/or converted for export (e.g., to a CSV file, with each line containing a token and the associated data item name/value pairs).

Since all active tokens are stored in the management system DBMS 110, a management system user can request batch submittal of currently valid targeted data disclosure tokens (targeted to that user or to the subscriber entity that that user represents) without the need for an input file. The management system 130 provides a utility that lists all currently valid targeted tokens, from which the user can selectively choose for submittal (including submittal of just one at a time) and then subsequently view and/or export. Such a facility, however, could not reasonably apply to untargeted tokens. They must be individually entered directly into the management system 130 or into an input file.

Identity-Authenticated Time Stamped Signatures

The logic behind the construction and use of Context Specific ID Numbers (CSID Numbers) provides the management system 130 with a ready-made means to allow registered users to produce identity-authenticated time stamped electronic signatures. Such signatures may be programmatically attached to management system generated documents and emails. They may also be programmatically attached to externally generated documents and emails via integration of a management system API, shown as Signatures API 128. In the absence of such an API, a simple copy/paste procedure can be employed. Every signature generated by the management system 130 is guaranteed to be unique (worldwide), with each one identifying a specific person at a given moment in time. Also, the "digital signature" requirements of positive identification of the signer, verification of the integrity of the signed document (or message), and protection against signer repudiation are all supported without the need for public/private key pairs and a third party certificate authority.

A management system-generated electronic signature is composed of a country code, a CSID, a time stamp, optional attributes (e.g., identification of the signed document), and, unless the signer chooses to be anonymous, the signer's full name. The CSID (called a "Signature-Associated CSID") identifies the signer in the context that is the country code, the time stamp, and each of the optional attributes (i.e. it is formulated based on the combined makeup of each of these elements). An additional CSID, which uniquely identifies the signer to the targeted recipient, can optionally be included in lieu of, or in addition to, the signer's name. For any given person, this additional CSID (called a "Provider-To-Target CSID" or "Me-To-Recipient ID") would be the same for every signature that is designated to the same target. Note that this additional CSID is not included in the formulation of the Signature-Associated CSID.

Presented in this section are examples of what a management system-generated signature may look like. However, how each component of the signature is presented, the order in which each component appears, and the chosen delimiters may be modified, in embodiments. There is also flexibility in the precision of the time stamp. It can be to the day, hour, minute, second, or a fraction of a second (or to any other useful unit of time). In embodiments, a management system signature can also be formulated with no time stamp.

In its simplest form (the base form), a management system time-stamped signature may look like one of the following 2 examples, which are equivalent but have a different format in representing a time stamp of "03/04/2016 13:04:01" (which appears just before the name).

1-8N061C3-160311:130401:6 John P. Jones
1-8N061C3-163B:D0F16 John P. Jones

Depending on user preference regarding the tradeoff between readability and brevity, either of these 2 time formats can be used. The first example shows the time stamp in "yyMMdd:HHmmss:Z" format. The 2nd example follows a shorter "yyMd:HsssZ" format whereby the month ("M"), day ("d"), and hour ("H") are each identified by one base-36 digit. The "sss" represents the # of seconds (in base-16) past the top of the hour. The "Z" in both formats represents a 1-or-2 character code that identifies the time zone (a "6" in the examples above). Including the time zone insures that there is never any ambiguity regarding the exact time that a signature is generated.

Of course, a number of other time stamp formats could be used, either more readable or more condensed. However, being fairly easy to decipher visually, at least to the day or to the hour, is typically desirable.

The signature begins with the signature provider's Country Code, which is designated by 1 or 2 alphanumeric characters (followed by a dash). This is followed by the provider's Signature-Associated CSID (converted to base-36), which, in being coupled with the Country Code, uniquely identifies the signature provider (worldwide) at the moment in time specified by the time stamp. The time stamp, coupled with the country code, provides the context from which the CSID is determined. Every new second translates into a new and unique numeric Context ID (CID). And every new CID results in the generation of a completely different (chaotically assigned) Signature-Associated CSID for any one given person. So in using the above example, a change of one second would result into something like the following for the person named John P. Jones (using the abbreviated time stamp format):

1-1P3HWV7-163B:D0F26 John P. Jones (03/11/2016 13:04:02)

The last part of the time-stamped signature is the management system-registered name of the signature provider. When a signature is submitted for verification by a recipient (a service provided by the management system 130 through Signature API 128), this name is compared to the name stored in the management system database for the individual identified by the Signature-Associated CSID. If they match, the signature is verified as VALID.

The ability to generate a time-stamped signature is made available within the management system User Account Management System 104 as a standalone option (which uses the functionality of the Signatures API 128) and when using the management system 130 to construct either a document or an email. It can also be made available via an API call from an external application. Such a call would require the successful entry of management system logon credentials (as previously described herein in connection with other functionality) before allowing a signature to be generated.

When opting to generate an electronic signature, the user will be presented with a UI with prompts for signature-related options. This embodiment is described below in reference to FIG. 10, which shows UI 1000.

Defaulted on the UI 1000 in FIG. 10 are the short time-stamp format and the option to have the signature presented on 2 lines (as shown in selectable "options" area 1003 of the UI 1000), which is often more appropriate for how it will be displayed in an email or a document. Also defaulted is the limitation that the ability to verify the validity of a signature be restricted to management system registered users. If these defaults are desired (with no other options) the user need only click the 'Submit' button. Upon submittal, a signature will be appropriately placed in either the current email or document, or it will be displayed to the user, upon which it can be copied/pasted to a desired location (or even hand written to a paper document). The following is an example of what such a signature may look like:

1-1P3HWV7-163B:D0F26
John P. Jones

With the exception of the options already discussed and some options relating to the signature provider's name, the exercise of all other options result in additional characters being added to the signature, with each option being identified by 1 or 2 special characters. These options and their suggested option identifiers are as follows:

| | |
|---|---|
| 1) Target a specific person or subscriber entity as the signature recipient. | \> |
| 2) Link additional ID-related data items to the signature. | \& |
| 3) Link a document prepared by the signature provider. | \^ |
| 4) Include date range identifying period that the signature is in force. | \~ |
| 5) Include a memo. | \* |
| 6) Link a stored memo. | \MEMO |

Option 1 applies only to entities that are stored in the management system database and are identified by a unique ID number. This includes ID numbers that identify, or are associated with, a specific management system user or a specific management system subscriber. To include this option, the signature provider must first select (through target information selection area 1001 in the UI 1000, specifically a first pull down box 1004) the Country Code of the intended target (defaulted to Country Code of the signature provider) and then a code indicating the target ID type (via pull down box 1005). Currently included among the ID type codes are the following:

U— User Data Receiver ID
S—Subscriber ID
R—Subscriber Request ID
D—Subscriber Document ID
UD—User Document ID A User Data Receiver ID is a CSID that serves to uniquely identify an individual in the capacity to receive information and/or signatures from other individuals. Someone who wishes to receive a signature from another person can provide the other person with a Data Receiver ID. This allows the sender to specifically target the receiver, thereby permitting only the designated receiver to view any personal information that may be attached to the signature (via Option 2 and/or Option 3). Because a Data Receiver ID is used only in the capacity to receive information, it need not ever be hidden or guarded. In order to get one's Data Receiver ID, a person would just select the option to "Get My Data Receiver ID" in the management system User Management System, and an ID will immediately be displayed.

For those who may be uncomfortable with repeated use of the same Data Receiver ID, the management system allows each individual a virtual endless supply of such IDs. An option with "Get My Data Receiver ID" is for the individual to supply an ID modifier tag (which can be made up of 1 or more alphanumeric characters). Upon submittal of this modifier, the management system 130 generates a chaotically different CSID Number (which is dependent on the person and the modifier, and is unique among all other Data Receiver IDs with the same modifier). The Modified Data Receiver ID is then comprised of the new CSID, a delimiter, and the modifier (e.g., "78492929298@A1", where "A1" is the modifier).

Note that management system users can also reserve a unique alphanumeric tag to be used in lieu of their Data Receiver ID. For example, something like "45810972194" could be replaced with something like "SMITTY73". In reserving a tag, the only requirements are that it be unique (i.e. not already reserved) and that it contains at least one letter of the alphabet or a special character. This second requirement allows the management system 130 to distinguish a tag from an assigned Data Receiver ID number (which is all digits).

When a signature provider submits a User Data Receiver ID as a target, the management system will convert the ID to a "Target-to-Provider CSID", which uniquely identifies the target to the provider (and only to the provider). It is this CSID that will be included in the signature. It will be the same in every signature generated by the same provider to the same target (regardless of which Data Receiver ID is used).

A Subscriber ID uniquely identifies a management system Institutional Subscriber (e.g., a business, a trade association, a union, a non-profit organization, etc.).

A Subscriber Request ID uniquely identifies a specific information request from a management system Institutional Subscriber. It is made up of the concatenation of a Subscriber ID and a sequentially assigned number within the Subscriber ID (e.g., "976543-1", "976543-2", "976543-3", etc.).

A Subscriber Document ID is a unique 2-part number assigned in the management system Subscriber Management System via an option which allows a subscriber to prepare a document (e.g., a policy statement, a customer agreement, etc.) that can be signed by the preparer and other management system registered users, or that can be referenced (for acceptance) in an external signature (as in the scenario currently being presented). Like a Subscriber Request ID, a Subscriber Document ID is made up of the concatenation of Subscriber ID and a sequentially assigned number within the Subscriber ID.

A User Document ID is similar to a Subscriber Document ID except that it applies to a document prepared and owned by an individual user instead of a subscriber. Essentially, the same document preparation option described above for subscribers is also made available for individuals in the management system User Management System. A User Document ID is displayed when creating, viewing, and editing a document. It is made up of the concatenation of a User Document Preparation ID and a sequentially assigned number within the User Document Preparation ID. A User Document Preparation ID is a CSID that serves to uniquely identify an individual in the capacity to prepare documents that allow for signatures.

The management system-prepared documents that are made available for signature are stamped with a unique document ID and a date/time of last update. Once a document is made available for signature, the management system 130 locks it from changes and then algorithmically generates a hash that maps to the contents of the document. This hash is stored in an electronic medium separate and hidden from the document. It is reserved to verify that a document has remained unchanged since being made available for signature.

When a signer opts to target (and thus include) a document ID in a signature, a special key is added to the signature (prefixed by "/" or some other identifier). This key is essentially a hash that maps to the concatenation of the stored document-associated hash and all elements of the signature other than the Signature-Associated CSID. As such, this key algorithmically ties the signature to the document contents. The length of this key is offered as an option to the signer, but a minimum key length may be preset by the document preparer. It can be as long as deemed necessary, allowing for the desired balance between signature brevity and protection. The longer the key, the more protection it affords in preventing signature forgery and in ensuring document text integrity. Essentially, if this key does not correctly map to the document-associated hash sometime after signature creation, it indicates that the document contents have changed. Even if the document-associated hash has been corrupted or deleted, this key is still useful in ensuring document text integrity because the document-associated hash can be regenerated. In this case, if the key maps correctly to the regenerated hash, then it is highly likely (depending on the length of the key) that the document contents have not been changed since signature creation. If the key does not correctly map, then it is known with complete certainty that the document contents have changed.

Once a target ID type is selected the signature provider must then enter (or select via a drill-down feature 1006 in UI 1000) the specific ID number to be targeted.

The target identification option is identified in the signature by the addition of its option indicator, "\>", followed by the concatenation of the ID type, the Country Code of the targeted entity (but only if it is different from the Country Code of the signature provider), and the specific ID number that is being targeted (converted to base-36). If a Country Code is included, it will be prefixed by a colon or some other delimiter (e.g., "\>S:3"). The specific ID number is preceded by a dash. In extending the previous example (with the same provider and the same time stamp), the following shows examples of what the addition of each type of targeted recipient could look like. (For the sake of brevity, the name, "John P. Jones" is not shown beyond the first example.)

1-R6U72B4-163B:D0F26\>S-XY13U (targets of subscriber)
John P. Jones
1-73A4G93-163B:D0F26\>R-XY13U-67 (targets info request from same subscriber)
1-XP8JWT5-163B:D0F26\>D-XY13U-Y63/A23C78P19 (targets doc created by same subscriber; Special key="A23C78P19")
1-443U72L-163B:D0F26\>U-136Y21 (targets a registered user)
1-7F25H34-163B:D0F26\>UD-J56J890-12/4HD1 (targets document created by a registered user; Special key="4HD1")
1-E5Y87R6-163B:D0F26\>U:3-Y7617 (targets a registered user in another country; Country Code="3")

Though each of these signatures apply to the same provider (i.e., John P. Jones), notice how the Provider Signature-Associated CSID Number changes (from "1P3HWV7" in the previous example without a targeted recipient to "R6U72B4" in the first example that includes a targeted recipient to different values for each different type of targeted recipient). Key to the security and integrity of these signatures is that every character in the signature (between the Signature-Associated CSID and the signature provider's name) has a significant effect on the value of the Signature-Associated CSID. (We already saw this with changes to the time stamp.) Each additional character that is added results in a different Signature-Associated CSID. This is done to make sure that no one can make any changes to finished signature without rendering it INVALID. When an altered signature is decrypted it would result in a CSID that is different than the one that is contained in the signature, and this mismatch provides the necessary flag that the signature has indeed been changed.

For the base form of a signature it was indicated that the time stamp, coupled with the Country Code, provides the context (i.e. the CID number) from which the Signature-Associated CSID is determined. When an option is included in a signature, it provides another context (essentially a context within a context). This context is then used to convert the previously generated CSID to a new CSID. So in the example above, a numeric CID is algorithmically determined from the addition of "\>S-XY13U" to the signature. This CID, in turn, is used to generate a new CSID, with the previous CSID being used as the "Base Number" input into the CSID-generation algorithm.

This process of converting the previously generated CSID into a new CSID is repeated in similar fashion for each option that is included in the signature, making sure that every character matters in the determination of the Provider Signature-Associated CSID.

Option 2 is presented as a list of ID-related data items from which the signature provider can select one or more to be linked to the signature. This option is shown in selection area 1002 of UI 1000. In being linked, it means that when an authorized recipient submits the signature, these additional data items will be disclosed to the recipient. Six key identity-related data items may be linked to a signature. Five of these items are assigned a number which is a power of 2 (i.e. 1, 2, 4, 8, and 16). This allows for a code consisting of just one base-36 digit to represent the desired subset of these 5 data items. This is accomplished by merely adding up the 5 corresponding numbers. These 5 data items (with their assigned power of 2) are as follows:

Gender (1)
Age (2)
Date of Birth (4)
Provider-to-Target CSID (8)
Proxy NID (16)

The sum of all of these assigned numbers is 31. So a "V" (the base 36 equivalent of 31) would indicate that all 5 of these data items are linked. A "2" would indicate that only Age is linked. A "5" would indicate Gender and Date of Birth (1+4). A "B" would indicate Gender, Age, and Provider-to-Target CSID (1+2+8). Note that "Age" will always be disclosed as the age of the individual at the time the signature was created (not the age at the time the signature is submitted for verification by the recipient).

A Provider-to-Target CSID (aka "Me-To-Recipient ID") is a CSID which uniquely identifies the signature provider to the target (and only to the target). Each time a signature is generated from the same person to the same target, the same Provider-To-Target CSID applies (regardless of all other differences). However, each time a signature is generated from the same person but to a different target, a different Provider-To-Target CSID applies. Obviously, the linking of this item is available only when Option 1 is exercised. When disclosed, this CSID provides the targeted recipient with the ability to link previous and future signatures (and well as other types of data transmissions) from the same provider. This can prove to be particularly beneficial in situations where multiple signature-required communications with the same entities are the norm and ID authentication is critical (e.g., for authorizations of financial transactions; for parents/guardians in communications with schools, hospitals, day care centers, etc., for powers of attorney, estate executors, etc.). Note that in lieu of linking a Provider-To-Target CSID, an additional option is to make to it visible in the signature by including it with the provider's name (e.g., "John P. Jones—77345678901").

A Proxy NID is a CSID which uniquely identifies a person within the broad context of one's Country, just as an actual NID does.

Though a signature link to a person's NID may often be deemed not to be necessary or desired, there are applications where it can prove critical (e.g., on tax returns). As a result, NID is also supported as a data item that can be linked. However, instead of being assigned a number which is a power of 2, it is identified by 2 characters (in order to support partial NID disclosure). A "#" followed by a base-36 digit indicates that all or part of the individual's NID Number is included. The base-36 digit indicates the number of characters (from right to left) that will be disclosed. For example, for an individual who is a US citizen, "#4" would indicate the last 4 digits of Social Security Number. "#9" would indicate the entire Social Security Number.

Note that a NID is available to be linked to a signature only if the signature also includes Option 1 (i.e. a targeted recipient). Also, in order to include a full or partial NID as one of the linked items, the signature provider must first manually enter it. This NID entry is then verified by the management system to match the registered NID on file for the person who is providing the signature. This is an important security measure. In fact, this type of verification of a NID is required before it can be disclosed via any method. This is done to shield the NID against the possibility of someone fraudulently gaining access to another person's management system user account. Remember, a person's NID is never revealed on any management system user interface. However, if there was no requirement to enter one's NID before allowing disclosure of it, an unauthorized intruder could just link the NID to a signature and then send it to a target to which he/she has access (either legitimately or illegitimately). Because of this required verification, a person who fraudulently gains access to a management system user account cannot gain access to the associated NID unless he/she already knows what it is.

In extending the previous examples (with the same provider and the same time stamp), the following shows 2 examples of what adding linked data items may look like. The first demonstrates the linking of Gender, Date of Birth, and the last 4 digits of NID Number to the same targeted subscriber as in the above examples. The second shows the linking of Gender and Age without a targeted recipient. Note again how the Signature-Associated CSID changes with each change to the signature, but still identifies the same person with the same time stamp.

1-8L765P2-163B:D0F26\>S-XY13U\&5#4 (links gender, DOB, and last 4 digits of NID)
    John P. Jones—68248830419
    1-U33Y564-163B:D0F26\&3 (links gender and age)
    John P. Jones Note that the linking of additional data items can easily be supported by allowing for the addition of one or more base-36 digits, with each identifying up to 5 specific data items. Included among such items could be home address, home phone, cell phone, work phone, email address, driver license number, image of handwritten signature, ID picture, etc.

Option 3 allows for the signing of a self-prepared document, distinguishing this option from the ability in Option 1 (via target type "D" or "UD") to sign a document prepared by someone else. Since documents prepared by individual users are identified by an ID of the originator (i.e. a Document Preparation ID) along with a sequentially assigned number (within this originator ID), all that is needed to link a self-prepared document is the sequentially assigned number, as the originator is identified by the attached Name and the Signature-Associated CSID. So, with "\^" as the option indicator, "\^13" would indicate the linking of document #13 prepared by the signature provider. However, for more clarity, the signature provider can opt to have the sequentially assigned document prefixed by his/her Document Preparation ID. The following demonstrates 2 examples—one with a Document Preparation ID prefix and one without. Both examples show the special key (prefixed with "/") that maps the signature to the document. The logic behind this special key is described above under Option 1.

1-4Y721Y3-163B:D0F26\>U-XY13U\&D\^A623A61-13/8Y745
    John P. Jones
    1-778G621-163B:D0F26\>U-XY13U\&D#4\^13/9A31U
    John P. Jones Option 4 allows the signature provider to add a date range identifying the period of time to which the signature (or underlying agreement) applies. In the outputted signature, the dates are presented in the shortened "YYMD" format that can be used for time stamps. A singular date preceded by an "S" indicates a start date and an indefinite end date. A singular date preceded by an "E" indicates an end date with the start date being represented by the signature time stamp. If 2 dates are included, they are separated by a dash. The option indicator is "\~". The following shows examples of the 3 ways a date range can be represented:

1-PP781U1-163B:D0F26\&4\^8\~1711-18CV/T5R43 (01/01/2017-12/31/2018)
    John P. Jones
    1-H371890-163B:D0F26\>S-XY13U\&D#4\^8\~E16CV/7U86 (03/11/2016-12/31/2016)
    John P. Jones
    1-KTT4390-163B:D0F26\&3\^8\~S1641/R58P6 John P. Jones (starts 04/01/2016)

Option 5 allows for the inclusion of a memo to identify in broad terms that to which the signature applies (e.g., "'Subscription Renewal", "Lawn Care Contract", etc.). It can also serve singularly as a form of permission or verification for something (e.g., a parent providing some kind of permission for a child or verifying that something was completed). As with all other options, each character added has a substantial (chaotic) effect on the value of the Signature-Associated CSID. The option indicator is "\*". Also, this option is terminated by "\". A few examples are as follows:

1-68LH6E1-165F:DCD36\>U-23T67\&H\*IOU $5,500 for Ford\
    Timothy J. Smith
    1-P54H74S-163B:D0F26\>S-83G2Y\&D\*School Trip OK for Peter\
    Susan L. Peterson—32875112308
    1-K9JL998-1644:D7EE6\>S-83G2Y\&D\*Received John's Report Card\
    Susan L. Peterson—32875112308

Being able to include a memo in a signature has benefits. However, because it can significantly add to the length of a signature, it is not always practical. Option 6 (linking a stored memo) provides an alternative. It can be used in lieu of an included memo or in addition to one, and it can be as long as deemed necessary. Such a memo is displayed when a signature is submitted for verification. It serves a very important function for signatures that are not contained in (or linked to) an un-editable document or email, as it provides a vital safeguard against a person fraudulently copying a signature and attaching it to another (externally generated) document that has nothing to do with the signature provider's intended use. Like management system-generated documents, such a memo cannot be changed once it is made available for signature, and the hash/special key logic that is incorporated with management system-generated documents applies to linked stored memos as well. (See details regarding this logic under the description for signature Option 1.)

The option indicator for a linked stored memo is "\MEMO". As with targeted documents, the calculated special key is appended. The following shows an example:

1-1L88Y12-163B:D0F26\>S-XY13U\&5#4\MEMO/8XY65
    John P. Jones

Upon the signature provider's submittal of all of the desired options, the management system will generate the signature, store it in the management system database, and display it on the screen. If appropriate, the management system will also insert the signature in the location from where the request to generate a signature was initiated (e.g., in a user-prepared email or document).

Note that protection against signature forgery and signer repudiation is buttressed by the availability of a management system service whereby any two signatures can be compared and then positively identified as to whether or not they belong to the same person. So a second signature can always be requested to provide added assurance in this regard. Also available is a management system service that determines the validity of a given signature by verifying whether a regenerated Signature Associated CSID matches the one in the signature and, if so, whether it is correctly points to the name and/or the Provider-To-Target CSID that is included in the signature. Note also that if a signature is found in the management system DBMS 110, it is positive indication that the signature was generated via valid logon credentials of the person indicated in the signature. With this, the only argument left for signer repudiation would be a contention that someone else fraudulently used the person's management system logon credentials to create the signature. This scenario, however, can be prevented by requiring a response to an email (or perhaps a text message) sent automatically by the management system 130 that notifies a person of the details of a signature just after it has been generated. In such a case, validation of the signature is not complete until a response is received.

Signature Verification

The management system Signature Verification website (provided by functionality in the Signatures API/System 128) is made available to allow individuals to verify the authenticity of a signature. It can be accessed directly or from within both the management system User Account Management System 104, the Subscriber Account Management System 107 or the Signatures API/System 128). When one accesses the site, there will be a prompt to log on to management system 130 unless the site was accessed via a logged on session of another management system site. With a valid log on, the user will be prompted to enter the signature to be verified. Upon submittal, the management system 130 will indicate whether it is "VALID" or "NOT VALID" as against the signature in DBMS 110.

If the signature is valid, and there is an indication that personal data is linked to it, the management system 130 will locate the record of the generated signature in the DBMS 110. If not found (perhaps because it was purged in being past its effective date), no data will be disclosed. However, depending on the discretion of those who administer the system, the management system 130 can allow for the linked data to be verified against that with which the submitter already has knowledge of (and this can be restricted certain data items and/or to targeted signatures only). If such a feature is incorporated, the management system 130 would prompt for entry each okayed data item indicated for disclosure. Then, for each item entered, the management system would indicate whether it is a "MATCH" or "NOT A MATCH" of the corresponding item stored in the database for the person identified in the signature.

If the record of the generated signature is found in the DBMS 110, the management system will check if the person who submitted it is authorized to view the linked data. If so, the linked data will be disclosed. This check is made if the signature is targeted and the "Restrict Disclosure to Target" option was selected when the signature was created.

Note that batch verification of targeted signatures can be supported in similar fashion to the support for batch submittals of targeted data disclosure tokens. Such support can be particularly useful for the mass processing of collected electronic or paper forms which each contain a targeted time-stamped signature (e.g., the processing of tax returns by a taxing authority).

In UI 1000 of FIG. 10, note that 2 options are shown as disabled (grayed-out)—the option to "Restrict Verification to management system Registered Users" 1007, which is selected, and "Open Disclosure" 1008, which is not selected. At the discretion of those who administer the system, these options may be enabled, which would give the signature provider the option of determining whether anyone (i.e. including those who are not management system registered users) could verify a signature and/or view any data linked to it. Should this be the case, a person could attempt verification without first logging in. If the signature requires a logon it will then prompt for one. If it does not require a logon, it will immediately reveal whether the signature is valid. If the signature is determined to be valid, it will then determine whether the person is authorized to view any linked data.

Note that a record is stored for each attempt to verify a signature, which each record identifying the person who made the attempt (i.e. if a logon was required). Such records are made available to the signature provider.

Setting Up an Institutional Subscriber Account

In order for an organization to use most of the business-related services provided by the management system 130, it must be registered as an Institutional Subscriber through the management system 130. The term "Institutional Subscriber" is not intended to be restricted solely to business, formal entities, and the like (i.e., non-human entities). Rather it is intended to included human subscribers or groups of subscribers. The term "subscriber" and "institutional subscriber" is used in order to distinguish subscribers from users, where users are those that have successfully processed a claim to a NID number and registered a user account, and subscribers are those that have registered subscriber accounts (that are not associated to a claim for a NID number) in order to take advantage of the service offered by the management system 130 when interacting with users and others (e.g., for verification of personal identity information and for information gathering, e.g., as part of a transaction, survey or the other information gathering event).

Subscriber registration is made available through the online management system Subscriber Account Management System 107. This system requires user management system logon credentials to access, so the sign up must be accomplished by a representative of the organization who registered with the management system as an individual (i.e. has claimed a NID). This is an important security feature associated with the management system, as it poses a big deterrent to anyone considering an attempt to misuse the system as a subscriber.

In setting up the account, the organization representative would be required to enter general information about the organization (e.g., name, address, contact information, etc.), and perhaps some account preferences. When finished entering all of the required data, a Subscriber ID number will be assigned. This ID number uniquely identifies the subscriber within the identified country. Combined with a country code prefix, the resulting number would provide a unique worldwide identification.

The person who completed the initial set up would, by default, be assigned "ADMIN" privileges to the subscriber account. In this capacity, additional authorized users can be added to the account with specific privileges (including "ADMIN" privileges). The only requirement is that each of these additional users must also be a registered user of the management system 130. In adding a user, the subscriber ADMIN would provide a First Name, a Last Name, a PIN, and access privileges. To activate the account, the new user would have to log into the management system Subscriber Account Management System 107 (using user management system logon credentials), identify the subscriber organization and then enter the assigned PIN. With the submittal of a valid PIN, the management system would check the logged-on user's file in DBMS 110 for a match of the First Name and Last Name entered by the System ADMIN. If the entries match, the account will be activated.

In management system user interfaces, subscriber entities are identified by a unique alphanumeric tag (a "Subscriber Tag"). This tag is defaulted to the Subscriber ID number. During the setup process or anytime thereafter, a person with ADMIN privileges can request to have this default tag replaced by a more descriptive tag. For example, the requested tag could be the organization's name, or something close to it (e.g., "3M", "CHEVY", "ICI", etc.). With such tags, there are 2 basic requirements. One is that the requested tag contains at least one letter of the alphabet. This is needed to allow the management system 130 to distinguish a requested tag from a tag with an assigned Subscriber ID number (which is all digits). The other basic requirement is that this tag must be unique (i.e. not already chosen) within the country identified during set up of the account. It then becomes unique worldwide by prefixing it with a country code (e.g., "1-3M", "1-CHEVY", "23-IC", etc.). Take note, however, that even if these two basic requirements are met, a tag request can still be denied. Among the reasons for such denials are: vulgarity, a potential trade mark infringement, or an obvious attempt to misrepresent the subscriber's identity.

Exemplary Applications of the System

Several examples have been provided above, but the number of practical uses of the management system 130 and the methods implemented therethrough are virtually endless. Below are additional non-limiting examples according to various embodiments described above.

The management system 130 is designed to allow for a lot of flexibility in how things are accomplished. So the methods described below are by no means limiting. Each simply demonstrates a practical way the management system 130 can be used to solve a critical problem and/or to add convenience relating to issues associated with the transfer of information from or to individual people.

Solution to Tax Return Fraud in the United States

With being registered as a management system Subscriber, the U.S. Internal Revenue Service (IRS) can provide taxpayers with a simple, yet surefire, solution to tax return fraud. This can be accomplished simply by the addition of a line on tax return forms to allow for the entry of a management system-generated Data Disclosure Token (that, upon submittal, discloses full legal name, Social Security Number, and date of birth) and the implementation of an automated procedure to process such entries via services provided by the management system. Though many token types (or even a PIN) could be employed, a token targeted to the IRS with a Target/Time Specific Sender ID type is ideal. (Note also that a management system time-stamped signature, targeted to the IRS, can be employed instead of a token as an ideal option.)

In processing a tax return, this procedure would check the data disclosure token entry. If blank, it would call the management system NID lookup service 103 to determine if the Social Security Number (supplied with the return) has been CLAIMED in the management system 130. If not CLAIMED, the return would simply be processed as it would be in the absence of the management system solution described herein. If the Social Security Number is identified as CLAIMED, then notification would be sent to the taxpayer that a valid data disclosure token is necessary before the return can be successfully processed.

When a data disclosure token is supplied (either on the tax form or having been sent separately after being requested by the IRS) the procedure would submit the token to management system service that would return a name, a Social Security Number, and a date of birth. If these data items are consistent with that supplied on (or with) the tax form, then the person's stated identity is verified as valid. If not consistent, then the person who submitted the tax form would be notified that a valid data disclosure token is required before processing of the form can be successfully completed.

With such a process in place, validly registered users have solid protection against anyone ever fraudulently filing a tax return in their name.

Shielding Social Security Number when Needed Only by a Third Party

When a Social Security Number is requested in order to be passed to a third party (e.g., for the purpose of running a credit history or some other background check), registered users can completely shield their Social Security Number from the requestor by providing them with a data disclosure token (instead of their Social Security Number) that is targeted to the third party (i.e. assuming the third party is a management system subscriber). This can provide much peace of mind in situations where there is even a little bit of concern that a Social Security Number may be misused. For example, when someone offering an apartment for rent asks for a Social Security Number before showing the apartment (e.g., so a credit check can be run), it is not unreasonable to fear that the apartment offering may merely be a scam may to acquire one's Social Security Number.

Ability to Prove One's Identity without ID Cards

A problem with handing over a typical ID card (e.g., a Driver's License) is that it often reveals more than what is needed, and at times this may compromise one's desired level of privacy. For instance, consider an establishment that requires one to be 21 years old or older to be admitted. Handing over a driver's license provides an ID picture, a date of birth, a driver license number, a home address, and other personal details (e.g., one's height/weight) when all that is really needed is an ID picture and an indication of whether the person is over 21. The management system 130 provides a person with the ability to show just the later 2 details—either by providing a data disclosure token (targeted or untargeted) or just by bringing up the picture and an "over-21" age indication on one's internet-enabled device (e.g., smart phone). This can be accomplished very simply with the management system 130. Remember, the management system 130 supports the registration of an ID picture along with the registration of various personal ID numbers. For example, with the cooperation of a driver's license issuing agency, an ID picture on a driver's license can be registered and stored in the management system 130 DBMS 110 along with the registration of a driver's license number.

As long as there is access to at least one smart phone or any other internet-enabled device, the management system 130 provides a person with an "on-the-spot" ability to prove one's identity (in similar fashion to the case above). And, as in the previous case, it always supports restricting the sending of only that data which is needed for the purpose at hand. This essentially can render the need for many types of ID cards unnecessary in situations where there is access to an internet-enabled device. Note also that only the provider of the ID-related data need be a registered user of the management system 130, as the provider can show the necessary data via a management system logged-on session or by providing the requestor with an untargeted data disclosure token that can be successfully submitted to a management system service by a non-management system registered person.

Hotel Security

A common method for thieves or violent predators to gain unauthorized access to a hotel room is to simply go to the front desk and ask for a key, saying that they lost their key or that it was mistakenly left in their room. When asked for identification, they merely state that their wallet (or purse) was left in the locked room as well. Registered users of the management system 130 can be protected from this scenario. It can be a matter of hotel policy to ask people when they check in whether they are a registered user of the management system 130, and if so, to mark them in the guest registry as such. Even if the clerk forgets to ask, he/she may be able to determine user registration status by querying the person's supplied credit card number (or driver's license, or hotel rewards card number, etc.) in the management system 130 (as the hotel is a Subscriber to the management system 130). If such a number is registered in management system 130, then the person has to be a registered user.

With this hotel policy in place, whenever someone asks for a room key, the hotel clerk can check to see if the requested room number was booked by a registered user. If so, the clerk can require that the key requestor prove their identity via management system 130, which can be accomplished with the availability of any internet-enabled device, including a smart phone. If the person cannot provide such proof, then a key should not be supplied.

Control of Petitions

Forgeries and duplicate signatures on a petition can be prevented by a requirement to sign a petition with a management system time-stamped signature that includes a Me-To-Recipient ID.

By including a Me-To-Recipient ID (which uniquely identifies the person to the recipient), a person's name does not need to be included with the signature. This allows people to sign a petition anonymously, yet still provides the necessary control to prevent forgeries and duplicate signatures.

Target Marketing/Alerts

By allowing Subscriber Organizations to define a query based on general demographic data stored in the management system DBMS 110, the management system Mail System (e.g., mail server 112) provides a convenient vehicle for organizations to send emails to a select group of registered individuals without having any email addresses or any other specific person identifying data. For example, the management system 130 can allow an organization to send an email to all registered people in a specific geographic region, or to all registered males, ages 25-35, who reside in a specific geographic region. Note that such queries do not identify specific individuals.

In embodiments, registered users can option out of receiving such unsolicited emails. Alternatively, they can receive them directed to their management system mail address, but not their external email address. If they allow such email to be sent to their management system mail address, they can appropriately categorize them so as to manage them better. In any event, the management system can provide the subscriber organization with statistics on how many people met the criteria, how many emails were sent (not blocked), how many management system mail deliveries were forwarded to an external email address, and how many management system mail deliveries were opened.

Note that such emails sent by subscriber organizations can direct recipients to a management system Request for Information, either by providing the management system Request ID or by providing a link. Alternatively, these emails can provide a management system supported link that, when clicked, sends a "Received and Read" notice and (optionally) a Context Specific ID back to the subscriber organization.

This feature can also be useful for the sending of public service announcements and alerts.

Generating Context Specific (CSID) Number

A Context Specific (CSID) Number is essentially a conversion of another ID number. This starting ID number ("Base Number") and an integer number assigned to the context ("Context ID") are the critical inputs into the management system function (e.g., algorithm) which generates a CSID.

In embodiments, CSID numbers are generated via a deterministic non-linear algorithm which produces (over multiple calls for any given context) a chaotic distribution of non-repeating numbers. By deterministic, it is meant that the same CSID number is always generated for a given Base Number within a given context (i.e. with all other possible inputs being the same). However, for any given Base Number among varying contexts, this algorithm generates CSID numbers that vary chaotically. This embodiment is described below in reference to FIG. 5A and FIG. 5B.

Note that this algorithm has, by design, a lot of flexibility built into it. This allows for significant variation among different contexts and/or context types. It also allows for a thorough description of how the algorithm works without completely giving up what may actually be implemented. Not giving up one or more (even minor) implementation details can go a long way in preventing a would-be hacker from making a successful attempt at decryption. The detailed prescription that follows is completely sufficient for the job at hand, and can be used as is. But opportunities for variation, while maintaining the clearly stated requirements of the algorithm, are intended to be obvious.

Figure 5A:
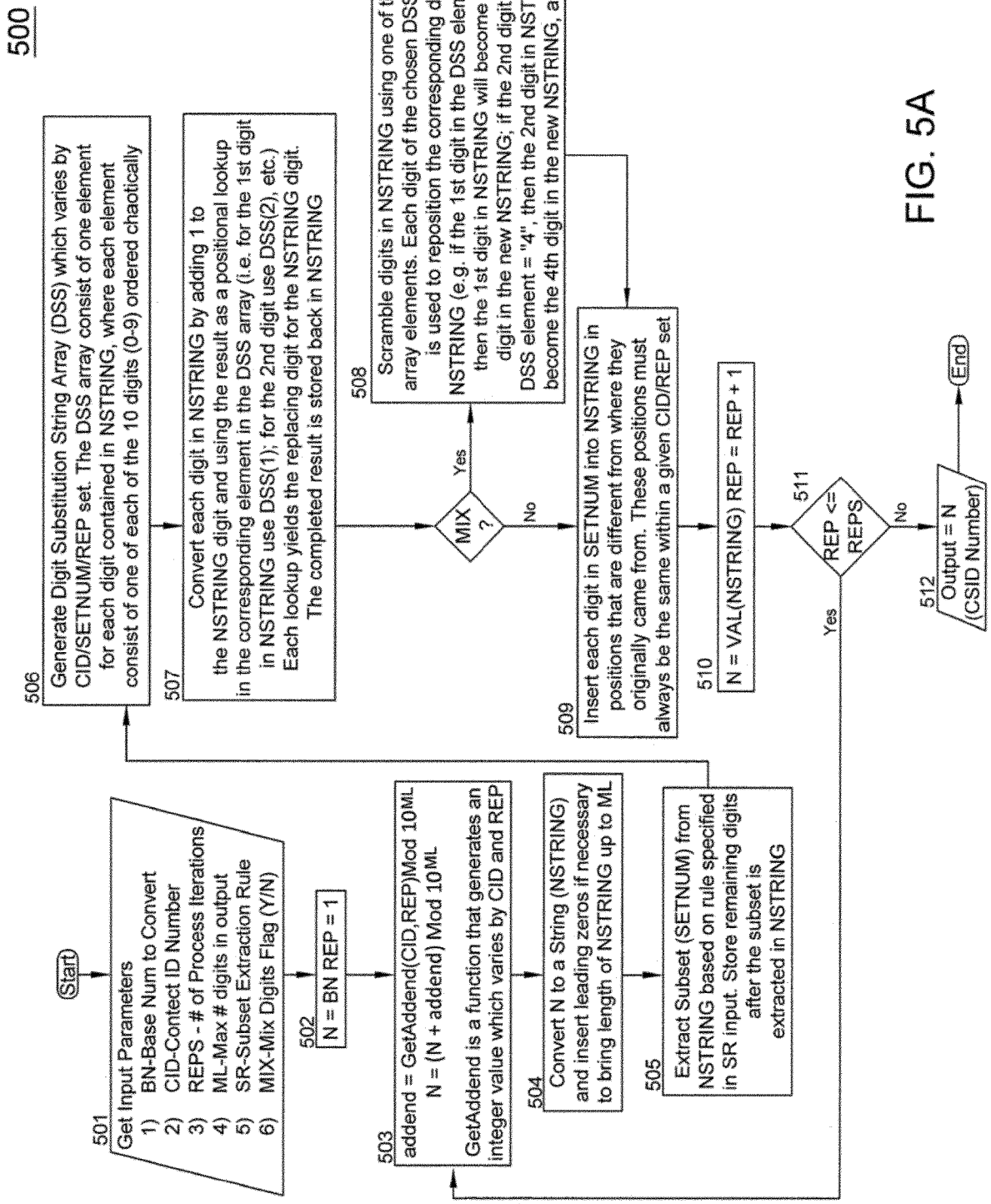
FIG. 5A is a flow diagram illustrating an example algorithm for generating a context specific identification in accordance with some embodiments of the present disclosure.

FIG. 5A is a flow diagram illustrating an example algorithm 500 for generating a CSID in accordance with some embodiments of the present disclosure. The algorithm 500 used to generate a CSID number receives six input parameters at 501:

1) BN—Base Number (integer) to be converted
2) CID—Context identification—an integer which uniquely identifies the context
3) REPS—Number of iterations of the conversion process to execute (with each iteration being referred to as a "REP"). On the first REP, the Base Number is converted. On the second REP, the result of the first REP is converted. On the third REP, the result of the second REP is converted, and so on.
4) ML—Maximum Length (# of digits) of the CSID to be outputted. Must be>=the length of largest BN that can be inputted for the given CID.
5) SR—Subset Rule—A rule that defines how a subset of the number to be converted is extracted. The resulting subset plays a key role in insuring that for each BN, the generated CSID number will be unique within a given context.
6) MIX—Flag indicating whether there will be an additional step whereby the digits that make up the converted number will be scrambled.

Among all calls of varying BN values for a given CID, the values assigned to the input parameters REPS, ML, SR, and MIX cannot vary. The values of these parameters can vary widely among calls with different CID values, but for any one CID, they must be consistent. This is important in insuring that for each BN, the generated CSID will be unique within a given CID.

The following identifies the steps involved in the algorithm. In some embodiments, code samples conform to VB .Net syntax.

At 502, the number to be outputted (N) is initialized to BN. REP is initialized to 1. At 503, N is converted to new number by adding to it an integer value (addend) which varies by CID and REP, but which is always the same for a given CID/REP pair. A lot of flexibility is granted here. In embodiments, the only requirement is that the total number of digits in both the addend and the result of the addition do not exceed ML. This requirement can be met by applying a modulus operation on both values where the divisor=$10^{ML}$.

At 504, the new integer number (N) is stored as a string (NSTRING) and trimmed of leading and trailing spaces. If the length of NSTRING is less than ML, leading zeros are inserted to bring the length up to ML. At 505, based on the SR parameter, a subset of digits (SETNUM) is extracted from NSTRING. One form of the SR parameter has it composed of a set of non-repeating digits, with each digit identifying a position in NSTRING (offset from the last digit of NSTRING). For example, an SR set to "1425" identifies a subset consisting of the $1^{st}$, $4^{th}$, $2^{nd}$, and $5^{th}$ digits (in that order) offset from the last digit in NSTRING. A "0" in this type of SR parameter would identify the last digit in NSTRING. Regardless of its nature, the SR parameter can vary so as to identify a subset of any length up to 10 or [ML minus 1], whichever is less. The remaining digits (after the subset is extracted) are left in NSTRING and make up the set of digits that is to be converted.

In some embodiments, it should be noted that on varying REPS of the conversion process, the SR parameter can be interpreted differently. Continuing with the example above, an SR set to "1425" can, on the second REP, identify a subset consisting of the $4^{th}$, $2^{nd}$, $5^{th}$, and $1^{st}$ digits (in that order) offset from the last digit in NSTRING. On the third REP it can identify a subset consisting of the $2^{nd}$, $5^{th}$, $1^{st}$, and $4^{th}$ digits. A lot of flexibility is granted on how a given SR parameter can interpreted among different CID/REP pairs. A critical requirement, however, is that complete consistency must be enforced for all calls for a given CID/REP pair. The scenario described here is captured in the following code:

```
NSTRING=N.ToString.Trim
NSTRING=Right(StrDup(ML, "0") & NSTRING, ML)
//Insures Length of NSTRING=ML
subsetRule=Mid(SR, REP) & Left(SR, REP-1)//Shifts dig-
  its in SR when REP>1
SETNUM=""
For i=1 To subsetRule.Length
  pos=CInt(Val(Mid(subsetRule, i, 1)))+1
  SETNUM=SETNUM & Left(Right(NSTRING, pos), 1)
  NSTRING=Left(NSTRING, NSTRING.Length-pos) &
    "X" & Right(NSTRING, pos-1)
Next
NSTRING=Replace(NSTRING, "X", "")
//Equals original NSTRING minus extracted digits
```

Note that the SR parameter does not have to take the form described above. It need only be some mechanism for identifying a subset of the number to be converted.

At 506, the extracted subset (SETNUM), the Context ID (CID), the specific process iteration (REP), and the number of digits to be converted (DNUM) are passed to a function which will produce a digit substitution string array (DSS) consisting of DNUM elements, where each element contains a chaotic scrambling of the digits "0" through "9". For example, if DNUM is equal to 9, the function would output an array looking something like the following:

DSS(1)="4638719502"
DSS(2)="1397684025"
DSS(3)="8497302651"
DSS(4)="5213407968"
DSS(5)="8261439750"
DSS(6)="2138750964"
DSS(7)="3804756291"
DSS(8)="0867941532"
DSS(9)="7082349165"

In embodiments, it should be noted that for each element of the array, each digit "0" through "9" is included and no digit is repeated. In embodiments, this is a requirement. Another requirement in embodiments is that, within a given REP for a given CID, the content of the entire array will vary only by the value of SETNUM. In other words, given the same SETNUM within a given CID/REP pair, this function will always generate the same DSS array. The combination of these 2 requirements is key in insuring that for each BN, the generated CSID number will always be UNIQUE within a given CID.

Within the restrictions identified above, the algorithm allows for a lot of flexibility in generating digit substitution string arrays that are chaotic in their formation. This flexibility allows for different schemes to be used for different types of contexts. For example, CSIDs used as keys for the storage of personal information in a database table can be generated with digit-substitution-string-formulation schemes that are materially different from the digit-substitution-string-formulation schemes used to generate CSIDs that are sent with information requests to external entities.

In broad terms, these digit-substitution-string-formulation schemes involve multiple calculations that are functions of one or more of the input parameters CID, SETNUM, and REP. Additional operands included in these calculations are always the same for a given CID/SETNUM/REP set, but may vary significantly among even the slightest of changes to any one of these 3 parameters. Careful attention is made to use operands that promote an even distribution of digits in the calculated results (e.g., employing multipliers where the last digit is 1, 3, 7, or 9; or multipliers that are made up exclusively of one or more of these 4 digits). The purpose of each calculation is to use the result (or subsets of the result; or perhaps a scrambling of the digits in the result) as a source for building each element of the DSS array. A workable example of a function to generate a DSS array follows. The 4 input parameters are described above in the beginning of this section.

```
. . . Function DigitSubArray(ByVal pSetNum As Integer, _
    ByVal pCID As Long, _
    ByVal pRep As Integer, _
    ByVal pNumDigitsToConvert As Integer) As String( )
  Dim lSourceNum As Double
  Dim lSourceSet, lExtractNo, lSub10 As String
  Dim lParam, lMultiplier as Long
  Dim i, j As Integer
  Dim lOperand( ) as Integer
  Dim lDSS(pNumDigitsToConvert) as String
  lOperand=myFunc.GetDssOperandArray(pSetNum, pCID,
    pRep)
  //myFunc.GetDssOperandArrayo returns an integer array(4)
  that can (but not necessarily)
  //vary by the 3 input parameters. However, the contents of
  this array are always the same
  //among all calls with the same set of values for the 3 input
  parameters. The 4 integers
  //are used as operands in calculations below. In testing the
  algorithm (primarily for
  //promotion of a chaotic distribution of the output), each
  array element was <=9999.
  lSourceNum=((pSetNum+pRep)*lOperand(1))+
  lOperand(2)
  lSourceSet=(lSourceNum*myFunc.GetNum1379(pCID+
  pRep, 4))+pCID). ToString. Trim
```

```
//myFunc.GetNum1379( ) retrieves an integer made up
exclusively of one or more of the //digits
//1,3,7,9 from a preset array (the index of which is deter-
mined by the 1st input parameter,
//pCID+pRep). The 2nd input parameter determines the
rightmost # of digits to include //in the output.
//- - -
//Split lSourceSet into 9 separate 3-digit integers and store in
an array
Dim alSourceSplit(9) as Integer
lSourceSet=lSourceSet & lSourceSet
For i=0 To 8
    alSourceSplit(i)=CInt(Val(Left(Right(lSourceSet, i+3),
        3)))
Next
//- - -
//Generate a 10-digit string of non-repeating digits for each
digit to be converted and
//store in the lDSS array that is to be outputted.
lParam=((pSetNum+pCID+(pRep*lOperand(3))    Mod
1000)+lOperand(4)
For i=1 To pNumDigitsToConvert
    lMultiplier=myFunc.GetNum1379(lParam+i, 3)//3-digit
        integer with each digit
        //set to either 1, 3, 7, or 9.
    lSourceSet="“
    For j=1 To 6
        lSourceNum=(alSourceSplit((i*j)    Mod    9)+(i*j)+
            (lParam*j))*lMultiplier
        lSourceSet=lSourceSet & Right(myFormat.NumToInt-
            String(lSourceNum), 3)
    Next
    lSourceSet=lSourceSet & myFunc.GetTenDigitSet(pSet-
Num+i)
    //myFunc.GetTenDigitSet( ) above retrieves a string of 10
    digits arbitrarily ordered
    //with no repeating digits from a preset array (the index of
    which is determined by the
    //input parameter). This string is added to lSourceSet to
    guarantee that the Do While
    //loop that follows will produce the desired result (i.e. a
    string of 10 digits with no
    //repeating digits). Ideally the following loop is exited
    without the need to use any part
    //the string returned by myFunc.GetTenDigitSet( ).
    lSub10=Left(lSourceSet, 1)
    j=2
    Do WhilelSub10.Length<10
        lExtractNo=Mid(lSourceSet, j, 1)
        If InStr(lSub10, lExtractNo)=0 Then
            lSub10=lSub10 & lExtractNo
        End If
        j=j+1
    Loop
    lDSS(i)=lSub10
Next
Return lDSS
End Function
```

This function, as is, represents a workable solution for the task at hand. It should be noted, however, that the output of this function can change quite significantly (and still maintain the requirements) just by the slightest of modifications to one or more of the simple formulas presented here. Again, this is by design. For the application at hand, variations may be employed among varying context types according to some embodiments.

At 507, the DSS array is returned to the calling routine where each element of this array is used to convert the corresponding digit in NSTRING. DSS(1) is used to convert the first digit of NSTRING; DSS(2) is used to convert the second digit of NSTRING; DSS(3) is used to convert the third digit of NSTRING, and so on.

At 507, for each digit in NSTRING, the routine adds 1 to it. The resulting value is then used as a positional lookup into the corresponding DSS element. This lookup yields the replacing digit. For example, if the first digit of NSTRING="6", it will be replaced by the $7^{th}$ digit of DSS(1). If the second digit of NSTRING="3", it will be replaced by the $4^{th}$ digit of DSS(2), and so on.

Using the DSS array example displayed above, an NSTRING value of "436723009" would be converted to "772968305", which will be stored as the new NSTRING. The logic is demonstrated as follows:

Digit #1="4"; +1=5; translates to digit #5 in "4638719502" ("7"), resulting in "7"
Digit #2="3"; +1=4; translates to digit #4 in "1397684025" ("7"), resulting in "77"
Digit #3="6"; +1=7; translates to digit #7 in "8497302651" ("2"), resulting in "772"
Digit #4="7"; +1=8; translates to digit #8 in "5213407968" ("9"), resulting in "7729"
Digit #5="2"; +1=3; translates to digit #3 in "8261439750" ("6"), resulting in "77296"
Digit #6="3"; +1=4; translates to digit #4 in "2138750964" ("8"), resulting in "772968"
Digit #7="0"; +1=1; translates to digit #1 in "3804756291" ("3"), resulting in "7729683"
Digit #8="0"; +1=1; translates to digit #1 in "0867941532" ("0"), resulting in "77296830"
Digit #9="9"; +1=10; translates to digit #10 in "7082349165" ("5"), resulting in "772968305"

```
newString="“
For i=1 To DNUM 'DNUM=Length of NSTRING
    digit=Val(Mid(NSTRING, i, 1))
    pos=digit+1
    newString=newString & Mid(DSS(i), pos, 1)
Next
NSTRING=newString
```

At 508, if the input parameter, MIX, is set to TRUE, then the first 10 digits in NSTRING will be scrambled—i.e. each digit of NSTRING (up to the first 10) will be repositioned, forming a new string value for NSTRING that is composed of the same digits but in a different order. This is accomplished via use of one of the DSS array elements. The DSS element which is chosen can be preset or can be dependent on CID, SETNUM, or REP (or any combination of these 3 variables). Each digit of the DSS element is used to reposition the corresponding digit of NSTRING up to the first 10 digits. For example, in continuing with the sample above, if DSS(3) (which is set to "8497302651") is algorithmically chosen, an NSTRING value of "772968305" would be converted to "586703972". The logic is described below.

Each digit in the in the chosen DSS element represents a position in the new number string that is to be created, with "1" representing the 1st position, "2" representing the 2nd position, and so on up to "9" representing the 9th position and "0" representing the 10th position. As such, any digits representing positions that are greater than the number of digits in NSTRING are not used in the repositioning process. So for this example, the "0" in "8497302651" will not be used (effectively making the repositioning string "849732651") because there are only 9 digits in NSTRING (i.e. "772968305"). The scrambling would occur as follows:

Digit #1 in "772968305" ("7") moves to digit #8 in scrambled set, resulting in - - -7-
Digit #2 in "772968305" ("7") moves to digit #4 in scrambled set, resulting in - - -7- - -7-
Digit #3 in "772968305" ("2") moves to digit #9 in scrambled set, resulting in - - -7- - -72
Digit #4 in "772968305" ("9") moves to digit #7 in scrambled set, resulting in - - -7- -972
Digit #5 in "772968305" ("6") moves to digit #3 in scrambled set, resulting in - - -67- - -972
Digit #6 in "772968305" ("8") moves to digit #2 in scrambled set, resulting in -867- - -972
Digit #7 in "772968305" ("3") moves to digit #6 in scrambled set, resulting in -867-3972
Digit #8 in "772968305" ("0") moves to digit #5 in scrambled set, resulting in 86703972
Digit #9 in "772968305" ("5") moves to digit #1 in scrambled set, resulting in 586703972

If DNUM (the number of digits to be converted) is greater than 10, the remaining digits are left in place (i.e. at the end of the string). However, note that many alternatives exist for the placement of these remaining digits. Whatever logic is used, though, it must be consistent within the given CID/REP pair.

```
If MIX Then
   index=((Val(SETNUM)+REP) Mod DNUM)+1
   scrambleSet=DSS(index)
   newString=StrDup(DNUM, "X")
   k=1
   For i=1 To 10
      pos=CInt(Val(Mid(scrambleSet, i, 1)))
      If pos=0 Then pos=10
      If pos<=DNUM Then
         newString=Left(newString, pos-1) & Mid(NSTRING, k, 1) &_Mid(newString, pos+1)
         k=k+1
      End If
   Next
   If DNUM>10 Then
   newString=newString & Mid(NSTRING, 11)
   End If
   NSTRING=newString
End If
```

At 509, the digits that make up SETNUM are then inserted in NSTRING, ideally in different positions from where they were originally extracted at 505. The resulting number string is converted to an integer (N), and this becomes the output for a given iteration (REP) of the process. Where and how these digits are inserted can vary widely among different CID/REP pairs. However, within the same CID/REP pair, the where and how of this insertion must be consistent. This consistency is necessary to insure that for each number to be converted, the generated output will be unique within the given CID/REP pair, and therefore, ultimately unique within the given CID (when the last REP is completed). The following code snippet satisfies the requirements of this step:

```
pos=((CID+REP*3) Mod DNUM)+1
NSTRING=Left(NSTRING, pos-1) & SETNUM & Mid(NSTRING, pos)
N=Val(NSTRING)
```

This completes the conversion for a given iteration (REP) of the process.

At 510, increase the value of REP by 1. At 511, if REP<=REPS, then repeat 503 through 511, with the output (N) of 510 from the previous REP serving as the starting point at 503. At 512, if REP>REPS, then the process is complete and the output (N) at 510 from the previous REP becomes the final output (i.e. the CSID).

As noted above, this algorithm can accommodate many variations and still maintain the stated requirements. For example, many valid alternatives exist for how the SR parameter can be formed and interpreted, and virtually endless variations can be applied to the simple formulas that are used in generating the DSS array (while still maintaining a chaotic distribution in the output). Much in the way of variation can be enabled just by introducing one or more additional (optional) input parameters. Whatever the method, variation serves well in enhancing the already built-in schemes for making decryption virtually impossible for those with malicious intent.

Figure 5B:
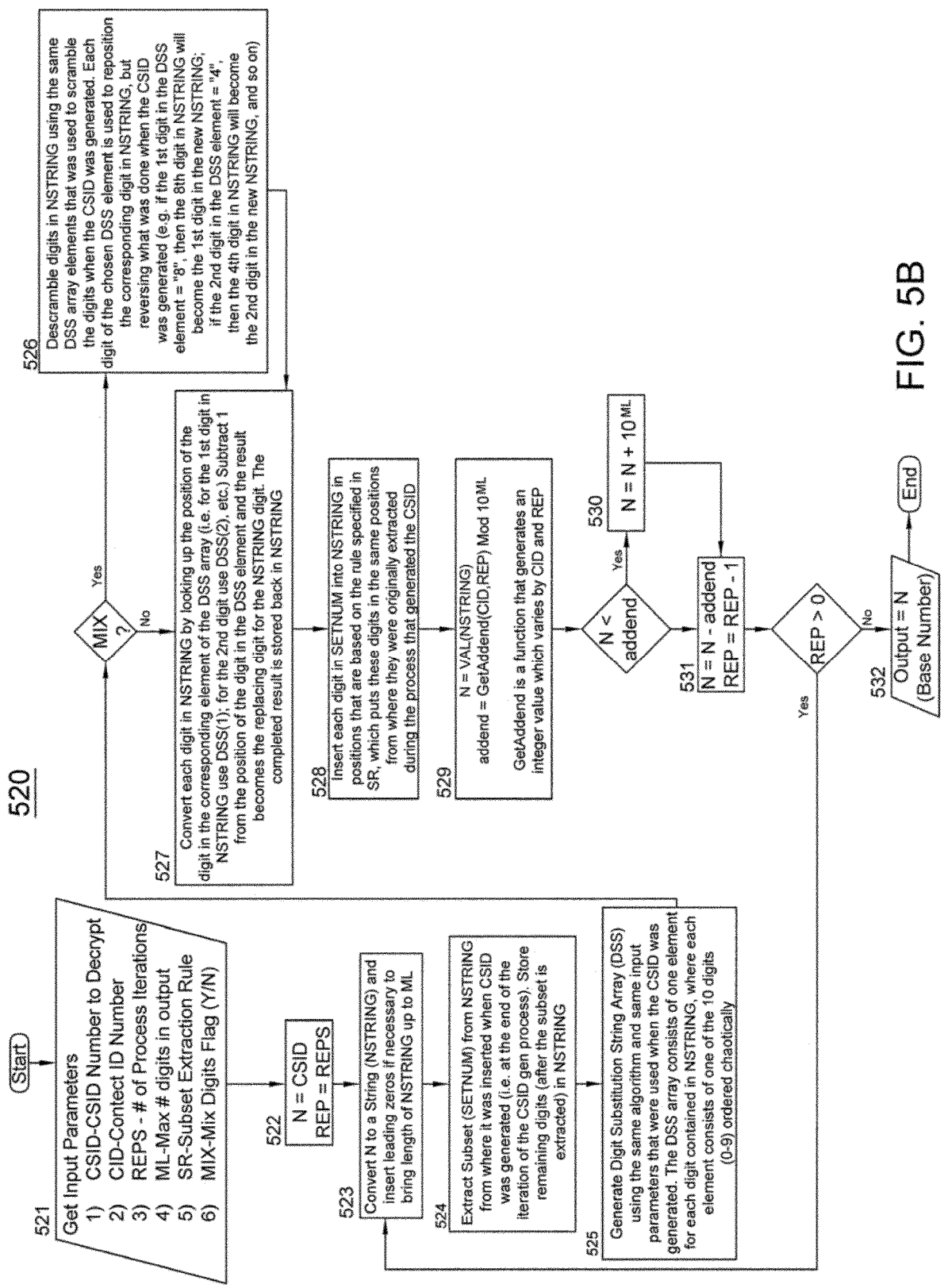
FIG. 5B is a flow diagram illustrating an example algorithm for decrypting a context specific identification in accordance with some embodiments of the present disclosure.

The CSID decryption process reverses the CSID generation process discussed in section 3.1. It takes a CSID Number and translates it back to the Base Number. So a CSID Number is inputted instead of a Base Number. Other than that, the input parameters are the same. FIG. 5B shows a flow diagram illustrating an example algorithm 520 for decrypting a CSID in accordance with some embodiments of the present disclosure. The CSID decryption algorithm 520 reverses the CSID encryption algorithm 500. The decryption algorithm 520 takes a CSID and translates it back to the base number. An input to the decryption algorithm 520 is a CSID.

At 521, input parameters of the decryption algorithm 520 are as follows:
1) CSID—Context specific identification to decrypt (back to its Base Number)
2) CID—Context ID—an integer that uniquely identifies the context for which CSID was generated.
3) REPS—Number of iterations of the decryption process to execute (with each iteration being referred to as a "REP"). This matches the number of iterations of the conversion process that was executed when CSID was generated.
4) ML—Maximum Length (# of digits) that was allowed for CSID when it was generated.
5) SR—Subset Rule—A rule that defined how subsets of derivations of the Base Number were extracted during the CSID generation process.
6) MIX—Flag indicating whether the process which generated CSID included an additional step whereby the digits that made up the converted number were scrambled.

The values assigned to the input parameters CID, REPS, ML, SR, and MIX must be exactly the same as they were when the CSID was generated.

The following identifies the steps involved in the decryption algorithm. It is presented as a reversal of the logic that was presented in the algorithm 500 used to generate a CSID. At 522, the number to be outputted (N) is initialized to CSID. REP is initialized to REPS.

It should be noted, that since this entire operation is the reverse of the operation which generated the CSID, the value of REP starts at the highest value. It will subsequently be decremented by 1 for each additional iteration of the process. This is the opposite of the CSID generation process, where REP was initiated to 1 and then incremented by 1 for each iteration of the process. It should be further noted, that the steps that follow represent the undoing of the CSID generation process that occurred while operating on the same REP number that is current to this decryption process.

At 523, the integer number (N) is stored as a string (NSTRING) and trimmed of leading and trailing spaces. If the length of NSTRING is less than ML, leading zeros are inserted to bring the length up to ML. At 524, based on CID, SR, and the current REP number, a subset of digits (SETNUM) is extracted from NSTRING from the same position where it was inserted at 509 of the CSID generation process. The remaining digits (after the subset is extracted) are stored back in NSTRING.
NSTRING=N.ToString.Trim
NSTRING=Right(StrDup(ML, "0") & NSTRING, ML)
//Insures Length of NSTRING=ML
DNUM=NSTRING.Length−SR.Length
//SR.Length=length of subset to be extracted
//DNUM=# of digits after subset is extracted
pos=((CID+REP*3) Mod DNUM)+1
SETNUM=MID(NSTRING, pos, SR.Length)
NSTRING=Left(NSTRING, pos−1) & Mid(NSTRING, pos+SR.Length)

At 525, the extracted subset (SETNUM), the Context identification (CID), the specific process iteration (REP), and the number of digits contained in NSTRING (DNUM) are passed to a function which will produce a digit substitution string array (DSS) consisting of DNUM elements, where each element contains a 10-digit set of non-repeating digits ordered chaotically. This is the same function which is called at 506 of the CSID generation process. The values for the input parameters are exactly the same as they were when the CSID was generated. As such, the digit substitution string array produced is exactly the same as the digit substitution string array that was produced during the CSID generation process for the given REP.

At 526, if the input parameter, MIX, is set to TRUE, then NSTRING represents a set of digits that were scrambled at 508 of the CSID generation process. As such, this set of digits needs to be descrambled, with the result being stored back into NSTRING. In doing this, the same logic that selected the DSS array element that was used as the vehicle to scramble the digits during the CSID generation algorithm 500 at 508 will be used here to descramble them. Each digit of the chosen 10-digit set of non-repeating digits ("8497302651") identifies the position where the corresponding digit in the original pre-scrambled number ("772968305") was placed in the scrambled number ("586703972"). Therefore, in reversing this logic, digit #8 of the scrambled set ("7") moves to digit #1 in the descrambled set. Digit #4 of the scrambled set ("7") moves to digit #2 of the descrambled set. Digit #9 of the scrambled set ("2") moves to digit #3 of the descrambled set, and so on.

It should be noted that since there are only 9 digits to be descrambled, the digit "0" in "8497302651" is skipped (as it represents digit #10), effectively making the descrambling vehicle "849732651". Such skipping occurs for any digits that represent positions that are greater than the number of digits contained in NSTRING (DNUM). The descrambling would occur as follows:
Digit #8 in "586703972"="7", moves to digit #1 in descrambled set, resulting in "7"
Digit #4 in "586703972"="7", moves to digit #2 in descrambled set, resulting in "77"
Digit #9 in "586703972"="2", moves to digit #3 in descrambled set, resulting in "772"
Digit #7 in "586703972"="9", moves to digit #4 in descrambled set, resulting in "7729"
Digit #3 in "586703972"="6", moves to digit #5 in descrambled set, resulting in "77296"
Digit #2 in "586703972"="8", moves to digit #6 in descrambled set, resulting in "772968"
Digit #6 in "586703972"="3", moves to digit #7 in descrambled set, resulting in "7729683"
Digit #5 in "586703972"="0", moves to digit #8 in descrambled set, resulting in "77296830-
Digit #1 in "586703972"="5", moves to digit #9 in descrambled set, resulting in "772968305"

If DNUM is greater than 10, the remaining digits beyond 10 are left in place in the descrambled set (e.g., at the end of the string).
If MIX Then
  index=((Val(SETNUM)+REP) Mod DNUM)+1
    scrambleSet=DSS(index)
  newString=""
  For i=1 To 10
    pos=CInt(Val(Mid(scrambleSet, i, 1)))
    If pos=0 Then pos=10
    If pos <=DNUM Then
      newString=newString & Mid(NSTRING, pos, 1)
    End If
  Next
  If DNUM>10 Then
    newString=newString & Mid(NSTRING, 11)
  End If
  NSTRING=newString
End If The DSS array generated at 506 in the generation algorithm 500 is used to convert NSTRING, reversing the process that occurred at 506 of the CSID generation process. As such, at 527, each digit of NSTRING is translated to its numbered position (minus 1) in the corresponding DSS array element. In continuing with the example presented in the description of the CSID generation process, recall that the DSS array was constructed as follows:
In using the DSS array displayed above, the NSTRNG value, "772968305" would be converted back to "436723009". The logic is demonstrated as follows:
Digit #1="7", which is digit #5 in "4638719502" . . . 5-1=4, resulting in "4"
Digit #2="7", which is digit #4 in "1397684025" . . . 4-1=3, resulting in "43"
Digit #3="2", which is digit #7 in "8497302651" . . . 7-1=6, resulting in "436"
Digit #4="9", which is digit #8 in "5213407968" . . . 8-1=7, resulting in "4367"
Digit #5="6", which is digit #3 in "8261439750" . . . 3-1=2, resulting in "43672"
Digit #6="8", which is digit #4 in "2138750964" . . . 4-1=3, resulting in "436723"
Digit #7="3", which is digit #1 in "3804756291" . . . 1-1=0, resulting in "4367230"
Digit #8="0", which is digit #1 in "0867941532" . . . 1-1=0, resulting in "43672300"
Digit #9="5", which is digit #10 in "7082349165" . . . 10-1=9, resulting in "436723009"
NSTRING is overwritten with the resulting value (in this case, "436723009").
newString=""
For i=1 To DNUM
  //DNUM=Length of NSTRING
  stringDigit=Mid(NSTRING, i, 1)
  pos=InStr(NSTRING, stringDigit)
  newString=newString & Str(pos−1).Trim
Next
NSTRING=newString At 528, the digits that make up SETNUM (the extracted subset from the original NSTRING) are then inserted in NSTRING in the positions from where they were originally extracted when the CSID was generated (at 505 of the CSID generation process). Determination of these positions is based on the SR parameter and the current REP number.

subsetRule=Mid(SR, REP) & Left(SR, REP−1)//Shifts digits in SR when REP>1
newString=StrDup(NSTRING.Length+SR.Length, "X")
//e.g., "XXXXXXXXXX"
For i=1 To subsetRule.Length
  pos=CInt(Val(Mid(subsetRule, i, 1)))+1
  newString=Left(newString, newString.Length−pos)
    &_Mid(SETNUM, i, 1) & Right(newString, pos−1)
Next
For i=1 To newString.Length
  If Mid(newString, i, 1)="X" Then
    newString=Left(newString, i−1) & Left(NSTRING, 1)
      & Mid(newString, i+1)
    NSTRING=Mid(NSTRING, 2)
  End If
Next
NSTRING=newString At 529, NSTRING is converted to a number (N). This number is equal to the number that was outputted at 503 of the CSID generation process, whereby the Base Number of the REP (BN) was converted to another number by adding to it an integer value (Addend), which varies by CID and REP. If the resultant number was greater than 10ML, it was then reduced by 10ML. The reverse of this logic produces the Base Number of the REP at 530. It is demonstrated as follows:
addend=myFunc.GetAddend(CID, REP)
addend=addend Mod 10ML
IF N<Addend Then
  N=N+10ML
End If
N=N−Addend
This completes the decryption for a given iteration (REP) of the process.

At 531, decrease the value of REP by 1. If REP>0, then repeat 523 through 531, with the output (N) from the previous REP serving as the starting point in at 523. If REP=0, then the process is complete and the output of from the previous REP (where REP was =1) becomes the final output (i.e. the original Base Number) at 532.

Data Storage Scheme
Storage of Personal Data

The following represents an exemplary method for storing personal data collected by the management system 130 and stored via DBMS 110. However, this particular method is not a requirement, as the functionality of the management system 130 can effectively be serviced by conventional or other data storage methods. It has been chosen because of the enhanced security it provides.

This method has personal data being stored in such a manner as to make it highly unlikely for prying eyes to determine which data belongs to which person. Such is the case even for the system's database administrator who may have full access to every database object. Without additional access to the application code (which is ideally stored on a remote server separate from the database), the ability to associate a name with a National ID Number, date of birth, an email address, a phone number, a postal address, a credit card number, a driver's license number, a passport number, and/or system logon details is intended to be virtually impossible. The same can be said about attempts to associate any one of these items with one or more of any of the other items. Each of these identifying items is stored in its own separate table and none of these tables have a logical key/foreign key link to any one of the other tables. The data associated to any one person is tied together via various algorithms in the application code. Nothing in the database provides the links. Additionally, even via the application code, such personal data can be extracted only one person at a time, and for each person, from only one table at a time. The database is so designed that no useable SQL query can be formed which could generate a list of people with their associated personal information. The only SQL-generated lists that are possible are those of general profile data which have no association to any of the key personal identifying data elements identified above except for date of birth. Date of birth is stored in the same table with gender and postal code. These three items are stored together in order that they may be efficiently included for general profile purposes. They can be linked to other (optionally-entered) profile-related data, but not to any of the personal identity-related data elements mentioned above. Also, in being used for general profile purposes, specificity can be greatly reduced by the translation of date of birth to an age (or age range) and postal code to a broader geographic region.

When a person initially registers, his/her National ID (NID) number is stored in encrypted format in its own separate table with no other personal data. This table, the NID_CLAIM table, is ideally located in a remote database separate from the database that stores other personal data. Stored in the NID_CLAIM table with each National ID Number is a Claim Number, which is a unique ID number assigned by the management system and serves as the primary key to the table. With either this number or the registered NID serving as the "Base Number", a Hidden Unique ID (HUID) number is generated via the function that produces Context Specific ID (CSID) numbers. This HUID (itself a CSID) is then subsequently used as the Base Number to generate another CSID number for each (one-record-per-person) table that is used to store personal data. Each of these CSID numbers serves as the primary key in the table to which it applies. In calculating these CSID numbers, each table treated as a separate context (with the exception of tables containing general profile data). As a result, each primary key associated to a specific person is chaotically different from the other primary keys associated to the same person (as CSID numbers are chaotic-like in their distribution). So, with the exception of general profile data, there is no logical link among any of the tables with each other and there is no logical link between any of the tables and the HUID. Instead, these entities are tied together exclusively via cryptic CSID-Encryption/Decryption algorithms contained in application code.

An important aspect of this scheme is that the HUID is not stored anywhere in the application's database or network of databases. So, even for someone who has complete access to the database, decoding the resultant primary keys into a single identifier and then using it to link the personal data of any one person becomes virtually impossible. Even if such a person also has access to the CSID Encryption/Decryption algorithms (of which there can be multiple deviations), without knowledge of the specific set of input parameters that these algorithms can take (most importantly the Context ID, which is itself cryptically generated and hidden), decoding the resultant primary keys into a single identifier and then using it to link the personal data of any one person is still virtually impossible. And a further twist on this scheme is that multiple secret non-stored HUID numbers can be produced, with each HUID being used separately to serve as the Base Number for generating primary keys for a specific subset of the tables used to store personal data. Such additional HUID numbers are generated via a CSID-type generation algorithm using the original HUID as the Base Number and a separate context identifier for each additional HUID produced.

Figure 6A:
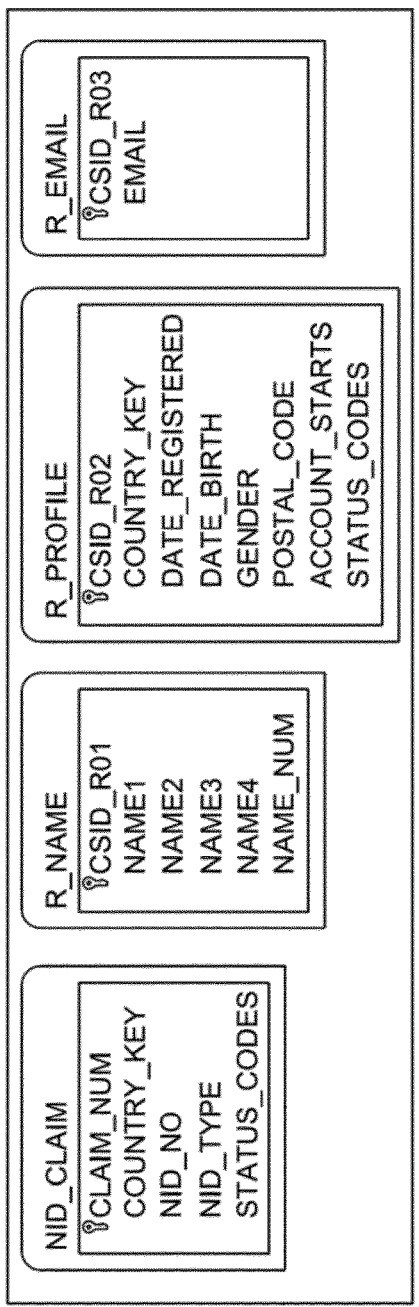
FIGS. 6A to 6G depict parts of the database schema that apply to the storage of personal data.
Figure 6B:
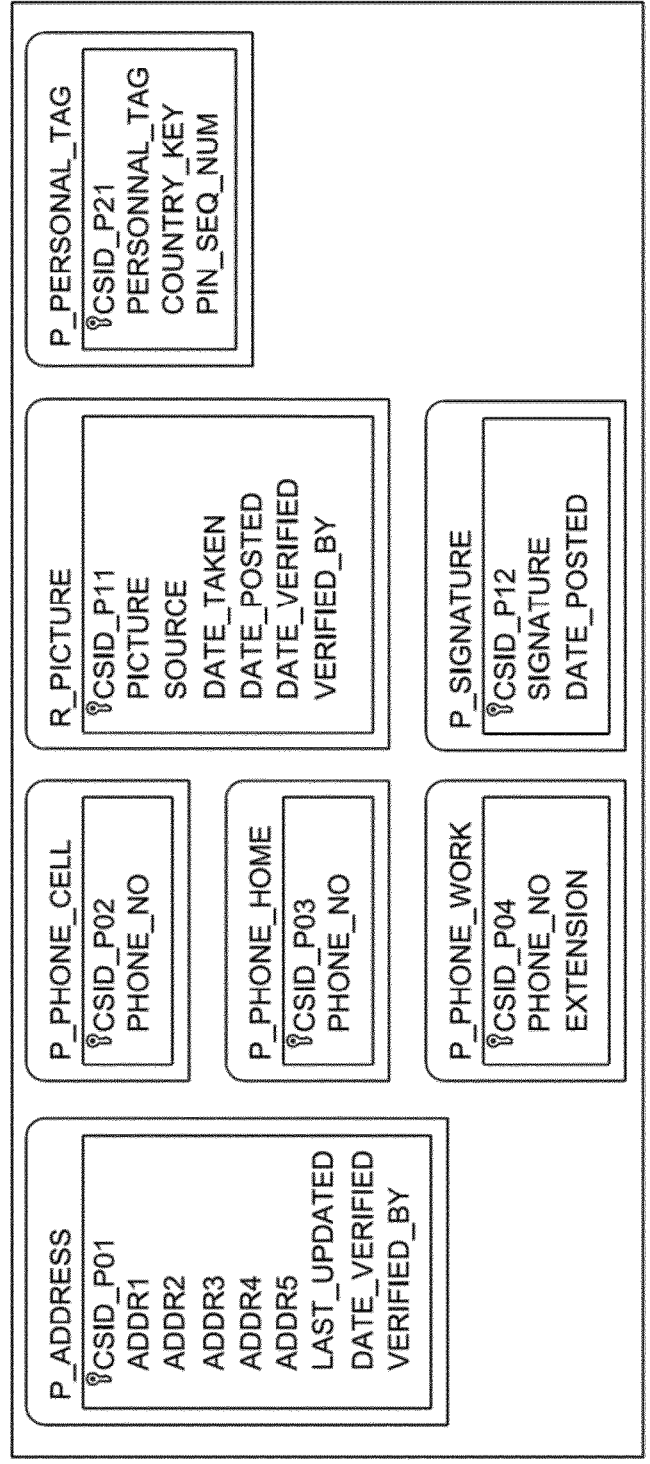
Figure 6C:
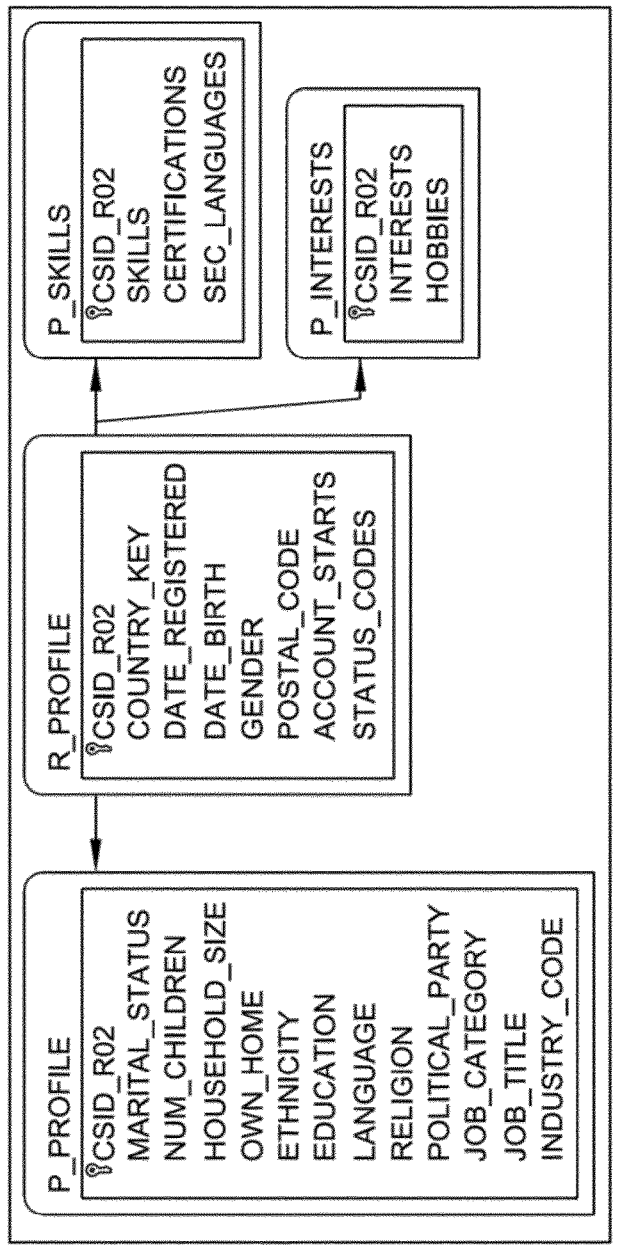

FIGS. 6A, 6B and 6C depict parts of the database schema that apply to the storage of personal data. FIG. 6A shows the personal-identity related data that is gathered when a user initially signs up with the management system 130 through the User Account Management System 104. Other than logon credentials, this represents all of the personal data that is required by the system. All other personal data supported by the system is optional. With the exception of the NID_CLAIM table, the names of the tables which hold the required personal data are prefixed by "R_". The names of the tables which hold optional personal data are prefixed by "P_". FIG. 6B shows tables which hold optional personal data.

Each of the tables depicted in both FIGS. 6A and 6B have a CSID Number designated as the primary key. However, note that (for illustrative purposes and not necessarily in the actual database) a different suffix is attached to the name of each of these CSID keys. These different suffixes serve as an indication that each table is treated as a separate context, meaning that a different Context ID (CID) is applied to each table in the generation of the CSID Numbers. As such, there are no logical database links between the tables. However, the tables presented in FIG. 6C are linked, as they each employ the same CID in the generation of their CSID Numbers. This is indicated by each table sharing the same primary key name that is assigned to the R_PROFILE table, namely "CSID_R02". The tables presented in FIG. 2-3 hold general profile data, and, as noted above, the system allows for linked queries of such data. However, none of this data can be logically linked (via database objects) to any of the tables presented in FIGS. 6A and 6B. In other words, none of the general profile data can be logically attached to anything that could specifically identify an individual person. The closest a database hacker could ever get is tying general profile data to a birth date, a gender, and a postal code, and even that is made difficult by storing these items in an encrypted format. Also, keep in mind that all of the profile-related data that can be linked to the R_PROFILE table is optional. So for those who may be uncomfortable with such an association of data, they can simply choose not to enter any of it.

The data storage scheme described thus far is utilized for all one-record-per-person personal data tables. However, for certain tables where each person could have multiple records, a variation of this approach is employed. Such is the case where it is necessary to prevent association of a group of like data elements to a single person (even though the database does not provide any association as to the identity of that person). This would be the case for, say, bank account numbers. A requirement of the database is to prevent knowledge that a set of bank account numbers belong to the same (albeit unknown) person. This is necessary to prevent someone, who has access to the database and happens to know an account number of a specific person, from acquiring all of the other account numbers that belong to that same person.

In the multiple-records-per-person approach, at least one additional table is employed. One of the tables is used to store the key data element (e.g., a bank account number) that needs to be disassociated. No CSID Number or any other column associated to a person (neither cryptically nor directly) appears in this table. As such, there is no indication within this table of multiple records belonging to the same (albeit unknown) person. The primary key in this table is a chaotically assigned number generated by the system. It is used as the base number to produce a secret non-stored number via a CSID-type generation algorithm. This secret number is then used as the base number in generating (via a separate CSID-type generation algorithm) another number, termed a "KEY-TIE", which is stored in another table. This KEY-TIE provides for an application-code-link between the tables (but not a logical database link), in similar fashion to how CSID Numbers work. This other table contains a column to hold a CSID Number (cryptically identifying the person who owns the key data element in the first table). This CSID column is not unique. So a specific CSID Number can appear multiple times in this table—one row for each key data element owned by the same person.

Figure 6D:
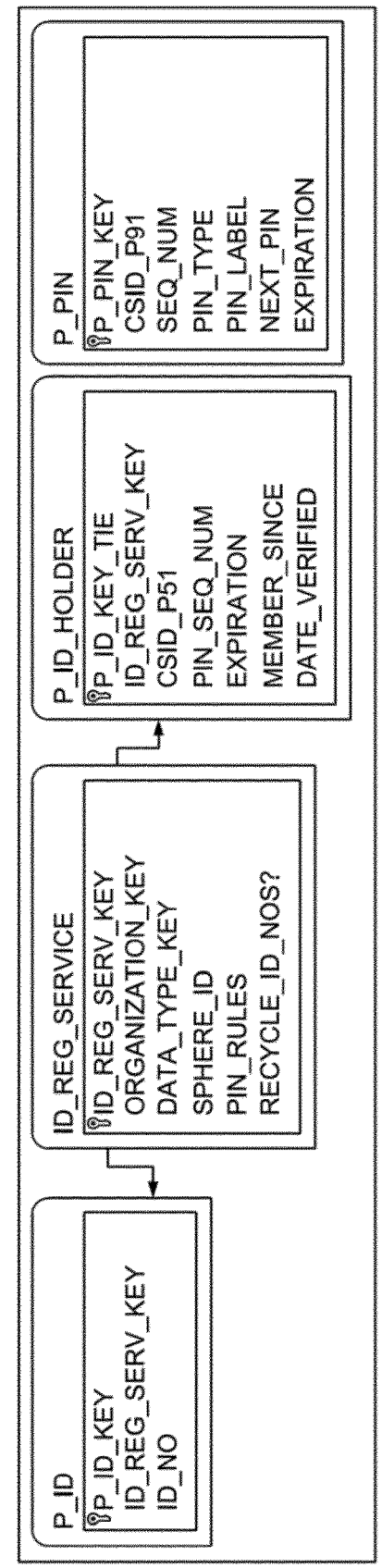

An example of this multiple-records-per-person storage approach to data storage is shown in FIG. 6D, which depicts how registered personal ID numbers are stored. This includes numbers for driver licenses, passports, professional licenses, certifications, memberships (to unions, trade associations, clubs, etc.)—basically any type of issued (non-shared) personal ID numbers.

When a personal ID number is registered for protection, the application first appends a row to the P_ID table, where the ID number is stored. No CSID Number or any other column associated to a person appears in this table. The column, ID_REG_SERV_KEY, is a foreign key which links to the primary key of the ID_REG_SERVICE table. The linked row in this table provides (via links to other tables) the ID number source, type, and rules regarding how it is handled. The primary key of the P_ID table (P_ID_KEY) is a unique chaotically assigned number generated by the system. It is used to cryptically generate a KEY-TIE (via a CSID-type generation algorithm) that serves as the primary key in the P_ID_HOLDER table, where the person's CSID Number is stored. For any one person, his/her CSID Number can be stored multiple times—once for each ID number that is registered. The key point is that there is no logical database link between the P_ID table and the P_ID_HOLDER table. Associated rows are linked only via the application code.

Note that ID_REG_SERV_KEY is redundantly stored in both the P_ID table and the P_ID_HOLDER table. It is stored in the P_ID table to allow for the efficient retrieval of a specific ID Number when verification of ownership is requested. It is stored in the P_ID_HOLDER table to allow for a more efficient retrieval of all of a person's registered ID number types when that person requests such a list after having successfully logged on to the User Account Management Site of the management system 130.

The P_ID_HOLDER columns CSID_P51 and PIN_SEQ_NUM provide for an application-code-link to a P_PIN table row which identifies the current PIN that is assigned to the ID number. The combination of columns CSID_P91 and PIN_SEQ_NUM are unique within the P_PIN table.

Figure 6E:
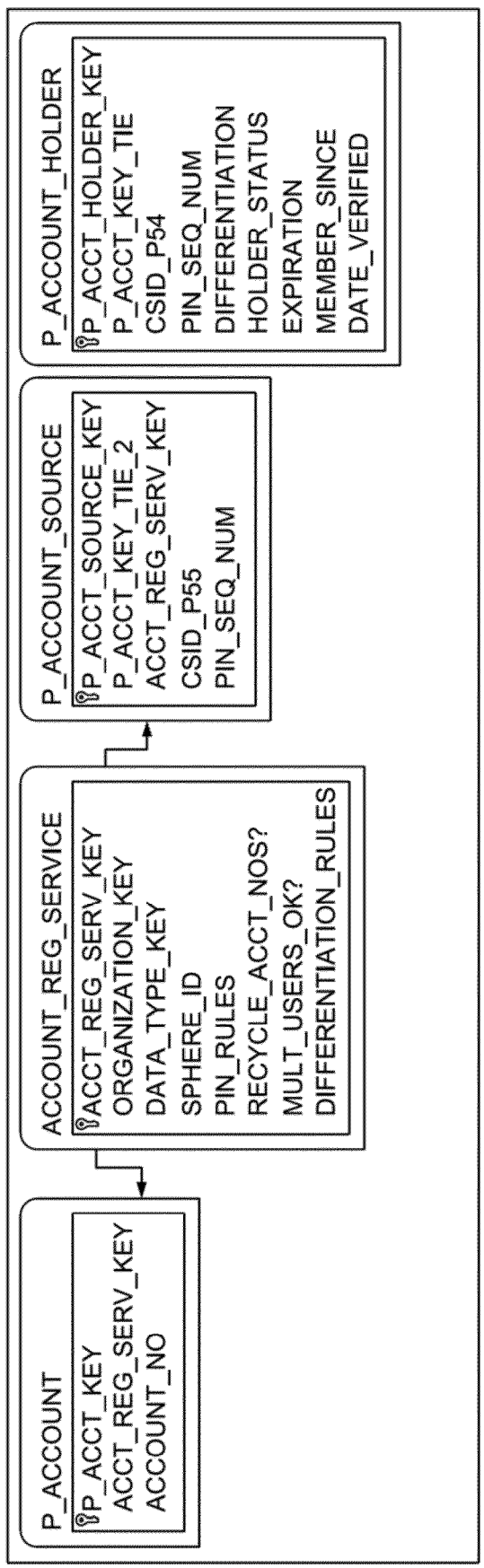

FIG. 6E depicts the storage of registered personal account numbers. This scheme is similar to the scheme used to store registered personal ID numbers, but deviates to accommodate more than one person per number. Such an accommodation is necessary for credit card accounts, bank accounts, health insurance policies, etc.—basically any type of account that can have joint owners and/or more than one authorized user. In this scheme, there is a one-to-many application-code-link between P_ACCOUNT rows and P_ACCOUNT_HOLDER rows, as opposed to the one-to-one application-code-link between P_ID rows and P_ID_HOLDER rows. So the P_ACCT_KEY_TIE column is not unique, unlike the P_ID_KEY_TIE column in the P_ID_HOLDER table. Also note the inclusion of the column, DIFFERENTIATION. This column is used to distinguish between authorized users of the same account. It could include the individual person's name as it appears on the account, as this may be the only piece of distinguishing data available and because a name on an account might not exactly match a person's official name as registered with his/her National ID Number. Because a person's name can be included in this table, another table, P_ACCOUNT_SOURCE, is added to the scheme in order to hold the column, ACCT_REG_SERV_KEY. These 2 columns need to be separated in order to prevent someone (who has access to the database) from seeing the multiple account types registered by a named person. The addition of the P_ACCOUNT_SOURCE table serves the same purpose for registered personal accounts as the inclusion of the ID_REG_SERV_KEY in the P_ID_HOLDER table does for registered personal ID numbers. The P_ACCT_KEY_TIE_2 column in the P_ACCOUNT_SOURCE table provides a KEY-TIE application-code-link to the actual ACCOUNT_NO stored in the P_ACCOUNT table, just as P_ACCOUNT_KEY_TIE column in the P_ACCOUNT_HOLDER table does, but just as with CSID numbers, the 2 tables are treated as different contexts when it comes to generating these KEY-TIES, so there is no logical database association between the P_ACCOUNT_HOLDER table and the P_ACCOUNT_SOURCE table.

The P_ACCOUNT_SOURCE columns CSID_P55 and PIN_SEQ_NUM provide for an application-code-link to a P_PIN table row in similar fashion to the connection made between the P_ID_HOLDER and P_PIN tables.

Figure 6F:
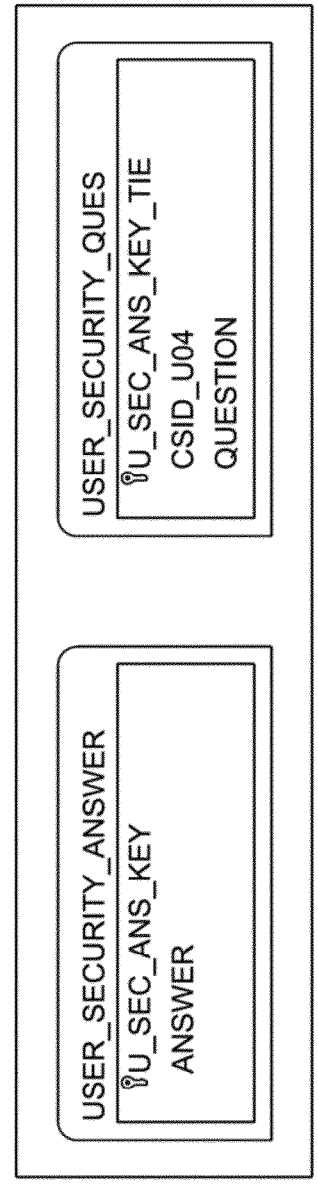

FIG. 6F depicts the storage of a user's security question/answer pairs. This provides a very simple example of the multiple-records-per-person storage approach, but clearly demonstrates the elements of the scheme—i.e. the key data element isolated in one table and columns for a KEY-TIE and a CSID in the other table. Each security answer is disassociated from the person, from the question, and from other answers associated to the same person.

Figure 6G:
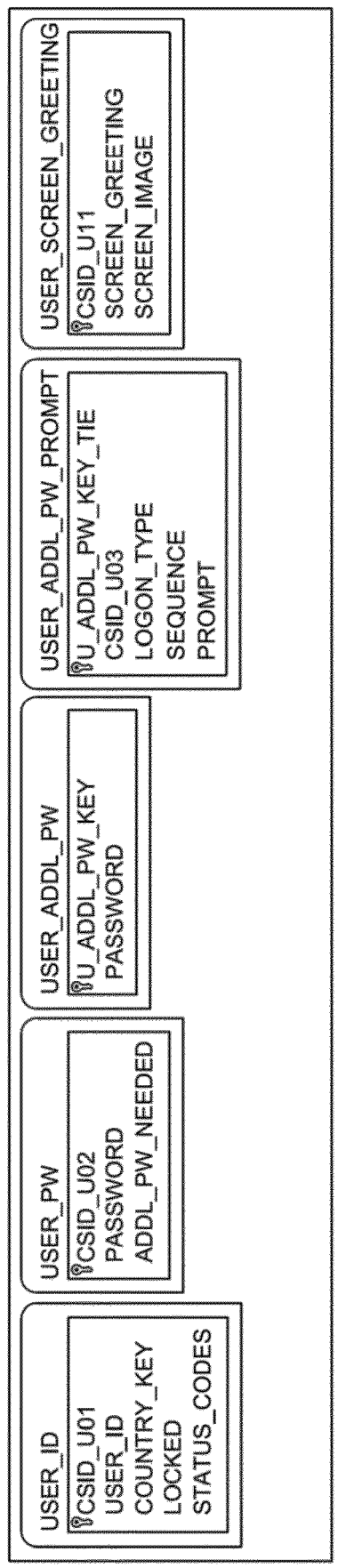

FIG. 6G depicts the storage of a user's logon credentials. The storage of a management system user's logon credentials may use both the one-record-per-person approach and the multiple-records-per-person approach. The multiple-records-per-person approach is applied to the optional (multiple) additional passwords that a user may require for system access. This feature is accommodated by the combination of the USER_ADDL_PW table and the USER_ADDL_PW_PROMPT table. The other 3 tables (USER_ID, USER_PW, and USER_SCREEN_GREETING) demonstrate the application-code-linked one-record-per-person approach.

Retrieval of Stored Personal Data

With the exception of the general profile data depicted in FIG. 6C, all retrieval of personal data from the management system database 110 occurs via queries to one personal data related table at a time. This may appear to be slow and very inefficient, but since every request for personal identity related information applies to only one person, adding a fraction of a second to the response time is basically a non-factor. However, this scheme goes a long way in providing extra security. Any attempt to decrypt a CSID generation algorithm would necessarily require testing of numerous samples of very large lists of identifiable personal data. In this regard, adding a fraction of a second to each person queried would have a very significant effect, adding to the impracticability of even attempting such a task.

Other than a request seeking a simple confirmation as to whether a data element has been registered in the management system 130 (e.g., a personal ID number or account number), the fulfillment of any request for the retrieval of the personal information of a specific person always involves a call to an application code function to determine at least one secret non-stored number.

As is standard of systems that manage personal information, the process of retrieving the data belonging to a specific person is initiated by a query of a given unique identifier associated with the person. In the management system 130, there are 5 types of person-associated unique identifiers that can provide for a queried entry point into the database. These unique identifiers and the tables they are stored in are as follows:

1) A User ID (for given Country) (USER_ID)
2) A Personal Tag (for given Country) (P_PERSONAL_TAG)
3) A National ID Number (for given Country) (NID_CLAIM)
4) A registered personal ID (for given type/source) (P_ID)
5) A registered account number (for given type/source) (P_ACCOUNT)

Each of the items 1 through 4 is unique to a single person. Item 5 is unique to a personal account. To be unique to a single person, it needs to be accompanied by a user's name and/or other differentiation data. However, as was discussed above, this differentiation data for personal accounts is stored in a separate table from the table that stores the account number. And since these 2 tables do not have a logical database link, the initial query into the database involves only the account number and account type/source.

Beyond the initial query, no other associated personal data can be successfully queried without the programmatic determination of a CSID Number or a KEY-TIE. Before a CSID Number can be generated, its non-stored base number, a HUID Number, must first be determined. For all cases except when the initial query returns a row from the NID_CLAIM table, the only way to determine a HUID Number is by decrypting an already known CSID Number. Such a CSID Number is available when the initial query returns a row from either the USER_ID table or the P_PERSONAL_TAG table. When the initial query returns a row from the P_ID table (or the P_ACCOUNT table), the generation of a KEY-TIE allows for the queried access of the appropriate row in the P_ID_HOLDER table (or the P_ACCOUNT_HOLDER table). This row, in turn, contains a CSID Number, which can then be decrypted to the appropriate HUID Number. When the initial query returns a row from the NID_CLAIM table, the primary key, CLAIM_NUM, is passed to a CSID-type generation algorithm as the base number to generate the appropriate HUID. Once the HUID is determined, it is used to generate the other CSID Numbers associated to the person being queried. One CSID is separately determined for each additional table that needs to be accessed to complete the data request. When the table being accessed is of the multiple-records-per-person type, each row returned (by query of the CSID) will have a KEY-TIE. In order to retrieve the identity-related data stored in the application-code-linked associated table, this KEY-TIE needs to be decrypted to determine the primary key of this associated table. Once determined, this key is searched, and the appropriate data is retrieved.

Figure 7:
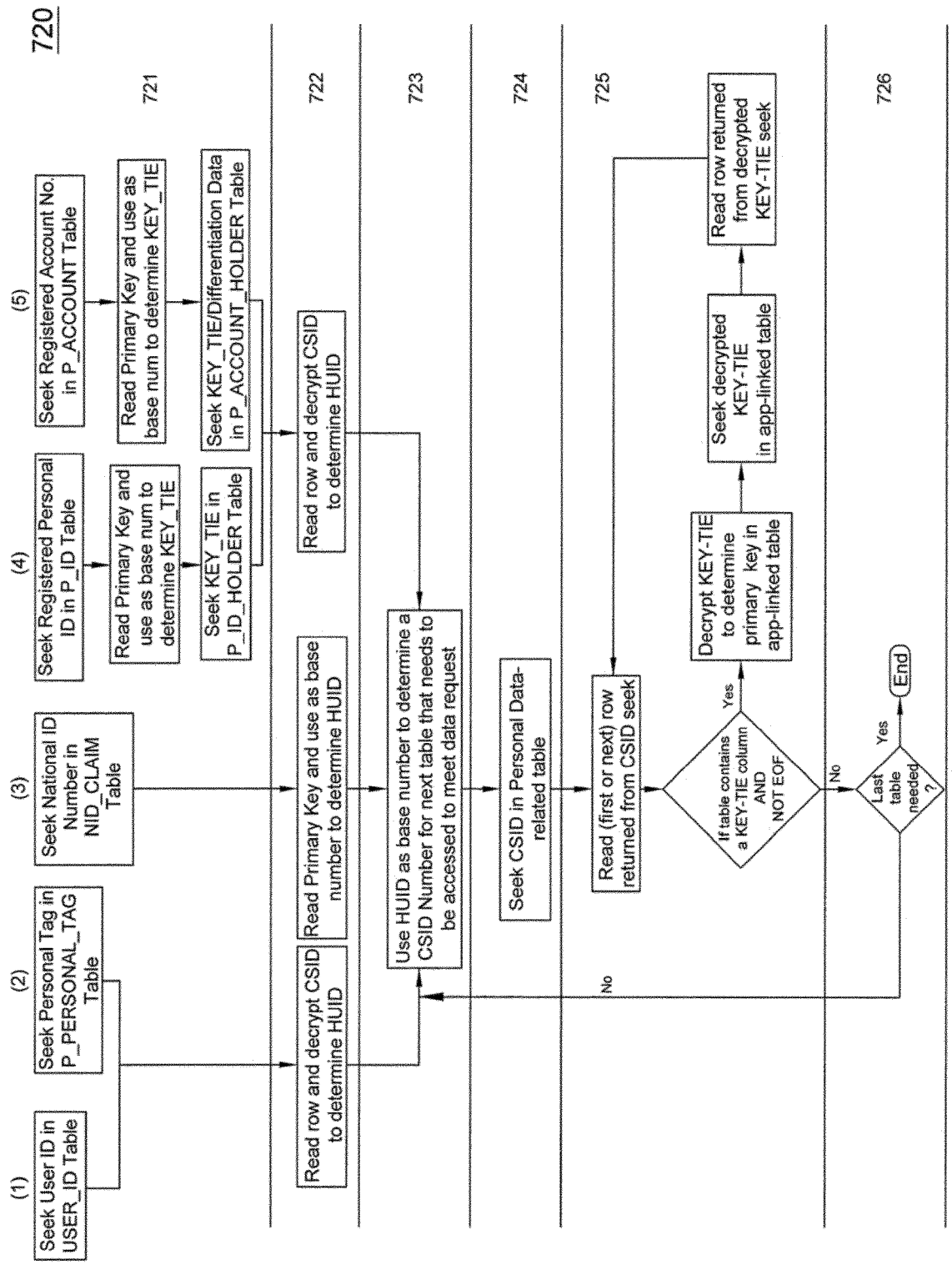
FIG. 7 is a flow diagram illustrating an example algorithm for retrieval of identify information in accordance with some embodiments of the present disclosure.

FIG. 7 is a flow diagram illustrating an example flow 720 for retrieval of identity information in accordance with some embodiments of the present disclosure, where there are different paths for retrieval of personal data. In various embodiments, other than a request seeking a simple confirmation as to whether a data element has been registered in management system 130 (e.g., personal identification number or account number), the fulfillment of any request for the retrieval of the identity information of a specific user 121 always involves a call to an application code function to determine at least one secret non-stored number, according to various embodiments. Beyond the initial query, no other associated personal data can be successfully queried without the programmatic determination of a CSID or a KEY-TIE. A KEY-TIE provides for an application-code-link between the tables (but not a logical database link). Additionally, a KEY-TIE resides in a table and may be decrypted using the decryption algorithm 420 to indicate the next table to apply the decryption algorithm. Each time a decryption algorithm is run, either on a CSID or a KEY-TIE, the result of the decryption algorithm will move to the next table until the identity information item is retrieved.

Referring to FIG. 7, at 721 five unique paths are shown. These unique paths and the tables they are stored in are:
1) A User ID (for given Country) - - - (USER_ID)
2) A Personal Tag (for given Country) - - - (P_PERSONAL_TAG)
3) A NID (for given Country) - - - (NID_CLAIM)
4) A registered personal ID (for given type/source) - - - (P_ID)
5) A registered account number (for given type/source) - - - (P_ACCOUNT)

Each item one through four above is unique to a single person. By unique, it is meant that only one individual may have an identifier that is represented by that item. For example, a user ID is a user account credential identification in management system 130. A personal tag may be any user generated identifier that is not previously used in the system, for example, an email address. Item five above is a registered account number, and is unique to a user account. However, a registered account number needs to be accompanied by a user's name and/or other differentiation information to be unique to a specific user. The above examples represent one secret non-stored identifier that may be used to perform an initial query in data store 110. This initial query is essentially a decryption algorithm of one known identity information item about a specific user such that subsequent algorithms have a place to start in order to find a specific identity information item for retrieval. As would be understood by one of ordinary skill in the art, a data disclosure token or a proxy email address may also be used, because these items are known identifiers that may only be associated with one user (as will be further discussed below).

At 721, the unique identifier is retrieved at the respective table in the database. Before a CSID can be generated, its non-stored base number (e.g., a hidden unique identifier) must first be determined. For all cases except when the initial query returns a row from the NID_CLAIM table, the only way to determine a hidden unique identifier is by decrypting an already known CSID. This CSID is retrieved from the table using the unique identifiers listed above. A CSID is available when the initial query returns a row from either the USER_ID table or the P_PERSONAL_TAG table. When the initial query returns a row from the P_ID table (or the P_ACCOUNT table), the generation of a KEY-TIE allows for the queried access of the appropriate row in the P_ID_HOLDER table (or the P_ACCOUNT_HOLDER table). This row, in turn, contains a CSID, which can then be decrypted to the appropriate hidden unique identifier at 722. When the initial query returns a row from the NID_CLAIM table, the primary key, CLAIM_NUM, is passed to the generation algorithm 500 as the base number to generate the appropriate hidden unique identifier at 722.

At 723, once the hidden unique identifier is determined, it is used to generate the other CSIDs associated to the user being queried. At 724, one CSID is separately determined for each additional table that needs to be accessed to complete the data request.

At 725, when the table being accessed is of the multiple-records-per-person type, each row returned (by query of the CSID) will have a KEY-TIE. In order to retrieve the identity information item stored in the application-code-linked associated table, this KEY-TIE needs to be decrypted to determine the primary key of this associated table. Once determined, this key is searched, and the appropriate data is retrieved.

At 726, once the last table is retrieve, the retrieval of identity information by management system 130 is complete.

To specifically demonstrate the various aspects of the data retrieval logic, consider the scenario where a user logs into the management system User Account Management Site for the purpose of viewing/editing some personal data on file. (See FIG. 6G for the layout of the tables which hold logon credentials.) Upon entry of a User ID and a password, the application will look up the User ID in the USER_ID table. If found, the system will read in the CSID (stored as the Primary Key in the USER_ID table), and then decrypt it to its HUID Number. This HUID will then be used as the base number in determining the person's CSID Number stored in the USER_SCREEN_GREETING table. Upon retrieving the matching row in this table, the application will then display the screen greeting message and image on each subsequent screen to be displayed throughout the session. The HUID will then be used to determine the person's CSID Number stored in the USER_PW table and then retrieve the matching record. If the password in the retrieved row matches the password entered, and the column, ADDL_PW_NEEDED, indicates that no additional passwords are required, then the user is granted access to the system.

If the value of ADDL_PW_NEEDED indicates that additional passwords are required, the HUID will then be used to determine the person's CSID Number held in the USER_ADDL_PW_PROMPT table, which contains one row for each additional prompt-for-password required (via the multiple-records-per-person approach discussed above). For each row retrieved via a query of the CSID Number, the text stored in the PROMPT column will be used to prompt for a password. For each password submitted, the application will decrypt the (KEY-TIE) primary key (U_ADDL_PW_KEY_TIE) of the associated row in the USER_ADDL_PW_PROMPT table in order to determine the primary key of the application-code-linked row in the USER_ADDL_PW table. In retrieving the USER_ADDL_PW row (via a query of the generated primary key value), the application will compare stored PASSWORD with the one entered. If each of the passwords read from the USER_PW_ADDL table match the passwords entered, then the user will be granted access to the system.

Once successfully logged on, the user would navigate to the screen which contains the data which he/she is interested in viewing/editing. In presenting this screen, the application will use the HUID as the base number for determining the CSID Numbers associated to the user in each of the tables which contain the data which is being sought. For instance, in bringing up the user's address, 2 separate CSID Numbers would be generated—one to find the appropriate row in the P_ADDRESS table, and one to find the appropriate row in the R_PROFILE table, which contains the postal code.

Alternative Decentralized Model/System

A potential problem with acceptance of the identity protection model, as thus far presented, is the perception by the public of one entity having far too much knowledge of one's sensitive personal identity-related data and everyday dealings. Fortunately, via the separation-of-data scheme already presented (with its utilization of HUID, CSID, and "KEY-TIE" numbers), a decentralized services model can be employed that essentially eliminates this concern. With this model/system (hereinafter, "model"), Management System 130 is replaced by a base identity protection service (hereinafter referred to as the "Base Service") that need not store nor ever have any knowledge of any of the personal ID numbers that it is designed to protect. This includes NID numbers and all other sensitive personal ID numbers (e.g., numbers identifying credit cards, bank accounts, insurance policies, passports, licenses, etc.). Such ID numbers can be stored and managed in standalone registries that are completely separated or isolated from the Base Service and from each other—with each entity having no knowledge of the personal ID numbers stored and managed by the other entities.

Under this decentralized model, some ID number types can be registered for protection without any requirement for them to be sent anywhere, being able to be registered through a "Partnering Organization" (e.g., the ID issuer, ID processor, or some other ID custodian) and then managed for protection by the same organization. For example, an insurance policy number can be registered for protection through the insurer and stay with the insurer, without it, or any personal information associated to it, needing to be sent to any other entity. This is also true of NID numbers, which can be registered for protection by and to an entity that already has all (or nearly all) of a nation's NID numbers on file (e.g., the government agency that issues NID numbers).

To accommodate situations where managing a registered ID number type for protection at its source is not considered feasible or desirable, the model supports the storage and management of registered personal ID numbers in one or more third party registries, whereby each ID number held in such a registry does not have any other personal data stored with it or any other personal data linked to it. That is, just the ID number is stored without any indication of the individual to whom it belongs. Also, there is nothing that links multiple ID numbers owned by the same (albeit unknown) person. Such a registry neither has nor can provide even the smallest inkling of ID ownership. It is effectively immune from prying eyes, as nothing harmful can be accomplished with just a list of numbers that has no accompanying personal data. In essence, because a number alone is harmless, this option, like the previous option, allows a person to register an ID number for protection without the need to give up any identifying personal information to any entity that does not already have knowledge of it. The model accommodates this ideal for most (if not all) ID number types, including NID numbers. However, in registering NID numbers, it may still make sense (depending on the country and the availability of certain public services) to send some identifying personal information (like name and/or DOB, but not the NID) to the Base Service.

Note that third party ID registries can be dedicated to a specific personal ID type or they can accommodate multiple personal ID types. In fact, all personal ID types can be stored and managed in just one large third party registry, keeping in mind that there is nothing that links multiple ID numbers owned by the same person.

As stated above, this decentralized model is made possible via utilization of HUID, CSID, and KEY-TIE numbers. Recall that an HUID (or "Hidden Unique ID") serves as the "Base Number" for deterministically generating a CSID number, with each HUID (itself a CSID) being based on one's NID Claim number (or perhaps another unique personal identifier assigned during NID registration). For purposes herein, "hidden" means that such a number is never stored on a permanent storage device.

Like a CSID, a KEY-TIE is also derived from a never-stored ("hidden") base number. However, in previously describing this base number, it was never given a name. So hereinafter, this never-stored number used as the base number to generate a KEY-TIE will be referred to as a "Hidden Key" (or "HKEY"). Under this decentralized model, an HKEY, like an HUID, is derived from the unique key of a row in a registry table where a protected ID number is stored.

KEY-TIE numbers, like internally stored CSID numbers, are never transmitted externally by the Base Service. And CSID numbers that are transmitted externally are never stored internally (on a permanent storage device) by the Base Service. When a CSID is requested to be transmitted externally, it is generated on the spot via a deterministic algorithm.

Note that under this decentralized model, the only data item associated to an individual person that is shared between separate services is either an HUID or an HKEY, both of which reveal nothing at all about the individual. And by making sure that these two items are never stored in a permanent storage device, the separate protection services protect their data from each other and from the rest of the world. Even with total simultaneous access to all of the data stored with the Base Service and with any one or all of the ID registries, no one would be able to connect an individual's data from any one of these entities to another. As such, these ID registries are immune from data disclosure breaches. There is no need to worry about internal or external espionage.

Figure 12:
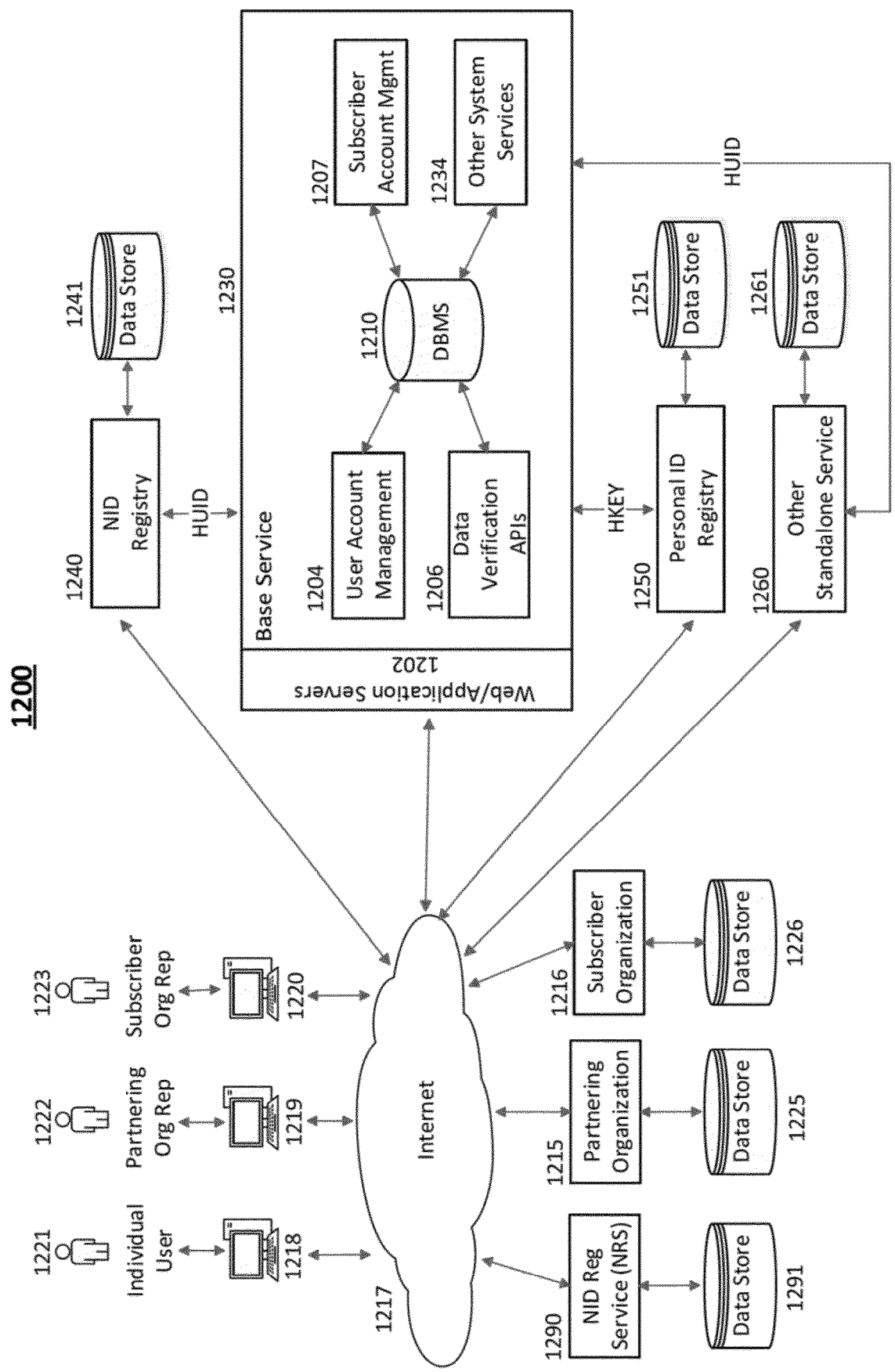
FIG. 12 is a diagram of a decentralized model or system in accordance with some alternative embodiments of the present disclosure.

FIG. 12 depicts an example of the deployment architecture of the Decentralized Model 1200.

In comparing the architecture of the Decentralized Model 1200 to the architecture of System 100 (depicted in FIG. 1), certain service components are identified as separate standalone entities in the Decentralized Model 1200. The Base Service 1230 replaces Management System 130, but in providing services, it relies on cooperation with these standalone entities, each of which is kept in the dark with each other and the Base Service 1230 regarding each individual 1221 they are serving.

The function of the Management System 130 National ID Lookup Service 103 is replaced by a NID Registry 1240, where protected NID numbers are stored. Functions of the Management System 130 Account Registration API 109 are replaced by the operation of one or more Personal ID Registries 1250, where other personal ID numbers registered for protection are stored.

The Decentralized Model 1200 also supports the utilization of one or more Other Standalone Services 1260 which are optional. Their purpose, when employed, is to replace services that can be provided by the Base Service 1230 (as they are or can be provided by Management System 130). Utilization of these Other Standalone Services 1260 serves to make the solution more decentralized and to provide for additional levels of privacy. An example of such a service is a separate "Personal Data Repository", which can allow certain data item types, including Name and DOB, to be insulated from the Base Service 1230. Another example is a separate "Mail Service", which can serve to insulate email addresses and email text from the Base Service 1230. And, as needs dictate, additional standalone services can be employed. There is no set limit on the number that can be accommodated. In utilizing standalone services (in addition to the NID and Personal ID registries), it is possible for the Base Service 1230 to provide protection for an individual 1221 without the Base Service 1230 knowing (or having any access to) any personal data associated to that individual 1221. This includes not having a name, or date of birth, or gender, or email address, or telephone number, or home address, etc., in addition to not having any associated personal ID numbers (other than those assigned by the Base Service 1230).

Note that the Base Service 1230 does not include a "Partnering Organization Account Management System" that is included with Management System 130. This is because such a facility is not required under the Decentralized Model 1200. However, the function of an entity as a "Partnering Organization" still applies. And in order to provide this function, such an organization must first be registered as a "Subscriber Organization" via the Subscriber Account Management Module 1207. The separate designations of "Subscriber Organization" and "Partnering Organization" will still be used, with the "Partnering Organization" designation being used when a Subscriber Organization 1216 is functioning as an ID custodian that provides for the registration and/or active protection of personal ID numbers.

Under the Decentralized Model 1200, signing up to be a Partnering Organization 1215 is managed by the Subscriber Account Management Module 1207. In registering to be a partnering organization 1215, an authorized subscriber organization representative 1223 accesses the subscriber organization account and selects an option to register as a Partnering Organization 1215. The module 1207 then prompts the subscriber representative 1223 to enter the ID-TYPE and SPHERE-ID for each ID-TYPE/SPHERE-ID combination for which the organization wishes to be a vehicle for ID protection and for the appropriate URLs (for site and/or API access). This information is then stored in the DBMS 1210 and is used to identify where an individual 1221 would register a specific type of ID number for protection and/or how a subscriber organization 1216 would make an API call to get verification of authorization of an individual 1221 to use a specific type of ID number, as a partnering organization 1215 can additionally be used in this capacity under the Decentralized Model 1200.

Other System Services 1234 included with the Base Service 1230, collectively identifies other services that are provided by Management System 130 but may or may not be provided by a deployed Base Service 1230.

For the sake of easy reference, the components of the Decentralized Model 1200 that share the same name as components of System 100 also share the same last 2 digits of the component number (e.g., Partnering Organization 1215 replaces Partnering Organization 115; Subscriber Organization 1216 replaces Subscriber Organization 116; Individual User 1221 replaces Individual User 121; etc.)

Figure 13:
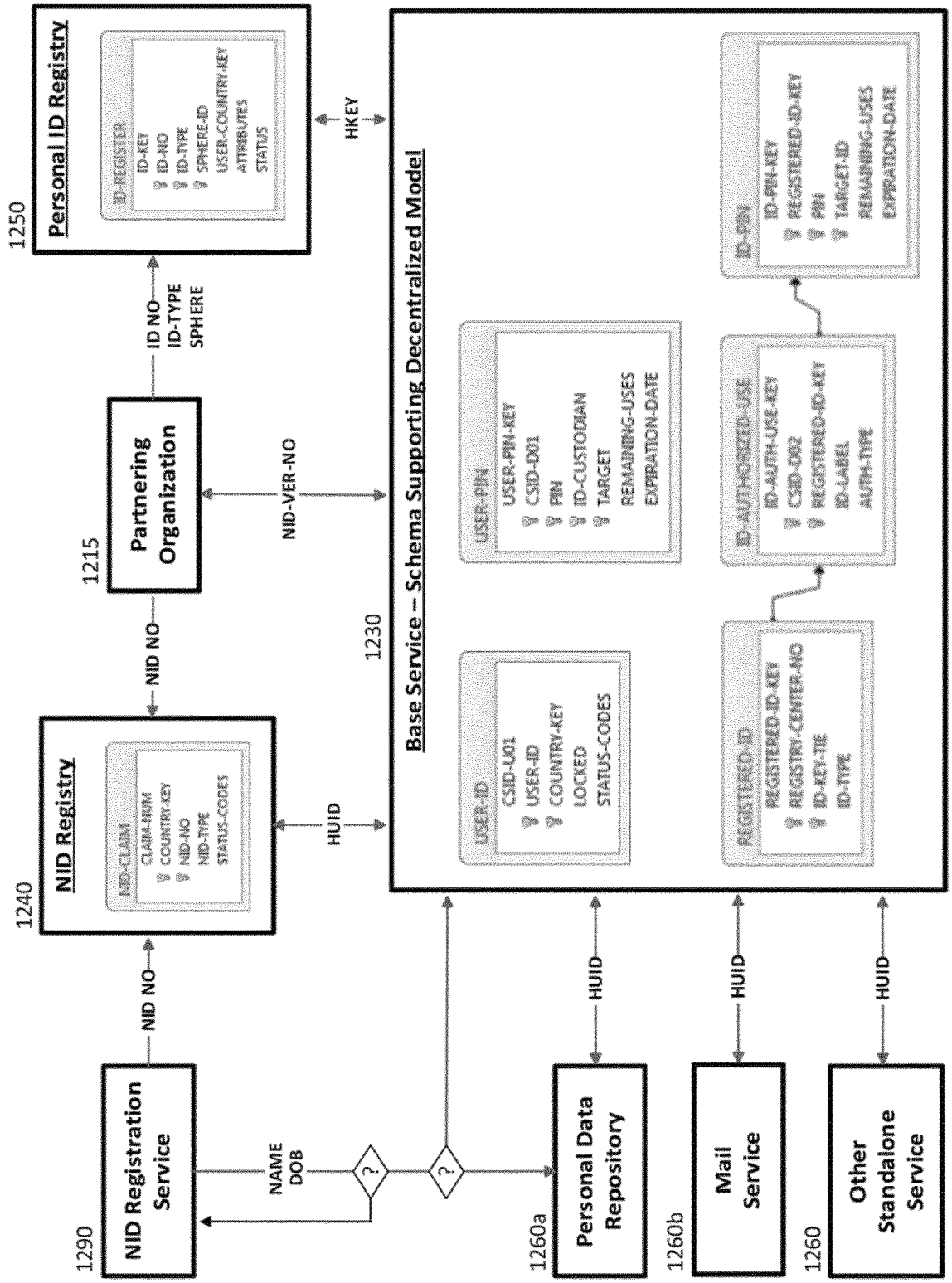
FIG. 13 shows data structures and data flows that can be used support the protection of personal data under the decentralized model of FIG. 12.

FIG. 13 shows exemplary data structures and data flows that can be used support the protection of personal data under the Decentralized Model 1200. Many variations could be employed. However, the process descriptions that follow will assume these structures and will reference the table and column names contained therein. Note that the key symbols (included with each table), instead of identifying a table's primary key, are used to identify the columns of a multi-column unique constraint. This deviation from convention is done in order to serve as an aid in identifying important data storage controls. In each table, the first column (which is not tagged with a key symbol) is the primary key.

The NID-CLAIM table and the USER-ID table are unchanged from the structures depicted in FIGS. 6A and 6G. The other five tables are new and specific to the Decentralized Model 1200. These tables replace the functionality of the tables depicted in FIGS. 6D and 6E.

The Personal Data Repository and Mail Service components shown in FIG. 13 (but not in FIG. 12) are, as stated above, examples of an optional Other Standalone Service 1260. In discussions that follow they will be referenced as "Personal Data Repository 1260*a*" and "Mail Service 1260*b*".

Registration of a NID with a NID Registry

Under the Decentralized Model 1200, when a personal ID number is registered for protection, whether it is a NID number or any other ID number type, it is not to be exposed to the Base Service 1230. As such, initiation of the registration process, including the collection and verification of personal data, is provided by an organization other than the Base Service 1230. This could be the organization that issued the ID number, or it can be any organization that has reliably validated (or can reliably validate) the ownership of the ID number. For the registration (or claiming) of a NID number, such an organization is identified in FIG. 12 as a NID Registration Service 1290 (or NRS 1290).

There are basically two general types of NID registration services from which an individual 1221 can choose to initiate the registration process—"private" or "public". A private NRS 1290 is provided by organizations that have verified NID numbers (with associated name and DOB) of account holders on file, and is available to those who can verify ownership of an account with the organization (e.g., by successfully logging on to an online account management system). Included among such organizations are banks, credit card companies, insurance companies, employers, etc.

A public NRS 1290 can be provided by any organization that can reliably verify (either by itself or via authorized interaction with another entity) the collective validity of a submitted NID, name, DOB, and any other personal data that may be required to sufficiently identify a person. A public NRS 1290 does not require a personal account to be held, and, as the name implies, is open to the public. Good candidates to serve as a public NRS 1290 are organizations that have all (or nearly all) of a nation's NID numbers on file, namely organizations that can do the verification themselves without the interaction of another entity. Certain government agencies (particularly the one that issues NID numbers) and credit bureaus can well fit this purpose. Such an organization could also serve as the nation's NID Registry 1240 and/or serve as a vehicle to verify the name and/or DOB of an individual 1221 in lieu of the Base Service 1230 providing this service. In doing the latter, name and/or DOB would not have to be sent to the Base Service 1230 unless opted for by the individual 1221. And such a scenario would be in keeping with the ideal of an individual 1221 being able to register an ID for protection without giving up identifying personal information to any entity that does not already have it.

Note that there is no restriction on the number of NID registration services that, once authorized, can simultaneously be in operation within the same country. Even if a public NRS 1290 also serves as the nation's exclusive NID registry, there is no requirement that this NRS 1290 be used to claim a NID (i.e., unless it was the only NRS 1290 available in a country).

For any individual 1221 to whom it is made available, using a private NRS 1290 to initiate the claiming of a NID may be considered to be the better choice. This is because a private service has already vetted the individual 1221 and can positively affect the individual 1221's identity strength at the point of registration. During the registration process, a private NRS 1290 can send to the Base Service 1230 the number of accounts held by the registrant (with the organization that manages the NRS) along with the length of time that each account has been held. Also, the registrant can optionally choose to automatically have each account ID number registered for protection with the appropriate Personal ID Registry 1250 following the completion of the registration of the NID. Note too, that in providing these extra services, at no time are any account ID numbers exposed to the Base Service 1230.

Figure 14:
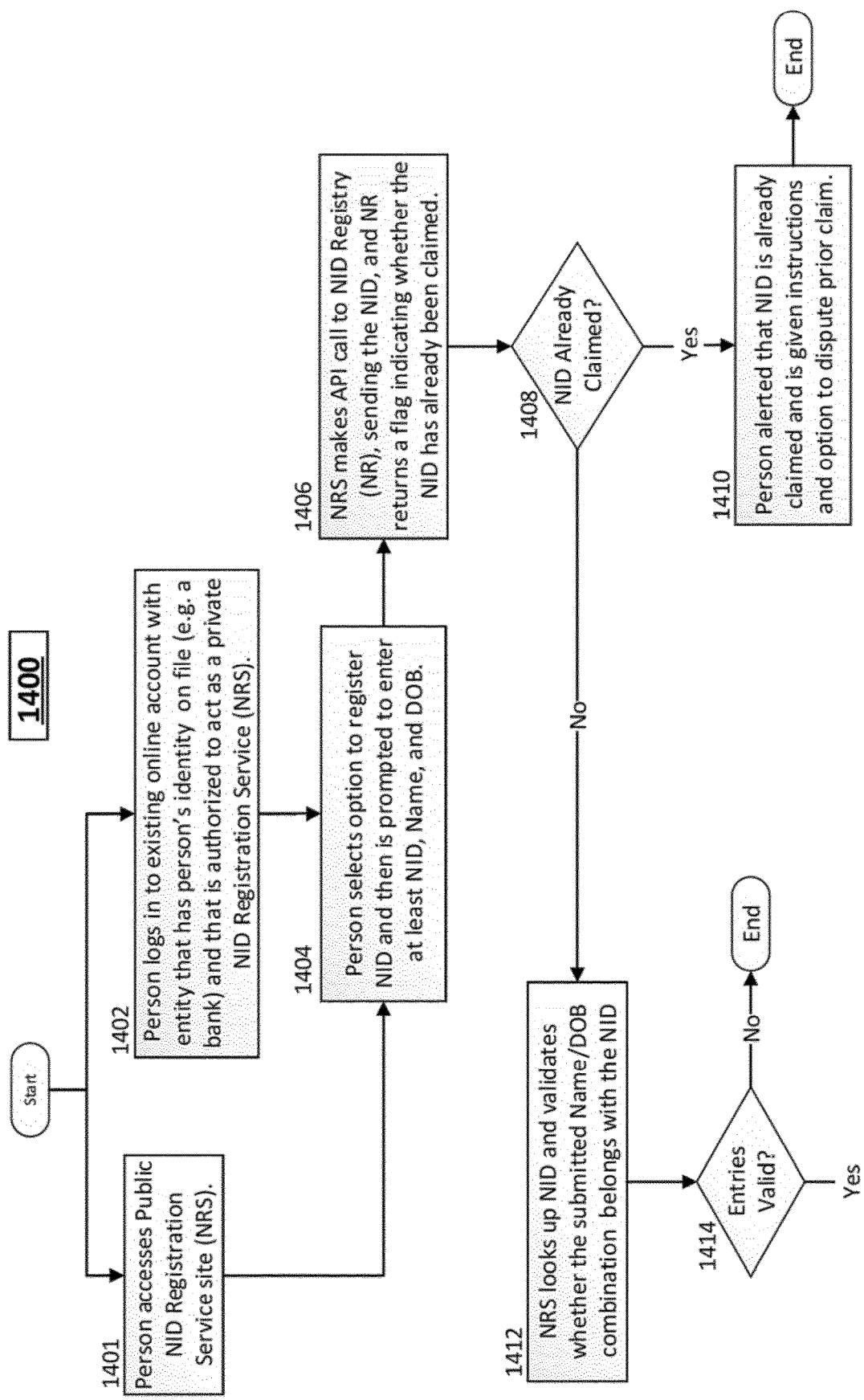
FIGS. 14 and 14A depict a flow diagram illustrating a process for accomplishing a NID registration in the decentralized model of FIG. 12 in accordance with some embodiments of the present disclosure.
Figure 14A:
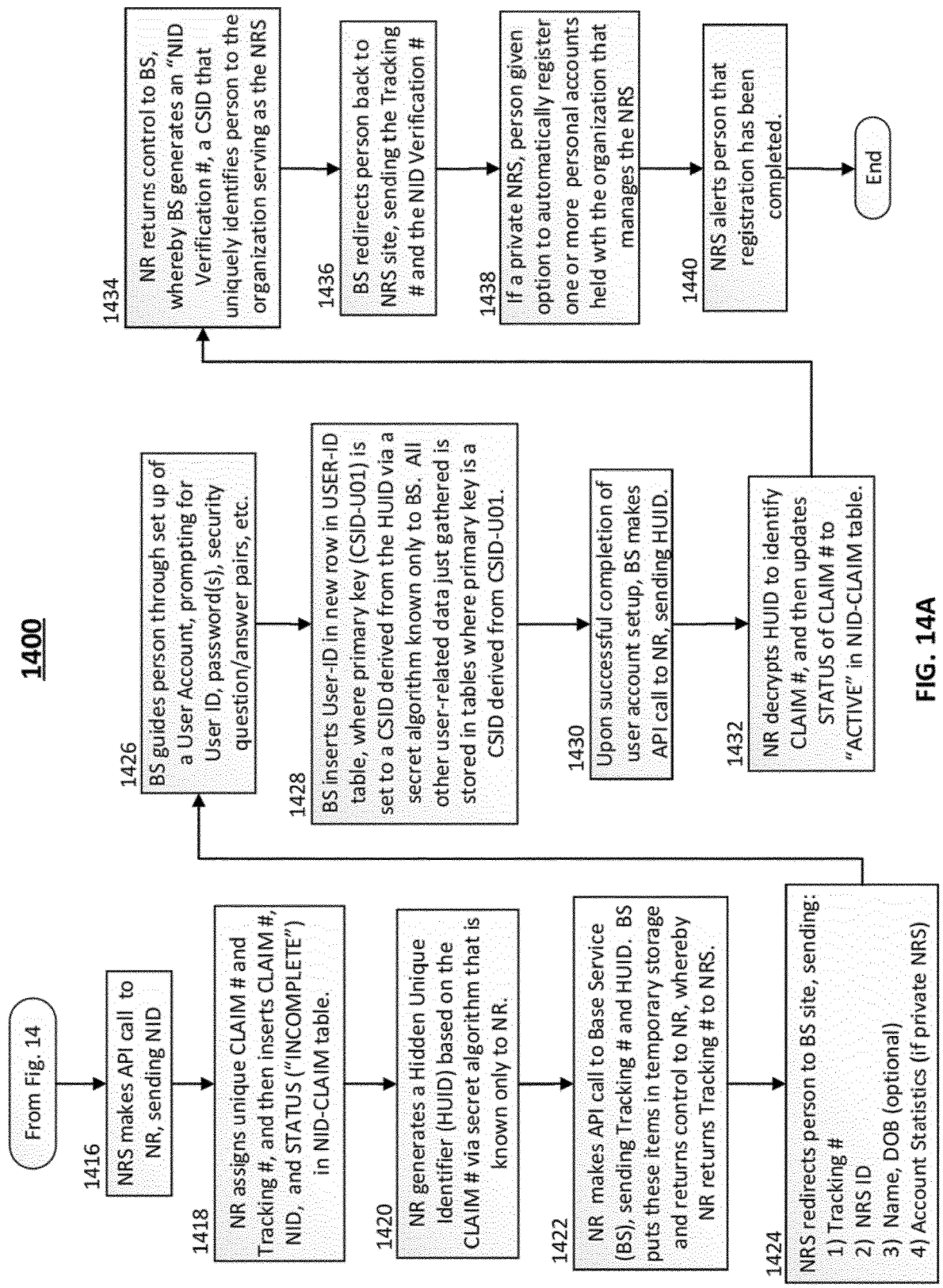

FIGS. 14 and 14A depict a flow diagram of a process 1400 for accomplishing a NID registration (under the Decentralized Model 1200), in accordance with certain embodiments, where the NRS 1290 sends the NID to a separately managed third party NID Registry 1240 that stores just the NID numbers without any associated identifying personal data.

The flow diagram of process 1400 references the database table structures presented in FIG. 13.

As indicated above, an individual 1221 can register a NID via either a public or private service. In FIG. 14, at 1401, a public NRS 1290 is accessed. At 1402, a private NRS 1290 is accessed. With the private service, the individual 1221 is required to successfully log in to an online account held with the organization that is providing the service. Aside from this login, processing is essentially the same for both public and private services, except that with the private service, account statistics can be sent to the Base Service 1230, and the individual 1221 may be given the option to have one or more account ID numbers (of accounts held with the organization providing the service) to be automatically registered for protection in the appropriate Personal ID Registry 1250 once the NID registration has been completed.

At 1404, the individual 1221 selects an option to register (or claim) a NID and then is prompted to enter at least a NID, full legal name, and DOB.

At 1406, upon submittal of the required entries, the NRS 1290 makes an API call to the NID Registry 1240, sending the submitted NID. The NID Registry 1240 then looks up the NID in data store 1241 and returns a flag indicating whether the NID has already been claimed. If the NID has already been claimed (as determined at 1408), the process 1400 is terminated after, at 1410, the individual 1221 is given instructions and an option to dispute the prior NID claim.

Assuming at 1408 that the NID has not already been claimed, then at 1412, the NRS 1290 looks up the submitted NID and validates whether the associated name and DOB are the same as the name and DOB that were submitted. If the entries are not valid (as determined at 1414), the registration process 1400 is terminated. If valid (as determined at 1414), the process 1400 continues.

Note that it is important that checking the NID claim status (which occurs at 1406) precedes the validation of the NID/Name/DOB combination (which occurs at 1412). The ordering of these two steps serves to protect a claimed NID from someone other than the rightful NID owner using this registration process 1400 to get verification of who that someone may think is the owner of the claimed NID.

At 1416, the NRS 1290 makes an API call to the NID Registry 1240, sending the submitted NID.

At 1418, the NID Registry 1240 assigns a unique CLAIM # and a registration Tracking #, and then inserts this CLAIM #, the NID, and a STATUS (set to "INCOMPLETE") in the NID-CLAIM table of the data store 1241.

At 1420, the NID Registry 1240 generates a "Hidden Unique Identifier" (HUID) via an algorithm known only to the NID Registry 1240. In embodiments, such a HUID is based on (derived from) the NID Claim number. It could alternatively be derived from the NID number itself, or any other number uniquely associated to the NID number. However, in embodiments, whichever number type is chosen to be used as the "Base Number" for an HUID, it must be the same for all HUID numbers of the same type. In discussions that follow regarding the decentralized model 1200, it is assumed that this HUID type is derived from the NID Claim number.

At 1422, the NID Registry 1240 makes an API call to the Base Service 1230, sending the Tracking # and the HUID. The Base Service 1230 puts these 2 data items in temporary storage and returns control to the NID Registry 1240, whereby the NID Registry 1240 returns the registration Tracking # to the NRS 1290.

At 1424, the NRS 1290 redirects the individual 1221 to the Base Service User Account Management 1204 site, sending:
1) Tracking #
2) NRS ID
3) Name and/or DOB (both optional)
4) Account Statistics (optionally sent, and only if a private NRS).

A NRS-ID is a number that uniquely identifies a NRS 1290. It is assigned when the service is set up. It is stored by the Base Service 1230, as it can be helpful in the event of a suspicious or disputed NID claim.

The sending of name and/or DOB from the NRS 1290 to the Base Service 1230 at 1424 is optional because either one of both of these items can be stored by an entity separate from the Base Service 1230 (e.g., by a Personal Data Repository 1260a), and be used in lieu of the Base Service 1230 to verify the name and/or DOB of an individual 1221, with communication between the two separate entities being managed via use of a HUID number associated to the individual 1221. However, there are certain advantages with name and/or DOB being managed by the Base Service 1230, even though it violates the ideal of a person being able to protect an ID number without the need to give up any identifying personal information to any entity that does not already have it.

If a private service, the NRS 1290 can optionally send the number of accounts held by the registrant (with the organization that manages the NRS) along with the length of time that each account has been held. Such statistics are used to score the identity strength of an individual 1221.

At 1426, while on the Base Service User Account Management 1204 site, the individual 1221 is guided through the setup of a user account, being prompted for a User ID (that must be unique within the country), password(s), security question/answer pairs, etc. An email address, or phone number, or some other means of communicating with the individual 1221 may also be prompted for. However, as is the case with name and DOB, this piece of data can be stored by an external entity separate from the Base Service 1230 (e.g., by a Mail Service 1260b or a Personal Data Repository 1260a), with communication between the separate entities being managed via use of an HUID number associated to the individual 1221. If the separation of this data item is deemed desirable, then the individual 1221 would be redirected to a separate site at some point during this user account setup process in order to make this entry.

Note that HUID numbers used to tie an individual 1221 between the Base Service 1230 and separate external service entities (other than the NID Registry 1240) are each generated by the Base Service 1230 and based on the primary key of the USER-ID table (CSID-U01) associated to the individual 1221 with a CONTEXT-ID that is different for each separate external entity. A HUID number used to tie an individual 1221 between the Base Service 1230 and the NID Registry 1240 is generated by the NID Registry 1240 and based on the individual 1221's NID Claim number with a CONTEXT-ID specific to the NID Registry 1240. So, for any individual 1221, it is extremely likely that each HUID number used to tie an individual 1221 to an external service is drastically different from the HUID numbers used to tie the individual 1221 to other external services.

The following steps (related to process 1400) assume that the individual 1221 successfully completes all of the entries required in order for a user account to be set up. If this does not happen, both the NID Registry 1240 and the NRS 1290 are appropriately notified and processing is stopped.

At 1428, the Base Service 1230 inserts the submitted User-ID in a new row in the USER-ID table of DBMS 1210, where the primary key (CSID-U01) is set to a CSID derived from the HUID via a secret algorithm known only to the Base Service 1230. All other just-gathered user-related data that is to stay with the Base Service 1230 is stored in DBMS 1210 tables where the primary key is a CSID derived from CSID-U01.

Upon completion of the user account setup process, at 1430, the Base Service 1230 makes an API call to the NID Registry 1240, sending the HUID that was generated at 1420 by the NID Registry 1240.

At 1432, the NID Registry 1240 decrypts the HUID to identify the CLAIM #(assigned at 1418), and then updates the STATUS of the CLAIM # (in NID-CLAIM Table of the data store 1241) to indicate that it is "ACTIVE".

At 1434, the NID Registry returns control to the Base Service 1230, whereupon the Base Service 1230 generates an "NID Verification Number", which is a CSID that uniquely identifies the individual 1221 to the organization serving as the NRS. This NID Verification Number serves to indicate that the organization has successfully verified the individual 1221's NID claim.

At 1436, the Base Service 1230 redirects the individual 1221 back to the NRS 1290 site, sending the registration Tracking # and the NID Verification Number, where the NID Verification Number is optionally stored in data store 1291.

At 1438, if the NRS 1290 is private, the individual 1221 is given the option to automatically register one or more of the ID numbers associated to personal accounts held with the organization that manages the private NRS 1290.

At 1440, the NRS 1290 alerts the individual 1221 that the NID registration process 1400 has been completed.

Note the following 3 points about process 1400: 1) The NID number is shared between the NRS 1290 and the NID Registry 1240 but is not exposed to the Base Service 1230; 2) Name and/or DOB may optionally be shared between the NRS 1290 and the Base Service 1230 but are not exposed to the NID Registry 1240; and 3) The HUID generated by the NID Registry 1240 is shared with the Base Service 1230 but is not exposed to the NRS 1290.

Figure 15:
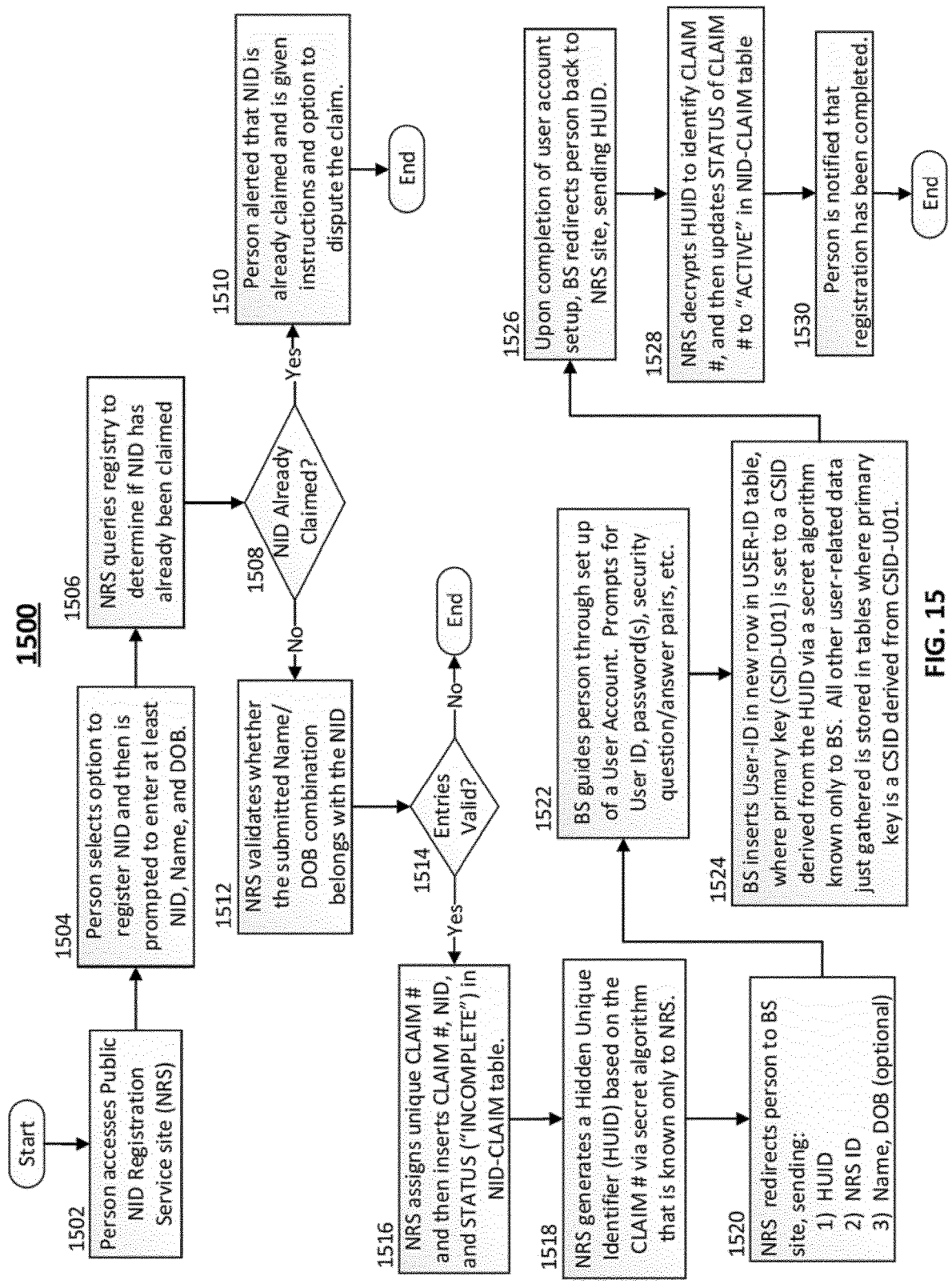
FIG. 15 is a flow diagram illustrating a process for accomplishing a NID registration in the decentralized model of FIG. 12 via an organization that serves both as a public NID registration service and as the NID registry in accordance with some embodiments of the present disclosure.

FIG. 15 depicts a flow diagram of process 1500 illustrating an example method for accomplishing a NID registration (under the decentralized model 1200) via an organization that serves both as a public NRS 1290 and as the NID Registry 1240.

The flow diagram of process 1500 references the database table structures presented in FIG. 13.

In FIG. 15, at 1502, an individual 1221 accesses a public NRS 1290 site. At 1504, the individual 1221 selects an option to register (or claim) a NID and then is prompted to enter at least a NID, full legal name, and DOB.

At 1506, upon submittal of the required entries, the NRS 1290 queries the NID Registry 1240 data store 1241 (which is managed by the same organization) to determine if the submitted NID has already been claimed. If the NID has already been claimed (as determined at 1508), the process 1500 is terminated after, at 1510, the individual 1221 is given instructions and an option to dispute the prior NID claim. If the NID has not already been claimed (as determined at 1508), the process 1500 continues.

At 1512, the NRS 1290 looks up the submitted NID and validates whether the associated name and DOB are the same as the name and DOB that were submitted. If the entries are not valid, the registration process 1500 is terminated.

At 1516, the NRS 1290 (acting as the NID Registry 1240) assigns a unique CLAIM # and then inserts this CLAIM #, the NID, and a STATUS (set to "INCOMPLETE") in the NID-CLAIM table of data store 1241.

At 1518, the NRS 1290 (acting as the NID Registry 1240) generates a Hidden Unique Identifier (HUID) based on the Claim # via a secret algorithm known only to the NRS 1290.

At 1520, the NRS 1290 redirects the individual 1221 to the Base Service User Account Management 1204 site, sending:

1) HUID
2) NRS-ID
3) Name and/or DOB (both optional)

A NRS-ID is a number that uniquely identifies a NRS 1290. It is assigned when the service is set up. The NRS-ID is stored by the Base Service 1230, as it can be helpful in the event of a suspicious or disputed NID claim.

The sending of name and/or DOB from the NRS 1290 to the Base Service 1230 is optional at 1520 because either one of both of these items can be stored by an entity separate from the Base Service 1230 (e.g., this NRS 1290 or a Personal Data Repository 1260a) and be used in lieu of the Base Service 1230 to verify the name and/or DOB of an individual 1221.

At 1522, while on the Base Service User Account Management 1204 site, the individual 1221 is guided through the setup of a user account, being prompted for a User ID (that must be unique within the country), password(s), security question/answer pairs, etc. An email address, or phone number, or some other means of communicating with the individual 1221 may be prompted for. However, this piece of data can be stored by an entity separate from the Base Service 1230 (e.g., by a Mail Service 1260b or a Personal Data Repository 1260a), with communication between the separate entities being managed via use of a HUID number associated to the individual 1221. If separation of this data item is deemed desirable, then the individual 1221 would be redirected to a separate site at some point during this user account setup process in order to make this entry.

The following steps (related to process 1500) assume that the individual 1221 successfully completes all of the entries required in order for a user account to be set up. If this does not happen, the NRS 1290 is appropriately notified and processing is stopped.

At 1524, the Base Service 1230 inserts the submitted User-ID in a new row in the USER-ID table of DBMS 1210, where the primary key (CSID-U01) is set to a CSID derived from the HUID via a secret algorithm known only to the Base Service 1230. All other just-gathered user-related data that is to stay with the Base Service 1230 is stored in DBMS 1210 tables where the primary key is a CSID derived from CSID-U01.

Upon completion of the user account setup process, at 1526, the Base Service 1230 redirects the individual 1221 back to the NRS 1290 site, sending the HUID.

At 1528, the NRS 1290 decrypts the HUID to identify the CLAIM # (assigned at 1516), and then updates the STATUS of the CLAIM # (in the NID-CLAIM Table of data store 1241) to indicate that it is "ACTIVE".

At 1530, the individual 1221 is notified that the NID registration process 1500 has been completed.

Online Verification of a NID

Figure 16A:
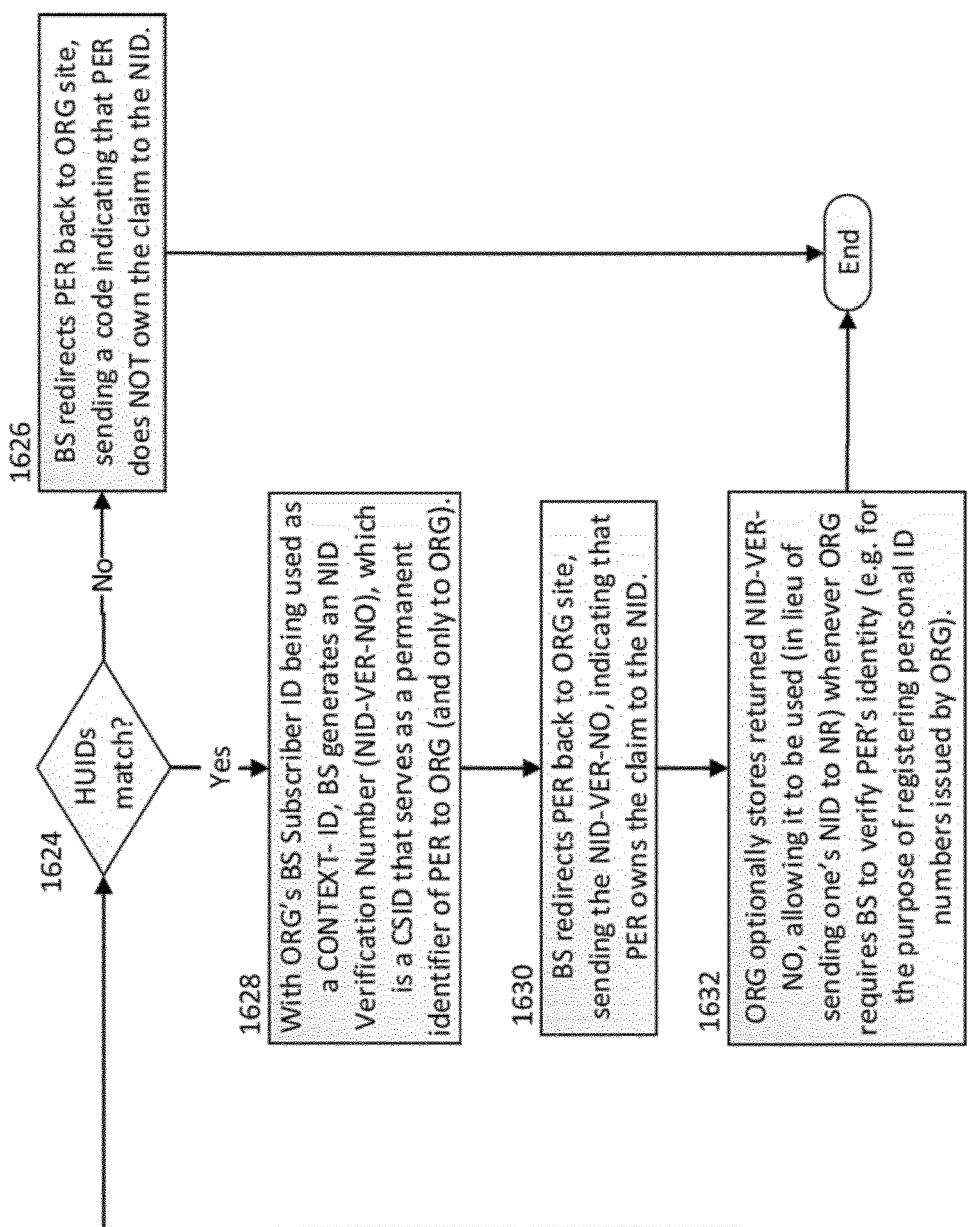

FIGS. 16 and 16A depict a flow diagram of process 1600 illustrating an example method for a subscriber organization 1216 to acquire a real-time online verification of a submitted NID while the submitting individual is on the website of the subscriber organization 1216 that is seeking verification. This process 1600 returns a "NID Verification Number" (NID-VER-NO) if verification is successful.

The flow diagram of process 1600 references the database table structures presented in FIG. 13.

In FIG. 16, at 1602, while an individual 1221 is on the website of a subscriber organization 1216 (e.g., credit card company, insurance company, employer, etc.) to which the individual 1221 had submitted a NID, an action is initiated to check the claim status of this NID, and if claimed, to verify whether the individual 1221 owns the claim.

At 1604, the subscriber organization 1216 makes an API call to the NID Registry 1240, sending the NID to be verified.

At 1606, the NID Registry 1240 searches data store 1241 for the NID, and if found, checks its CLAIM STATUS.

If (as determined at 1608) the NID has not been claimed or it has been claimed but is not ACTIVE, then at 1610, the NID Registry 1240 returns to the subscriber organization 1216 a code indicating either that the NID has "NOT BEEN CLAIMED" or that the Claim is "NOT ACTIVE" and the verification process 1600 is terminated. Otherwise the process 1600 continues.

At 1612, the NID Registry 1240 generates a Hidden Unique Identifier (HUID) based on the current NID CLAIM # via a deterministic algorithm known only to the NID Registry 1240. This HUID is shared with the Base Service 1230, but never stored by either the Base Service 1230 or the NID Registry 1240.

At 1614, the NID Registry 1240 encrypts the HUID to a value that only the Base Service 1230) can decrypt, assigns a Tracking #, and returns the Tracking # and the encrypted HUID to the subscriber organization 1216

At 1616, the subscriber organization 1216 redirects the individual 1221 to the Base Service 1230 site, sending the Tracking #, the encrypted HUID, and the subscriber organization 1216's Subscriber ID.

At 1618, the individual 1221 is prompted to log in to the Base Service 1230.

At 1620, upon completion of a successful log in, the Base Service 1230 uses the primary key of the individual 1221's User-ID record (CSID-U01) to generate the HUID associated to the individual 1221.

At 1622, the Base Service 1230 decrypts the encrypted HUID sent from the subscriber organization 1216 and then compares this value to the just generated HUID derived from the primary key of the User-ID record associated to individual 1221.

If the HUID numbers do not match (as determined at 1624), then, at 1626, the Base Service 1230 redirects the individual 1221 back to the subscriber organization 1216 site, sending a code indicating that the individual 1221 does not own the claim to the NID, and the verification process 1600 is ended. If the HUID numbers do match (as determined at 1624), the verification process 1600 continues.

At 1628, with the subscriber organization 1216's Subscriber ID being used as a CONTEXT-ID, the Base Service 1230 generates a NID Verification Number (NID-VER-NO), which is a CSID that serves as a permanent identifier of the individual 1221 to the subscriber organization 1216 (and only to the subscriber organization 1216). It also serves as an indication that the organization has successfully verified the individual 1221's NID claim.

At 1630, the Base Service 1230 redirects the individual 1221 back to the subscriber organization 1216 site, sending the NID-VER-NO, indicating that the individual 1221 owns the claim to the NID.

At 1632, the subscriber organization 1216 optionally stores the returned NID-VER-NO, allowing it to be used (in lieu of sending one's NID to the NID Registry 1240) whenever the subscriber organization 1216 requires the Base Service 1230 to verify the individual 1221's identity (e.g., for the purpose of registering personal ID numbers issued to the individual 1221 by the subscriber organization 1216). This completes the verification process 1600.

Registration of a (Non-NID) Personal ID Number with an ID Registry

The establishment of a national NID Registry 1240 provides the basis for the registration and protection of other personal ID numbers, particularly those ID types which require an individual to supply a verified NID before an ID number is issued (e.g., a credit card #, bank account #, passport #, insurance policy #, etc.). Such a registration is typically a simple matter, often involving little more than a click of a link on the website of a Partnering Organization 1215 that is custodian to one or more ID numbers issued to the individual (e.g., the ID issuer or ID processor). Such an option would be made available after the individual verifies ownership of the ID either by a successful online account login or some other means. And the triggered registration process is foolproof in ensuring that the person who is getting protected by the registration is the same person who claimed the account-associated NID in the NID registry 1240.

Like NID numbers, the protection of other personal ID number types can be provided via the Base Service 1230 without the Base Service 1230 ever having any access to or knowledge of the actual ID numbers. And like NID numbers, this can be accomplished via the utilization of a standalone registry separate from the Base Service 1230. And like the NID registry 1240, such a registry (a Personal ID Registry 1250) has no access to or knowledge of the Base Service 1230 user accounts of the individuals who registered their personal ID number(s). And, whereas the only data item type shared between the NID Registry 1240 and the Base Service 1230 is an HUID number, the only data item type shared between a Personal ID Registry 1250 and the Base Service 1230 is an HKEY, which, like an HUID, is never stored by either entity.

The Personal ID Registry 1250 can be managed by the Partnering Organization 1215 itself or by an independent third party. If a third party, protected ID numbers are stored without any attending personal data. And if multiple ID #s are registered by the same person, there is nothing that visibly links them as belonging to one (albeit unknown) person. So, as is the case with protected NID numbers, both a third party Personal ID registry 1250 and the Base Service 1230 are kept completely in the dark about ID ownership.

Figure 17:
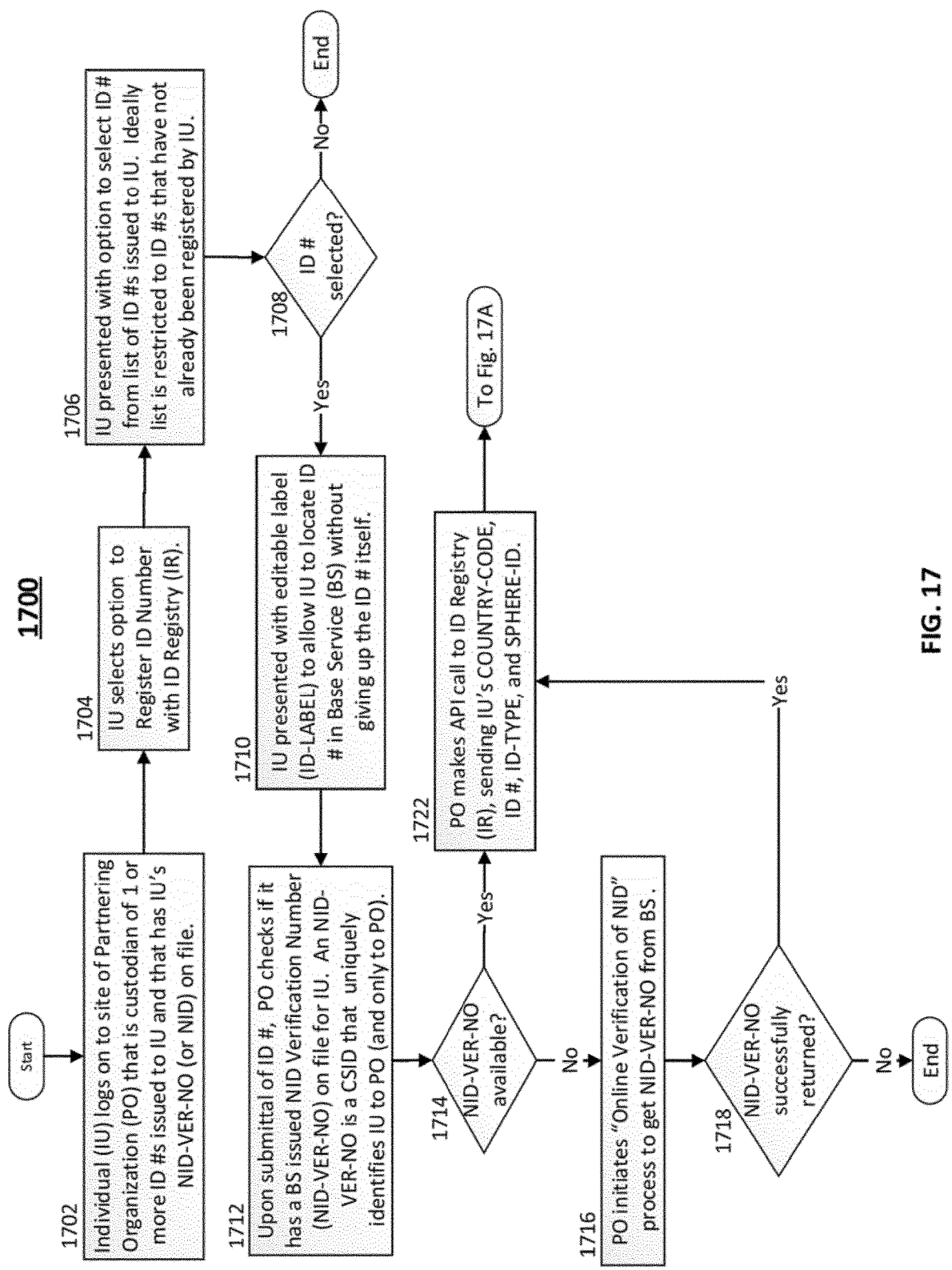
FIGS. 17 and 17A depict a flow diagram illustrating a process for registering a (non-NID) personal ID number in accordance with some embodiments of the present disclosure.
Figure 17A:
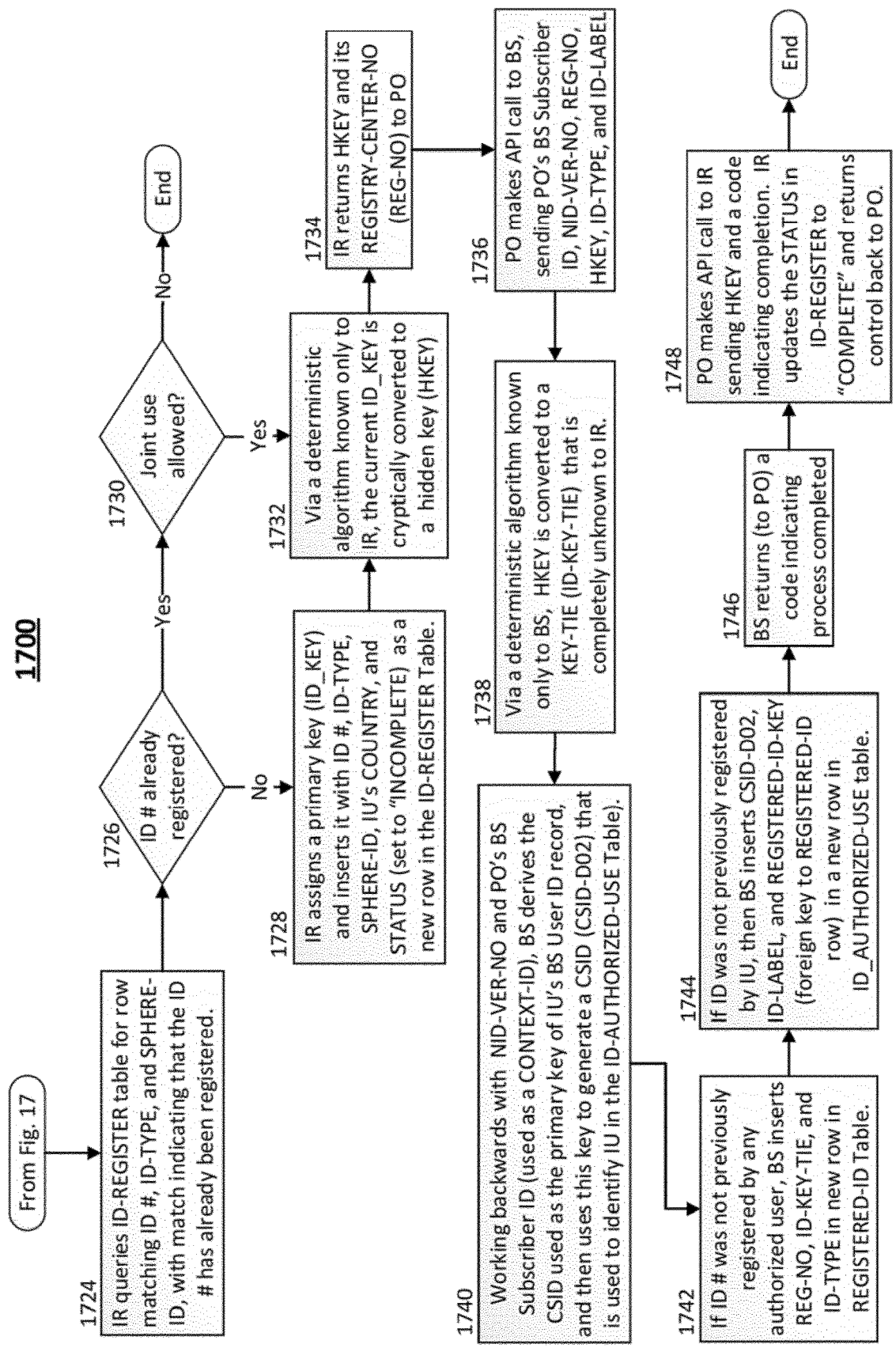

FIGS. 17 and 17A depict a flow diagram of process 1700 illustrating an example method for accomplishing the registration of a (non-NID) personal ID number with a standalone Personal ID Registry 1250. This example shows the registration being initiated from the site of a partnering organization 1215 that is a custodian of the ID number and where the individual 1221 registering the ID number has an online account with this partnering organization 1215.

The flow diagram of process 1700 references the database table structures presented in FIG. 13.

In FIG. 17, at 1702, an individual 1221 logs on to site of a Partnering Organization 1215 that is a custodian of one or more personal ID numbers issued to the individual 1221 (e.g., a bank, credit card company, insurance company, government agency, etc.), and that has the individual 1221's NID-VER-NO (or NID) on file. A NID-VER-NO is a CSID that uniquely identifies an individual 1221 to an organization (in this case, the partnering organization 1215). It additionally serves to indicate that the organization has successfully verified the individual 1221's NID claim (via verification the individual 1221's NID number or some other registered personal ID number).

At 1704, the individual 1221 selects an option to "Register ID Number with ID Registry".

At 1706, the individual 1221 is presented with an option to select an ID number from a list of ID numbers issued to the individual 1221. Ideally this list is restricted to ID #'s that have not already been registered with a Personal ID Registry 1250. If no ID number is selected (as determine at 1708), then the registration process 1700 is terminated.

Note that although this process 1700 illustrates the registration of just one selected ID number at a time, the selection of multiple ID numbers for simultaneous registration can also be supported.

At 1710, the individual 1221 is presented with an editable label. This label (ID-LABEL) is used to allow the individual 1221 to be able to identify the ID number in the Base Service 1230 without exposing the whole ID number itself. For example, the type and the last 4 digits of the number can be used (e.g., "VISA-3417"). Or, perhaps just the account type will do (e.g., "VISA", "MC", "Medicare"), particularly if the individual 1221 only has one ID number of that type. Note, however, that there is nothing to prevent the individual 1221 from entering the entire ID number. It is a matter of personal choice.

At 1712, upon submittal of an ID number, the partnering organization 1215 checks if it has a Base Service 1230 issued NID Verification Number (NID-VER-NO) on file for the individual 1221.

If the partnering organization 1215 does not have a NID-VER-NO on file for the individual 1221 (as determined at 1714), then at 1716, the partnering organization 1215 initiates the "Online Verification of a NID" process 1600 (depicted in FIGS. 16 and 16A) to get the NID-VER-NO from the Base Service 1230. This process 1600 involves interaction with the NID Registry 1240 and requires the individual 1221's NID number to be passed. If the NID-VER-NO is not successfully returned (as determined at step 1718), the ID registration process 1700 is terminated.

Note that even if the partnering organization 1215 does not need to initiate the "Online Verification of a NID" process 1600 because it already has the individual 1221's NID-VER-NO on file, as an extra layer of security, the partnering organization 1215 can direct the individual 1221 to the Base Service 1230 and require a logon in order to verify same-person ownership of the NID-VER-NO. This helps to the extent that it serves to prevent someone other than the individual 1221 from logging in to the individual 1221's online account with the partnering organization 1215 and registering an ID number without the individual 1221's consent. However, with or without this extra layer of protection, process 1700 ensures that the ID registration will still be linked to the individual 1221 associated to the NID-VER-NO, and only to this individual.

At 1722, the partnering organization 1215 makes an API call to the Personal ID Registry 1250, sending:
1) COUNTRY-CODE (of individual 1221)
2) ID #
3) ID-TYPE (if necessary)
4) SPHERE-ID (if necessary—e.g., a routing # if ID # is for a bank account)

The passing of ID-TYPE is not required if the Personal ID Registry 1250 is dedicated to a single ID number type (e.g., a registry restricted to just credit card #s or just bank account #s). Also, if all of the ID numbers stored in the Personal ID Registry 1250 have the same SPHERE-ID or have a SPHERE-ID embedded in the ID number, then the passing of a SPHERE-ID would not be required. Recall that a SPHERE-ID (referenced in the description of System 100), represents what is needed to be included with an ID # in order to make the combination globally unique within a given ID-TYPE. For a bank account number, this could be a routing number. For an insurance policy number, this could be an NAIC number. For a credit card number, none is needed, as a SPHERE-ID is embedded in the number itself.

At 1724, the Personal ID Registry 1250 queries the ID-REGISTER table of data store 1251 for a row that matches the ID #, ID-TYPE, and SPHERE-ID sent by the API call, with a match indicating that the ID # has already been registered.

If the ID # has not yet been registered (as determined at 1726), then at 1728, the Personal ID Registry 1250 assigns a primary key (ID_KEY) and inserts it with COUNTRY-CODE, ID #, ID-TYPE (if necessary), SPHERE-ID (if necessary), and STATUS (set to "INCOMPLETE") as a new row in the ID-REGISTER Table of data store 1251.

If the ID # has already been registered (as determined at 1726) and the ID number is of the type where joint use is not permissible (e.g., a passport, driver license, etc.) (as determined at 1730), then the individual 1221 would be notified that the ID number has already been registered and process 1700 will be ended.

If the ID # has already been registered and the ID number is of the type where joint ownership (or joint use) is permissible (e.g., credit card, bank account, insurance policy, etc.) (as determined at 1730), then the process 1700 continues, as the previous registration may have been done by someone else who is identified as authorized to use the ID number (e.g., a joint owner). This would be the case if, back at 1706, the list of ID numbers was restricted to those that have not already been registered by the individual 1221. Also at this point, if the individual 1221's COUNTRY-KEY is different than that on file, then the Personal ID Registry 1250 stores this COUNTRY-KEY in a row linked to current ID-REGISTER row.

At 1732, via a deterministic algorithm known only to the Personal ID Registry 1250, the current ID_KEY (i.e., the primary key of the current ID-REGISTER row) is cryptically converted to a hidden key (HKEY), which is shared with the Base Service 1230, but never stored by either the Base Service 1230 or the Personal ID Registry 1250.

At 1734, the Personal ID Registry 1250 returns the generated HKEY and its assigned REGISTRY-CENTER-NO to the partnering organization 1215. A REGISTRY-CENTER-NO is assigned to an ID Registry when it is established in order to distinguish it from all other ID Registries.

At 1736, the partnering organization 1215 makes an API call to the Base Service 1230, sending the partnering organization 1215's Subscriber ID, NID-VER-NO, REGISTRY-CENTER-NO, HKEY, ID-TYPE, and ID-LABEL.

At 1738, via a deterministic algorithm known only to the Base Service 1230, the HKEY is converted to a KEY-TIE (that is to be stored as ID-KEY-TIE in the REGISTERED-ID table of DBMS 1210). This KEY-TIE is completely unknown to the Personal ID Registry 1250, just as the ID-KEY stored in the ID-REGISTER table of Personal ID Registry 1250 is completely unknown to the Base Service 1230, thus eliminating a detectable link between the two entities.

At 1740, working backwards with the NID-VER-NO and the partnering organization 1215's Subscriber ID (being used as a CONTEXT-ID), the Base Service 1230 derives the CSID used as the primary key of the individual 1221's Base Service USER-ID table record (CSID-U01), and then uses this key to generate a CSID (CSID-D02) that is used to identify the individual 1221 in ID-AUTHORIZED-USE Table of the DBMS 1210.

At 1742, if the ID # was not previously registered (by the individual 1221 or any other authorized person), the Base Service 1230 inserts REGISTRY-CENTER-NO, ID-KEY-TIE, ID-TYPE, and an assigned primary key (REGISTERED-ID-KEY) in new row in the REGISTERED-ID Table of DBMS 1210.

At 1744, if the ID # was not previously registered by the individual 1221, the Base Service 1230 inserts CSID-D02, ID-LABEL, and REGISTERED-ID-KEY (foreign key to REGISTERED-ID row) in a new row in the ID-AUTHORIZED-USE Table of DBMS 1210.

At 1746, the Base Service 1230 returns (to the partnering organization 1215) a code indicating that the registration process 1700 has been completed.

At 1748, partnering organization 1215 makes an API call to the Personal ID Registry 1250, sending the HKEY and the code indicating the registration process 1700 has been completed. The Personal ID Registry 1250 then updates the STATUS column (indicating "COMPLETE") of the new ID-REGISTER table row (which is located via conversion of the HKEY to the primary key of the new ID-REGISTER row). The Personal ID Registry 1250 then returns control back to partnering organization 1215 and the process 1700 is ended.

Signing Up for ID Protection with a Partnering Organization

Under the decentralized model 1200, many ID number types can be protected via a partnering organization 1215 (i.e., a custodian of one or more personal ID types) without any requirement for them to be sent to a Personal ID Registry 1250 or anywhere else. Protection of ID numbers via a partnering organization 1215 is made possible via utilization of NID Verification Numbers. Recall that a NID Verification Number (NID-VER-NO) is a CSID that uniquely identifies an individual 1221 to a subscriber organization 1216, and thus a partnering organization 1215 (as each partnering organization 1215 must also be a subscriber organization 1216). A NID-VER-NO is generated by the Base Service 1230 using a CONTEXT-ID that is set to the organization's Subscriber-ID and is returned by the Base Service 1230 to the organization when an individual's NID is successfully verified online. A NID-VER-NO can also conditionally be generated and returned when a personal ID number of another type (that is registered with a Personal ID Registry 1250) is successfully verified online. And like all externally sent CSID numbers, a NID-VER-NO is never stored on a permanent storage device by the Base Service 1230.

In providing for an individual 1221 to sign-up for protection of one or more personal ID numbers, a partnering organization 1215 must first make sure it has a NID-VER-NO for the individual 1221. Once a NID-VER-NO is secured, the manner in which the partnering organization 1215 has an individual 1221 sign up for this type of ID protection is solely at the discretion of the partnering organization 1215. For example, the partnering organization 1215 could require (or allow) the individual 1221 to individually specify each ID number desired to be protected. Alternatively, it could allow for an individual to request protection for all ID numbers (or all ID numbers of a given type) that the partnering organization 1215 has on file for the individual (now and optionally in the future) without needing to individually specify any of the actual numbers. This alternative provides efficiency and convenience when ID protection is sought through a partnering organization 1215 that typically holds (or can hold) multiple (or changing) ID numbers for any one person (e.g., vendors of serialized items, banks, insurance companies, financial brokers).

As an option, once an individual 1221 is signed up for protection with a partnering organization 1215, the individual 1221 can add the partnering organization 1215 to a Base Service DBMS 1210 table which can be used to provide a personalized "ID Custodian Lookup". Such a lookup can be made available to the individual 1221 when requesting the generation of a PIN for an ID number that is protected by a partnering organization 1215.

PIN Generation

For the real-time online processing of a submitted personal ID number, a redirection of the submitting individual 1221 to the Base Service 1230 site, followed by a successful Base Service login by the submitting individual 1221, provides the most reliable vehicle for verifying the authorization of the individual 1221 to use the submitted personal ID number. PINS, on the other hand, provide for a simple and effective means of verification of submitted personal ID numbers for other types of interactions—e.g., face-to-face, over-the-phone, email, regular mail, and online interactions where a Base Service 1230 site login is not feasible, desirable, or appropriate.

The Base Service 1230 provides for the generation of two types of PINS—a standard "ID-PIN" and a "USER-PIN". An ID-PIN is a PIN that is assigned to and works with a specified personal ID number that has been registered with an Personal ID Registry 1250. A USER-PIN is more general. It is assigned to an individual 1221, not necessarily to a specific ID number (other than a NID number). This provides for a great deal of flexibility regarding the range of identifiers that can be verified with such a PIN, including personal ID numbers that are signed up for protection with a partnering organization 1215 (without the ID numbers necessarily having been individually specified when signed up).

The following demonstrates an example of how PINS can be generated via the Base Service 1230. It assumes use of database structures depicted in FIG. 13.

An individual 1221, while logged onto the Base Service 1230 site, selects an option to generate a PIN. Upon selection, the Base Service 1230 generates the CSID that identifies the individual 1221 in the ID-AUTHORIZED-USE table (i.e. CSID-D02). The ID-AUTHORIZED-USE table is then queried for all rows where the CSID-D02 column matches the generated CSID. This results in a list of all ID numbers, each identified by an ID-LABEL, that the individual 1221 had registered for protection and that were sent to a Personal ID Registry 1250. Recall that an editable ID-LABEL is submitted by an individual 1221 when an ID number is registered to allow individual 1221 to avoid revealing the actual ID number to the Base Service 1230.

At least 2 rows are added to the list of ID-LABELS—one specifying the NID number type that applies to the individual's country (e.g., "Social Security Number") and one that covers ID numbers not listed (e.g., "ID TYPE NOT LISTED"). The Base Service 1230 then presents this list for the individual 1221 to select the ID number for which a PIN is desired. The following shows an example of what such a selection list may look like:

Get PIN for:
Blue Cross Policy
Driver's License
Master Card—3401
Master Card—5568
Medicare Card
Passport
S-Bank Checking
S-Bank Debit Card
Visa Card
W-Bank Checking
W-Bank Savings
- - -
Social Security Number
ID TYPE NOT LISTED Upon selection of the desired personal ID number, the individual 1221 is presented with PIN options. This would include the desired PIN length and specification of certain use restrictions—e.g., the # of allowed uses, an expiration date, and designation of a "TARGET" recipient, which restricts use of the PIN to a specified subscriber organization 1216 and thereby enhances PIN security. Identification of a target subscriber organization 1216 can be facilitated by a lookup utility.

If "ID TYPE NOT LISTED" was selected, the individual 1221 is presented with an option to identify the partnering organization 1215 that is "ID Custodian" for the ID number for which a PIN is being sought. Exercising this option serves to restrict use of the PIN to the individual 1221's ID number(s) managed by the partnering organization 1215. Without this designation, the PIN could potentially be used for a broad range of personal ID numbers associated to the individual 1221 (which in some cases may actually be desired). Identification of the appropriate partnering organization 1215 can be aided by either a personalized or general partnering organization lookup utility. Note too that the partnering organization 1215 can also be designated as the subscriber organization 1216 that is the TARGET recipient of the PIN.

Upon submittal of the PIN options, the Base Service 1230 generates and presents the PIN, giving the individual 1221 the option of overwriting it. Upon user acceptance, the Base Service 1230 inserts this PIN (and the specified options) in a new row in either the ID-PIN table or the USER-PIN table, depending on which ID number type was selected.

If one of the ID-LABELS was selected, a new row in the ID-PIN table is inserted, as an ID-LABEL represents a number that is registered with a Personal ID registry 1250. Included with the insertion is a foreign key (REGISTERED-ID-KEY) to the ID-AUTHORIZED-USE table row that was the source of the selected ID-LABEL.

If the country's NID number (e.g., "Social Security Number") or "ID TYPE NOT LISTED" was selected, a new row is inserted in the USER-PIN table. Included in the inserted row is a Base Service 1230 generated CSID (CSID-D01) that is used to identify the individual 1221 in the USER-PIN table. If the country's NID number was selected, then something that identifies the NID Registry 1240 would be inserted in the ID-CUSTODIAN column.

Verification of a NID Number Submitted with a PIN

Figure 18:
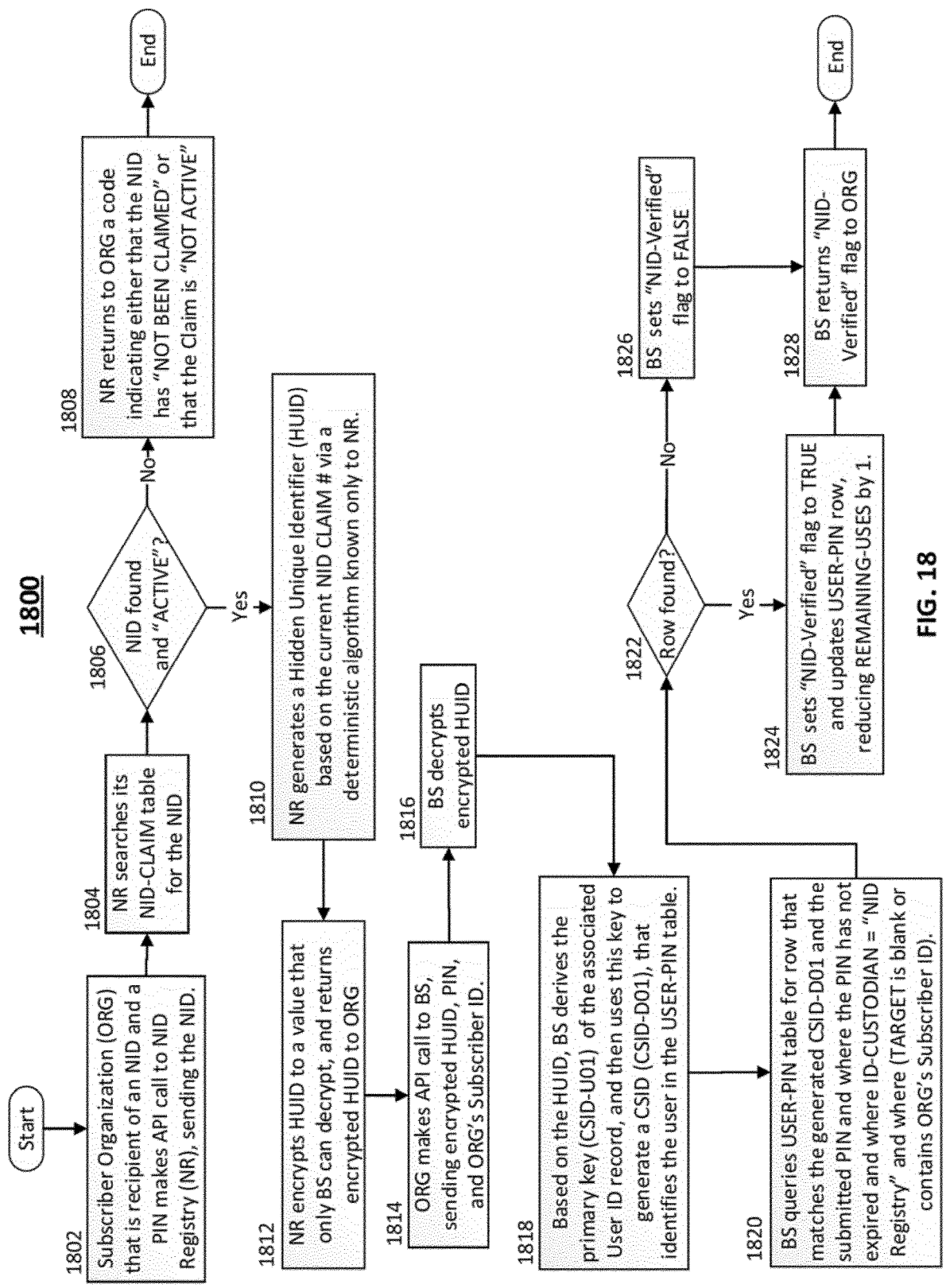
FIG. 18 depicts a flow diagram of a process for a subscriber organization to verify ownership of a NID number submitted with a PIN in accordance with some embodiments of the present disclosure.

FIG. 18 depicts a flow diagram of process 1800 illustrating an example method for a subscriber organization 1216 to verify ownership of a NID number that was submitted to them with a PIN.

This flow diagram of process 1800 references the database table structures presented in FIG. 13.

In FIG. 18, at 1802, a subscriber organization 1216 that is recipient of a NID and a PIN makes an API call to the NID Registry 1240, sending the NID.

At 1804, the NID Registry 1240 searches its NID-CLAIM table for the NID. If the NID is not found or is found but is NOT ACTIVE (as determined at 1806), then at 1808, the NID Registry 1240 returns to the subscriber organization 1216 a code indicating either that the NID has "NOT BEEN CLAIMED" or that the Claim is "NOT ACTIVE", and the process 1800 is then terminated.

At 1810, the NID Registry 1240 generates a Hidden Unique Identifier (HUID) based on the current NID CLAIM # via a deterministic algorithm known only to the NID Registry 1240. This HUID is shared with the Base Service 1230, but never stored by either the Base Service 1230 or the NID Registry 1240.

At 1812, the NID Registry 1240 encrypts the HUID to a value that only the Base Service 1230 can decrypt, and returns the encrypted HUID to the subscriber organization 1216.

At 1814, the subscriber organization 1216 makes API call to the Base Service 1230, sending the encrypted HUID, PIN, and the subscriber organization 1216's Subscriber ID. Note that the NID number being verified is not sent, as it is not to ever be exposed to the Base Service 1230.

At 1816, the Base Service 1230 decrypts the encrypted HUID

At 1818, based on the HUID, the Base Service 1230 derives the primary key (CSID-U01) of the associated User ID record, and then uses this key to generate a CSID (CSID-D01), that identifies the user in the USER-PIN table.

At 1820, the Base Service 1230 queries the USER-PIN table for a row that matches the generated CSID-D01 and the submitted PIN and (i) where the PIN has not expired and (ii) where ID-CUSTODIAN="NID Registry" and (iii) where TARGET is blank or contains the subscriber organization 1216's Subscriber ID.

If a matching USER-PIN row is found (as determined at 1822), then at 1824, the Base Service 1230 sets an "NID-Verified" flag to TRUE and updates the current USER-PIN row, reducing the column, REMAINING-USES, by 1. Otherwise, at 1826, the "NID-Verified" flag is set to FALSE.

At 1828, the Base Service 1230 returns the "NID-Verified" flag to the subscriber organization 1216 and the process 1800 is completed.

Verification of a (Non-NID) Personal ID Number Submitted with a PIN

As discussed earlier, non-NID personal ID/PIN submittals are sent to either a Personal ID Registry 1250 or a partnering organization 1215 for verification. Where they are sent is determined by the ID-TYPE and/or a SPHERE-ID. Depending on the application or the range of ID types that it receives, a subscriber organization 1216 may require either one or both of these additional items when an individual 1221 submits a personal ID to them. But often times, the subscriber organization 1216 would know what they are.

This section details an example for each of the two types of vehicles that can be used by a subscriber organization 1216 to seek verification of a personal ID number submitted to it with a PIN—one for verification through a Personal ID Registry 1250, and one for verification through a partnering organization 1215.

Figure 19:
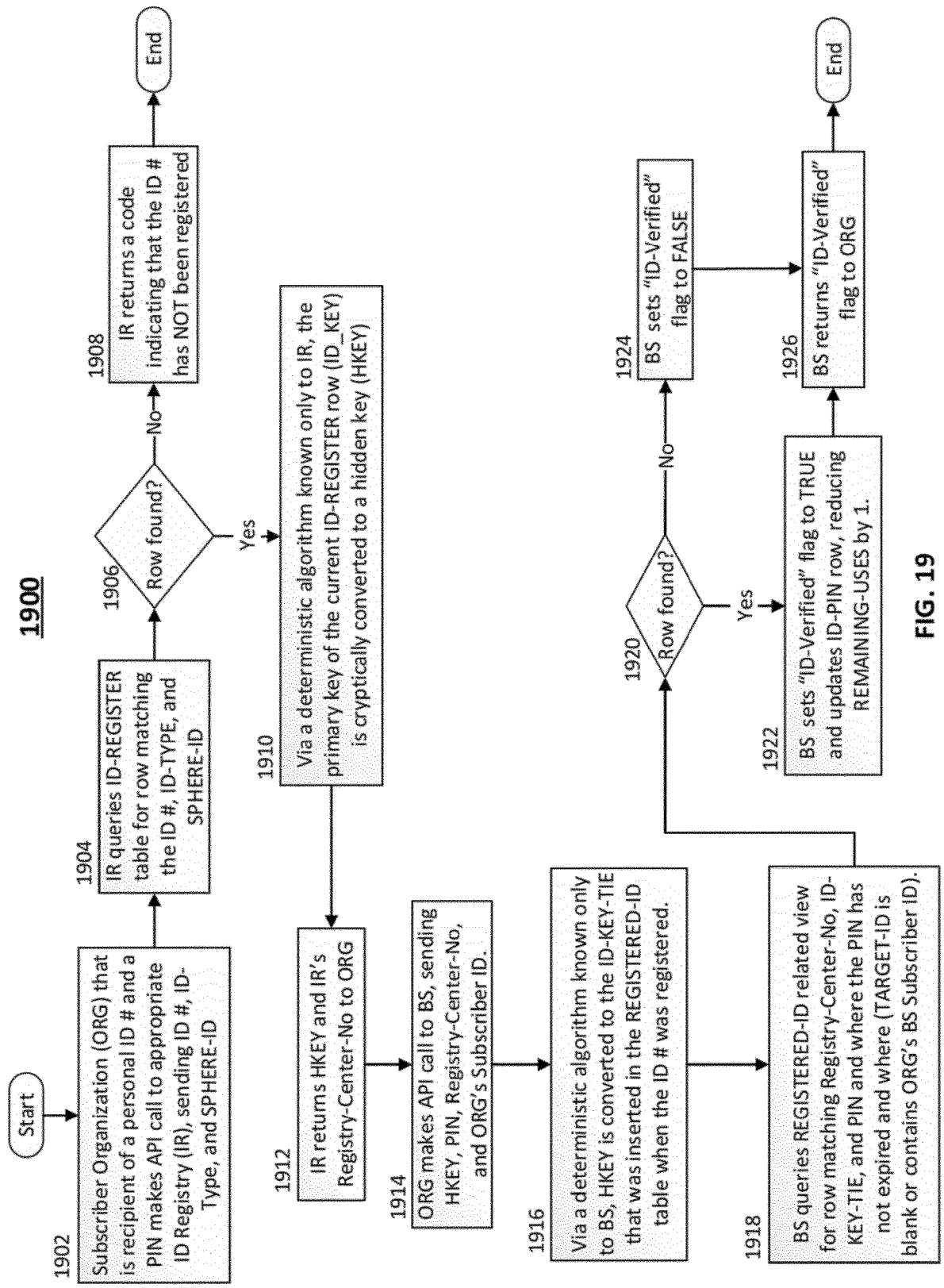
FIG. 19 depicts a flow diagram of a process for a subscriber organization to seek verification through a Personal ID Registry of a personal ID number submitted with a PIN in accordance with some embodiments of the present disclosure.

FIG. 19 depicts a flow diagram of process 1900 illustrating an example method for a subscriber organization 1216 to seek verification (through a Personal ID Registry 1250) of a personal ID number that was submitted to them with a PIN.

This flow diagram of process 1900 references the database table structures presented in FIG. 13.

In FIG. 19, at 1902, a subscriber organization 1216 that is recipient of a personal ID number and a PIN makes API call to the appropriate Personal ID Registry 1250, sending ID #, ID-TYPE, and SPHERE-ID At 1904, the Personal ID Registry 1250 queries its ID-REGISTER table for a row matching the ID #, ID-TYPE, and SPHERE-ID. If the row is not found (as determined at 1906), then at 1908, the Personal ID Registry 1250 returns a code indicating that the ID # has not been registered, and the process 1900 is ended.

At 1910, via a deterministic algorithm known only to the Personal ID Registry 1250, the primary key of the current ID-REGISTER row (ID_KEY) is cryptically converted to a hidden key (HKEY), which is shared with the Base Service 1230, but never stored by either the Base Service 1230 or the Personal ID Registry 1250.

At 1912, the Personal ID Registry 1250 returns the HKEY and its REGISTRY-CENTER-NO to the subscriber organization 1216.

At 1914, the subscriber organization 1216 makes API call to the Base Service 1230, sending HKEY, PIN, REGISTRY-CENTER-NO, and the subscriber organization 1216's Subscriber ID. Note that the actual ID number being verified is not sent, as it is not to ever be exposed to the Base Service 1230.

At 1916, via a deterministic algorithm known only to the Base Service 1230, the HKEY is converted to the ID-KEY-TIE that was inserted in the REGISTERED-ID table with the ID # when it was registered.

At 1918, the Base Service 1230 queries a DBMS 1210 REGISTERED-ID related view (that joins the REGISTERED-ID and ID-PIN tables on REGISTERED-ID-KEY) for a row matching REGISTRY-CENTER-NO, ID-KEY-TIE, and PIN and (i) where the PIN has not expired and (ii) where TARGET-ID is blank or contains the subscriber organization 1216's Subscriber ID.

If a matching row is found (as determined at 1920), then at 1922, the Base Service 1230 sets an "ID-Verified" flag to TRUE and then updates the related ID-PIN row, reducing REMAINING-USES by 1. Otherwise, at 1924, the Base Service 1230 sets the "ID-Verified" flag to FALSE.

At 1926, the Base Service 1230 returns "ID-Verified" flag to the subscriber organization 1216, and the process 1900 is then ended.

Figure 20:
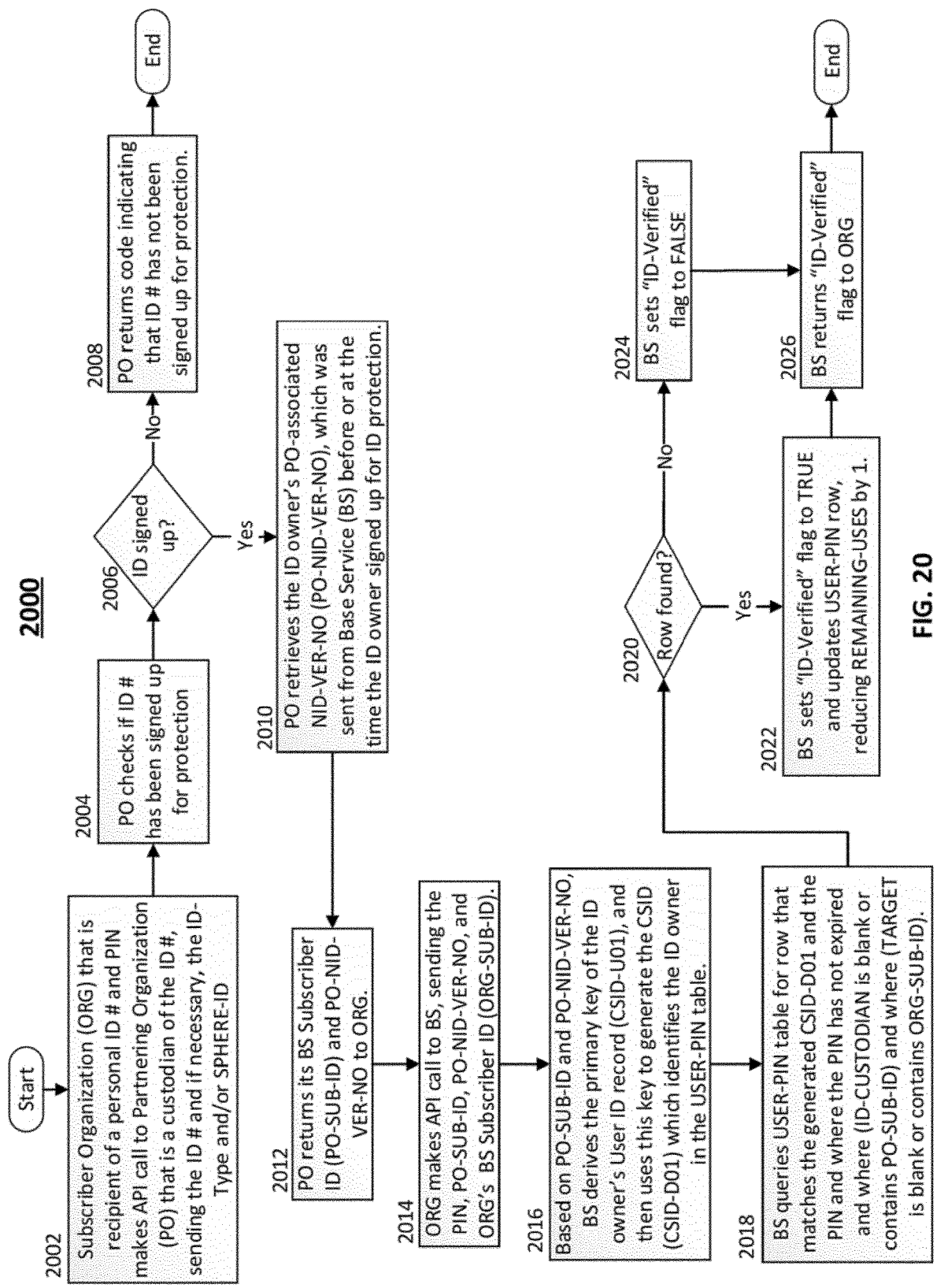
FIG. 20 depicts a flow diagram of a process for a subscriber organization to seek verification through a Partnering Organization of a personal ID number submitted with a PIN in accordance with some embodiments of the present disclosure.

FIG. 20 depicts a flow diagram of process 2000 illustrating an example method for a subscriber organization 1216 to seek verification (through a Partnering Organization 1215) of a personal ID number that was submitted to them with a PIN.

This process 2000 proceeds as though the ID number that is being verified is of a type that has only one authorized user (e.g., driver's license #, Medicare card #, employee #). However, ID number types that can have multiple authorized users (e.g., a credit card #, bank account #, insurance policy #) can also be accommodated. How multiple authorized users can be accommodated is described at the end of this discussion regarding process 2000.

This process 2000 references the database table structures presented in FIG. 13.

In FIG. 20, at 2002, a subscriber organization 1216 that is a recipient of a personal ID # and a PIN makes an API call to a partnering organization 1215 that is a custodian of the ID #, sending the ID # and if necessary, the ID-Type and/or SPHERE-ID At 2004, the partnering organization 1215 queries its records to check if the ID # has been signed up for protection If the ID # has not been signed up for protection (as determined at 2006), then at 2008, the partnering organization 1215 returns a code indicating that the ID # has not been signed up for protection, and then the process 2000 is ended.

At 2010, the partnering organization 1215 retrieves the ID owner's partnering organization 1215 associated NID-VER-NO (PO-NID-VER-NO), which was sent from the Base Service 1230 before or at the time the ID owner signed up for ID protection with the partnering organization 1215.

At 2012, the partnering organization 1215 returns its Subscriber ID (PO-SUB-ID) and the PO-NID-VER-NO to the subscriber organization 1216.

At 2014, the subscriber organization 1216 makes an API call to the Base Service 1230, sending the PIN, PO-SUB-ID, PO-NID-VER-NO, and the subscriber organization 1216's Subscriber ID (ORG-SUB-ID). Note that the actual ID number being verified is not sent, as it is not to ever be exposed to the Base Service 1230.

At 2016, based on PO-SUB-ID and PO-NID-VER-NO, the Base Service 1230 derives the primary key of the ID owner's User ID record (CSID-U01), and then uses this key to generate the CSID (CSID-D01) which identifies the ID owner in the USER-PIN table.

At 2018, the Base Service 1230 queries USER-PIN table for a row that matches the generated CSID-D01 and PIN and (i) where the PIN has not expired, and (ii) where ID-CUSTODIAN is blank or contains PO-SUB-ID, and (iii) where TARGET is blank or contains ORG-SUB-ID.

If a matching row is found (as determined at 2020), then at 2022, the Base Service 1230 sets "ID-Verified" flag to TRUE and updates USER-PIN row, reducing REMAINING-USES by 1. Otherwise, at 2024, the Base Service 1230 sets "ID-Verified" flag to FALSE At 2026, the Base Service 1230 returns "ID Verified" flag to the subscriber organization 1216, and the process 2000 is then ended.

As stated above, this process 2000 assumes that the ID number that is being verified is of a type that has only one authorized user. To accommodate ID numbers that can have multiple authorized users (e.g., a credit card #, bank account #, insurance policy #, etc.) the following changes can be incorporated:

At 2010, the partnering organization 1215 would not assume just one authorized user and instead retrieve all NID-VER-NOs associated with the ID number (which could still often just be one). At both 2012 and 2014, instead of being restricted to sending one NID-VER-NO, the list of NID-VER-NOs will be sent, and at 2016, a CSID-D01 would be generated for each NID-VER-NO in the list. Then, at 2018, a SQL "WHERE IN LIST" clause (or something equivalent) would be incorporated in the query to search for a row where a CSID-D01 is included in the list of generated CSID-D01 numbers instead of searching for a row matching just one generated CSID-D01. This completes the changes needed to be made. Each step before 2010 and each step after 2018 would remain the same.

Online Verification of a Personal ID No Via an ID Registry

Figure 21:
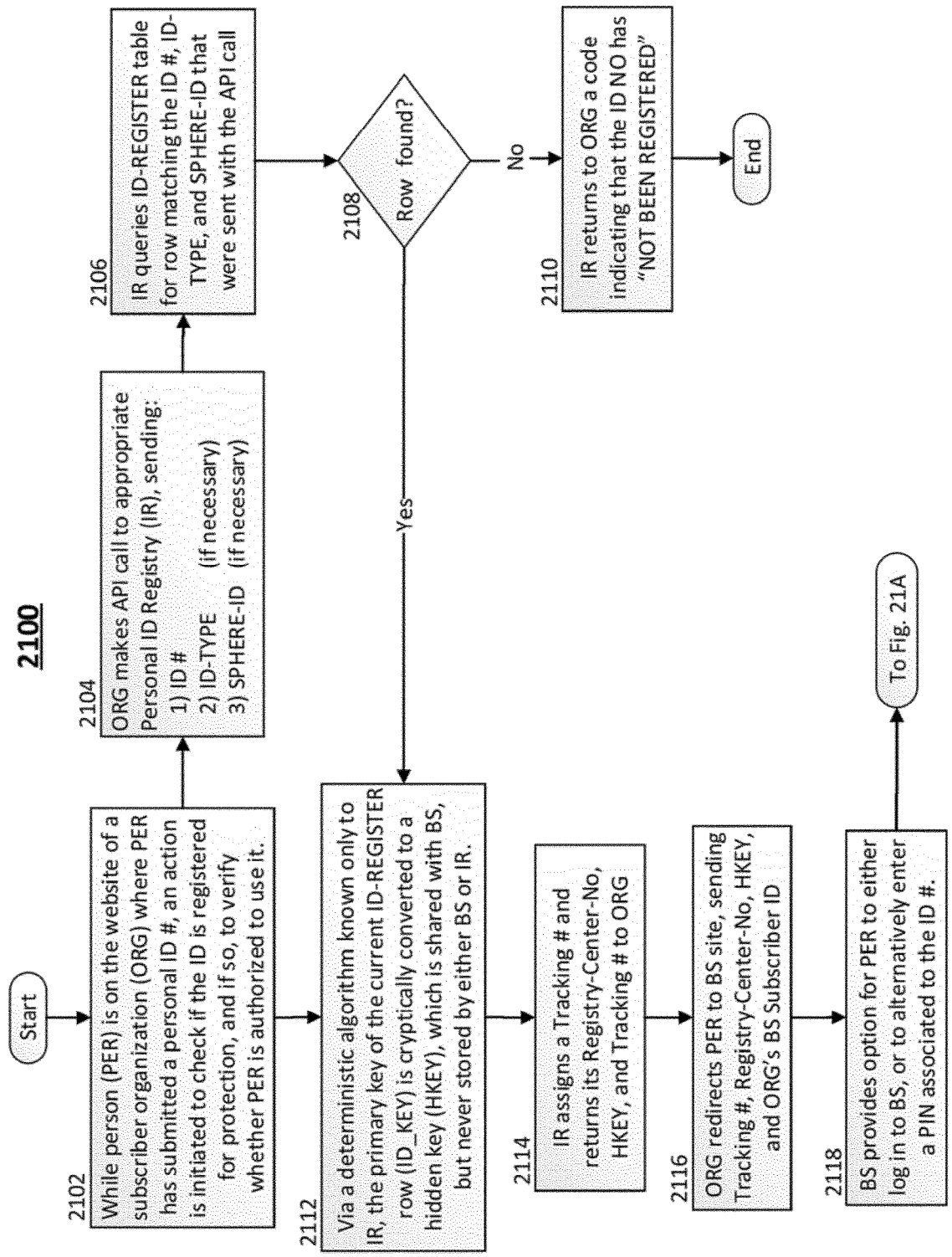
FIGS. 21 and 21A depict a flow diagram of a process for a subscriber organization to acquire a real-time online verification via a Personal ID Registry of the authorization of an individual to use a personal ID number in accordance with some embodiments of the present disclosures.
Figure 21A:
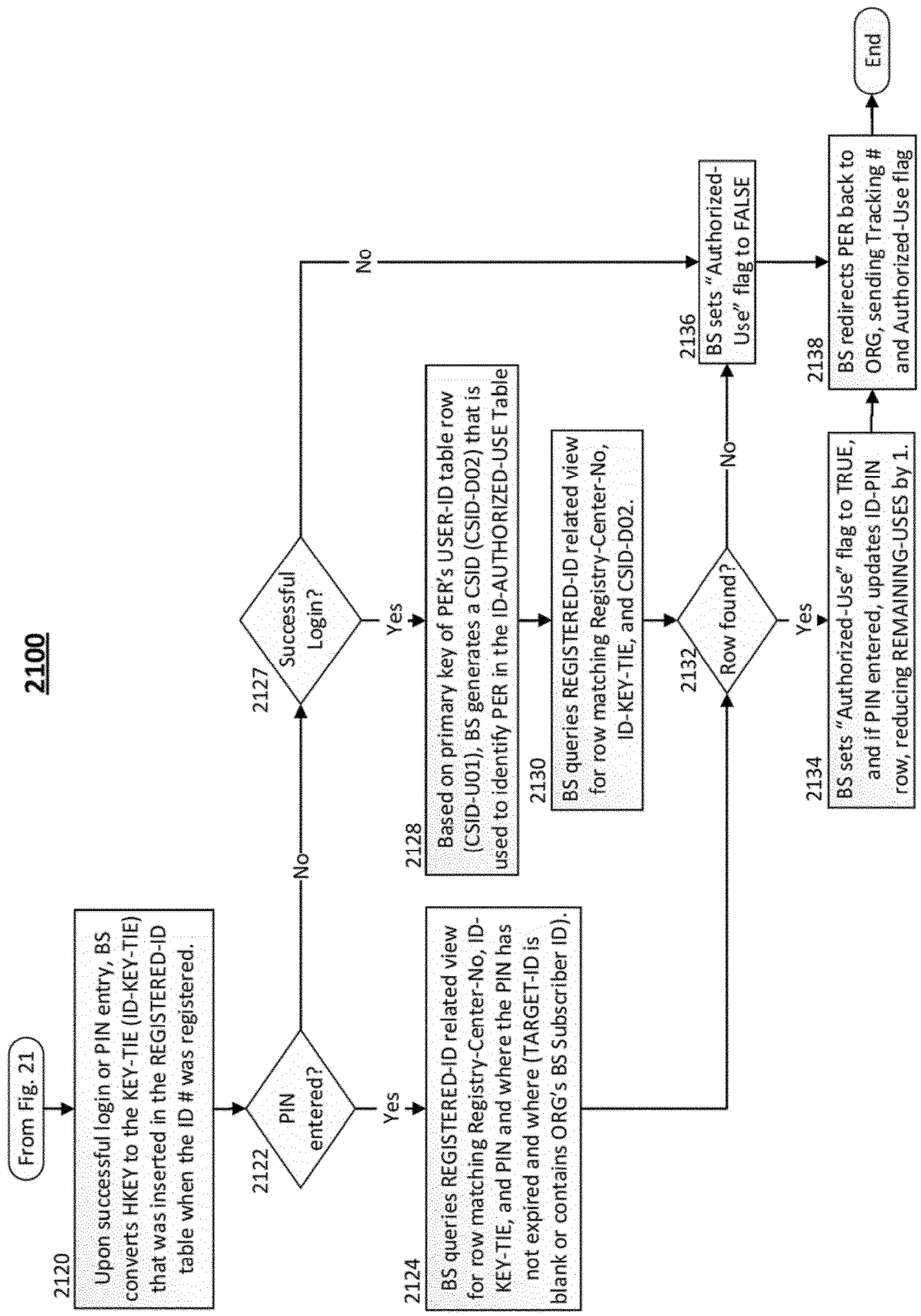

FIGS. 21 and 21A depict a flow diagram of process 2100 illustrating an example method for a subscriber organization 1216 to acquire a real-time online verification (via a Personal ID Registry 1250) of the authorization of an individual 1221 to use a personal ID number while the individual 1221 is on the website of the subscriber organization 1216 that is seeking verification.

The flow diagram of process 2100 references the database table structures presented in FIG. 13.

In FIG. 21, at 2102, while an individual 1221 is on the website of a subscriber organization 1216 and assuming this individual 1221 has submitted a personal ID number (e.g., a credit card #, insurance policy #, bank acct #, etc.), an action is initiated to check if the ID number is registered for protection, and, if so, to verify whether the individual 1221 is authorized to use it.

At 2104, the subscriber organization 1216 makes an API call to the appropriate Personal ID Registry 1250, sending ID #, ID-TYPE, and SPHERE-ID. Depending on the type of ID numbers stored in the Personal ID registry 1250, ID-TYPE and/or SPHERE-ID may not be necessary. This is discussed the section entitled "Registration of a (Non-NID) Personal ID Number with an ID Registry", which covers a description of process 1700. The appropriate Personal ID Registry 1250 is itself determined by ID-TYPE and/or SPHERE-ID.

At 2106, the Personal ID Registry 1250 queries the ID-REGISTER table of data store 1251 for a row matching the ID #, ID-TYPE, and SPHERE-ID that were sent with the API call.

If a matching row is not found (as determined at 2108), then at 2110, the Personal ID Registry 1250 returns a code to the subscriber organization 1216 which indicates that the ID # has NOT BEEN REGISTERED, and the verification process 2100 is ended.

If a matching row is found, then at 2112, via a deterministic algorithm known only to the Personal ID Registry 1250, the primary key of the current ID-REGISTER row (ID_KEY) is cryptly converted to a hidden key (HKEY), which is shared with the Base Service 1230, but never stored by either the Base Service 1230 or the Personal ID Registry 1250.

At 2114, the Personal ID Registry 1250 assigns a Tracking # and then returns its REGISTRY-CENTER-NO, the HKEY, and the Tracking # to the subscriber organization 1216. A REGISTRY-CENTER-NO is assigned to an Personal ID Registry 1250 when it is established in order to distinguish it from all other ID Registries.

At 2116, the subscriber organization 1216 redirects the individual 1221 to Base Service 1230 site, sending the Tracking #, the REGISTRY-CENTER-NO, the HKEY, and the subscriber organization 1216's Subscriber ID. Note that the actual ID number being verified is not sent, as it is not to ever be exposed to the Base Service 1230.

At 2118, the Base Service 1230 provides option for the individual 1221 to either log in to the Base Service 1230 site, or alternatively to enter a PIN associated to the ID number.

At 2120, upon a successful login or PIN entry, the Base Service 1230, via a deterministic algorithm known only to the Base Service 1230, converts the HKEY to the KEY-TIE (ID-KEY-TIE) that was inserted in the REGISTERED-ID table when the ID number was registered.

If the individual 1221 entered a PIN (as determined at 2122), then at 2124, the Base Service 1230 queries a DBMS 1210 REGISTERED-ID related view (that joins the REGISTERED-ID and ID-PIN tables on REGISTERED-ID-KEY) for a row matching the REGISTRY-CENTER-NO, ID-KEY-TIE, and PIN, and (i) where the PIN has not expired, and (ii) where the TARGET-ID is either blank or contains the subscriber organization 1216's Subscriber ID. If the row is found (indicating that the PIN is valid) (as determined at 2132), at 2134, the Base Service 1230 sets an "Authorized-Use" flag to TRUE and updates the ID-PIN table row, reducing REMAINING-USES by 1. Otherwise, at 2136, the "Authorized-Use" flag is set to FALSE.

If the individual 1221 executed a successful login (in lieu of entering a PIN) (as determined at 2127), then at 2128, based on primary key of the individual's USER-ID table row (CSID-U01), the Base Service 1230 generates a CSID (CSID-D02) that identifies the individual 1221 in the ID-AUTHORIZED-USE Table. Then, at 2130, the Base Service 1230 queries a DBMS 1210 REGISTERED-ID related view (that joins the REGISTERED-ID and ID-AUTHORIZED-USE tables on REGISTERED-ID-KEY) for a row matching REGISTRY-CENTER-NO, ID-KEY-TIE, and CSID-D02. If the row is found (indicating that the individual 1221 is authorized to use the ID #), at 2134, the Base Service 1230 sets an "Authorized-Use" flag to TRUE. Otherwise, at 2136, the "Authorized-Use" flag is set to FALSE.

At 2138, the Base Service 1230 redirects the individual 1221 back to the subscriber organization 1216 site, sending the Tracking # and the Authorized-Use flag, and thereby completing the verification process 2100.

As an option to this process 2100, before 2104, the subscriber organization 1216 could prompt for a PIN, and, if entered, pass this PIN with the other parameters to the Base Service 1230 at 2116 via an API call instead of a site redirect, allowing step 2118 to be skipped and speeding up the process.

Another option that can be added to this process 2100 is for the subscriber organization 1216 to request the Base Service 1230 to return a NID-VER-NO upon a successful verification that the individual 1221 is authorized to use the personal ID number. However, this NID-VER-NO can be reliably generated only if verification is provided via a successful login (as opposed to verification via a PIN). To accommodate execution of this option, the following changes could be made:

The Base Service 1230 would initialize NID-VER-NO to −1 (sometime after 2116 and before 2122). Then, if verification of authorization to use the personal ID is successful and was provided via a successful login, the Base Service 1230 would generate the NID-VER-NO (using subscriber organization 1216's Subscriber ID for the CONTEXT-ID), and pass this NID-VER-NO (along with Tracking # and the Authorized-Use flag) back to the subscriber organization 1216 at 2138.

Online Verification of a Personal ID Number Via a Partnering Organization

Figure 22:
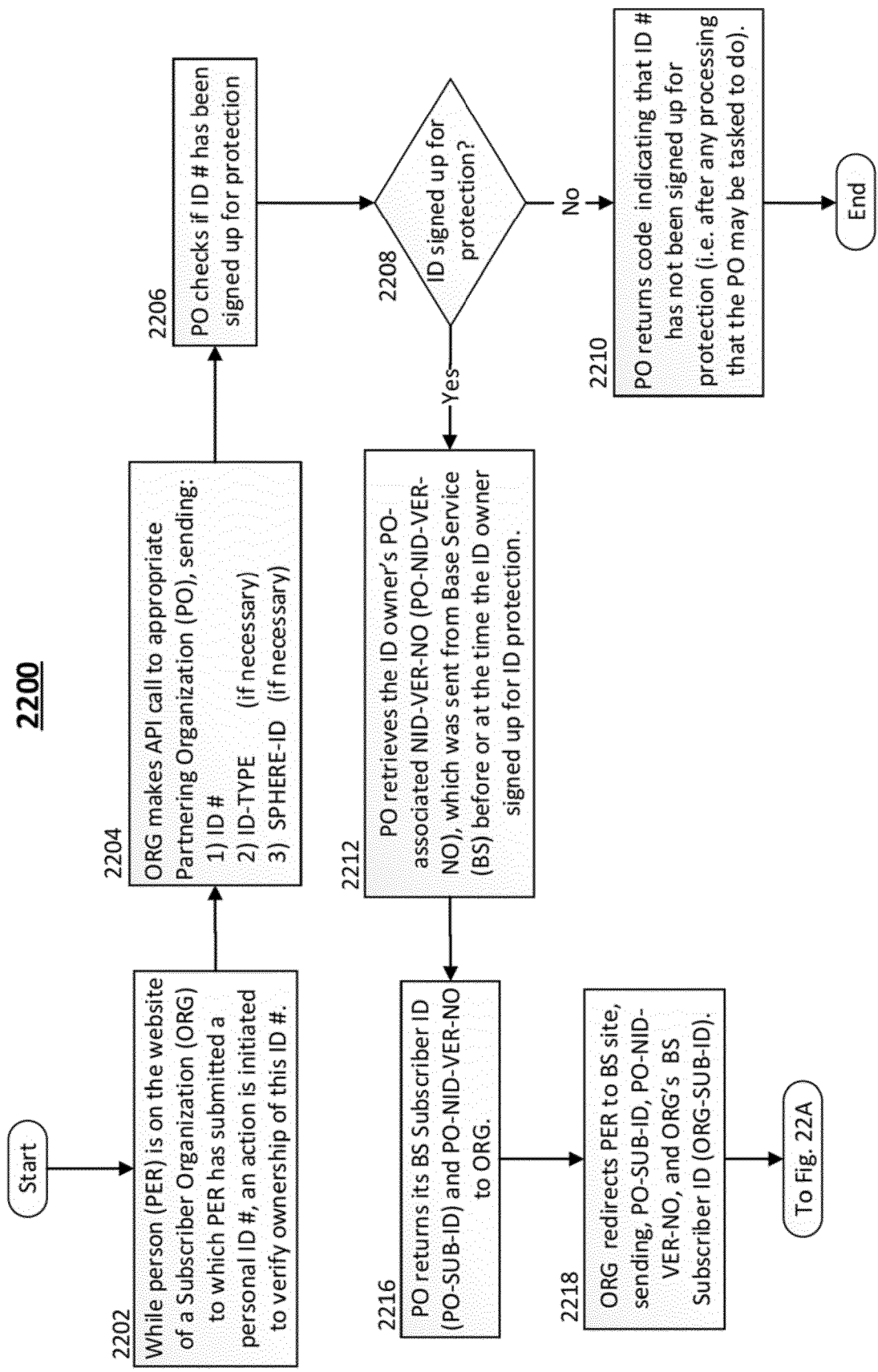
FIGS. 22 and 22A depict a flow diagram of a process for a subscriber organization to acquire a real-time online verification via a partnering organization of the authorization of an individual to use a personal ID number in accordance with some embodiments of the present disclosure.
Figure 22A:
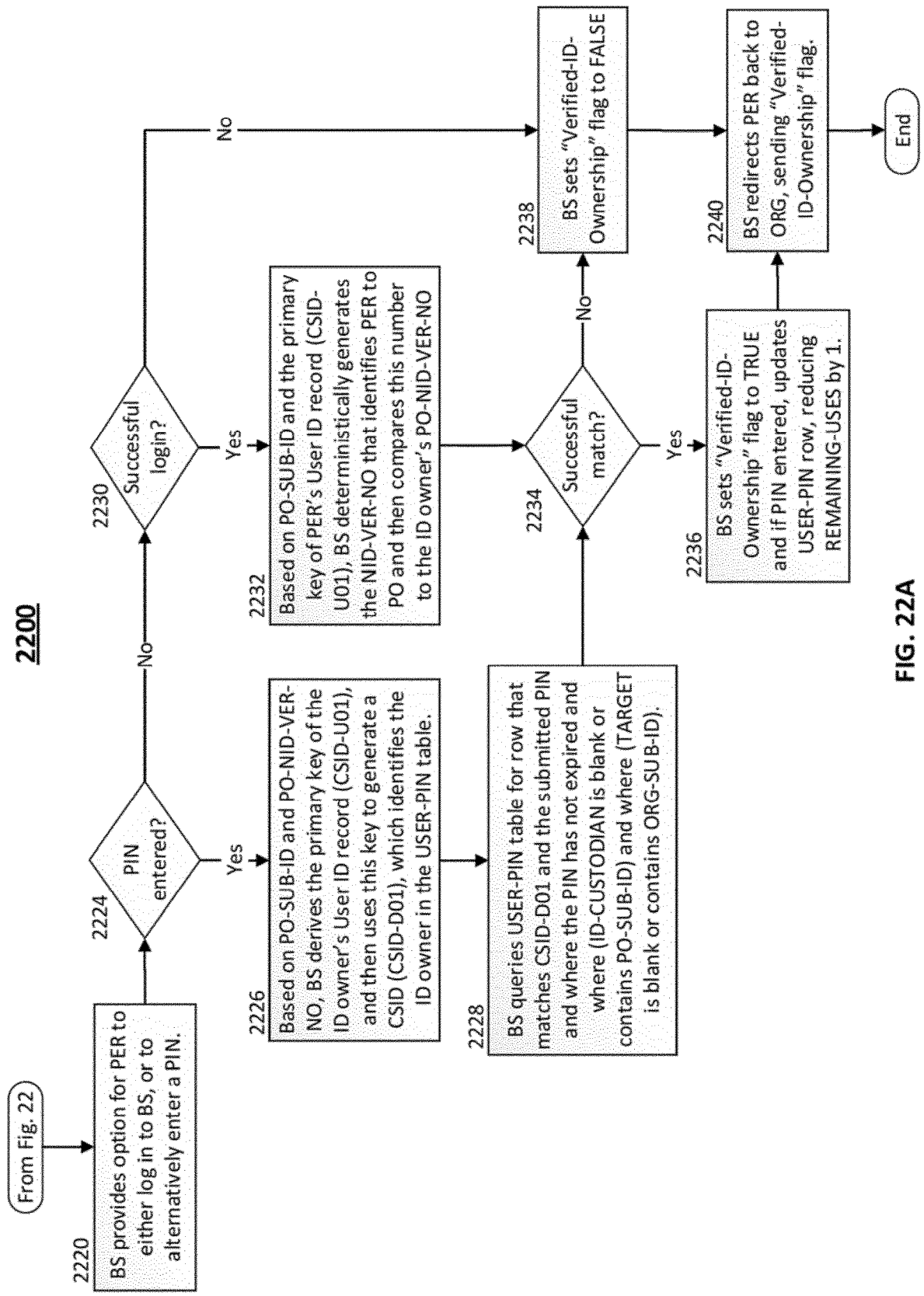

FIGS. 22 and 22A depict a flow diagram of process 2200 illustrating an example method for a subscriber organization 1216 to acquire a real-time online verification (via a partnering organization 1215) of the authorization of an individual 1221 to use a personal ID number while the individual is on the website of the subscriber organization 1216 that is seeking verification.

This flow diagram of process 2200 references the database table structures presented in FIG. 13.

The process 2200 proceeds as though the ID number that is being verified is of a type that has only one authorized user (e.g., driver's license #, Medicare card #, employee #). However, ID number types that can have multiple authorized users (e.g., a credit card #, bank account #, insurance policy #) can also be accommodated. How multiple authorized users can be accommodated is described at the end of this section regarding process 2200.

In FIG. 22, at 2202, while an individual 1221 is on the website of a subscriber organization 1216 to which the individual 1221 has submitted a personal ID number, an action is initiated to verify ownership of this ID number.

At 2204, the subscriber organization 1216 makes an API call to the appropriate partnering organization 1215 (that is a custodian of the ID #), sending the ID number and, if necessary, the ID-TYPE and/or SPHERE-ID. The appropriate partnering organization 1215 is determined by the ID-TYPE and/or SPHERE.

At 2206, the partnering organization 1215 checks its files to determine if the ID number has been signed up for (i.e., registered for) protection.

If the ID number has not been signed up for protection (as determined at 2208), at 2210, the partnering organization 1215 returns code indicating that the ID number is not protected (i.e. after any processing that the partnering organization 1215 is may be tasked to do). The verification process 2200 is then ended.

If the ID number has been signed up for protection, at 2212, the partnering organization 1215 retrieves the ID owner's partnering organization-associated NID-VER-NO (PO-NID-VER-NO), which was sent from the Base Service 1230 either before or at the time the ID owner signed up for ID protection (as having a NID-VER-NO is a requirement for ID protection via a partnering organization 1215).

At 2216, the partnering organization 1215 returns its Base Service Subscriber ID (PO-SUB-ID) and the ID owner's PO-NID-VER-NO to the subscriber organization 1216.

At 2218, the subscriber organization 1216 redirects the individual 1221 to the Base Service 1230 site, sending the PO-SUB-ID, the ID owner's PO-NID-VER-NO, and the subscriber organization's Base Service Subscriber ID (ORG-SUB-ID). Note that the actual ID number being verified is not sent, as it is not to ever be exposed to the Base Service 1230.

At 2220, the Base Service 1230 provides the option for the individual 1221 to either log in to the Base Service 1230, or to alternatively enter a PIN.

If the individual 1221 entered a PIN (as determined at 2224), then at 2226, based on the PO-SUB-ID and the PO-NID-VER-NO, the Base Service 1230 derives the primary key of the ID owner's User ID record (CSID-U01), and uses this key to generate a CSID (CSID-D01) which identifies the ID owner in the USER-PIN table. Then, at 2228, the Base Service 1230 queries USER-PIN table for a row that matches the generated CSID-D01 and the submitted PIN and (i) where the PIN has not expired, and (ii) where the ID-CUSTODIAN column is blank or contains PO-SUB-ID, and (iii) where the TARGET column is blank or contains ORG-SUB-ID. If a matching row is found (indicating that the PIN is valid) (as determined at 2234), then at 2236, the Base Service 1230 sets a "Verified-ID-Ownership" flag to TRUE and updates the USER-PIN row, reducing REMAINING-USES by 1. Otherwise, at 2238, the Verified-ID-Ownership flag is set to FALSE.

If the individual 1221 executed a successful login (in lieu of entering a PIN), then at 2232, based on the PO-SUB-ID and the primary key of the individual 1221's User ID record (CSID-U01), the Base Service 1230 deterministically generates a NID-VER-NO that identifies the individual 1221 to the partnering organization 1215 and then compares this number to the ID owner's PO-NID-VER-NO. If the two NID-VER-NOs match (as determined at 2234), then at 2236, the Base Service 1230 sets a "Verified-ID-Ownership" flag to TRUE. Otherwise, at 2238, the Verified-ID-Ownership flag is set to FALSE.

At 2240, the Base Service 1230 redirects the individual 1221 back to the subscriber organization 1216 site, sending the Verified-ID-Ownership flag, and thereby completing the verification process 2200.

As an option to this process 2200, before 2204, the subscriber organization 1216 could prompt for a PIN, and, if entered, pass this PIN with the other parameters to the Base Service 1230 at 2218 via an API call instead of a site redirect, allowing step 2220 to be skipped and speeding up the process.

Though this process 2200 uses a NID-VER-NO as the CSID that is verified, note that any externally-sent CSID can be verified through similar logic. Just as a NID-VER-NO and a Subscriber-ID (which serves as the CONTEXT-ID to generate a NID-VER-NO) are passed to the Base Service 1230, so too can a different type of CSID be sent with the CONTEXT-ID that was used to create it. So it is possible for an organization to seek verification of any CSID it has on file—either to verify another personal ID number or for some other purpose.

As stated above, this process 2200 assumes that the ID number that is being verified is of a type that has only one authorized user. To accommodate ID numbers that can have multiple authorized users (e.g., a credit card #, bank account #, insurance policy #, etc.) the following changes can be incorporated:

At 2212, the partnering organization 1215 would not assume just one authorized user and instead retrieve all NID-VER-NOs associated with the ID number (which could still often just be one). At both 2216 and 2218, instead of being restricted to sending one NID-VER-NO, the list of NID-VER-NOs will be sent. At 2226, a CSID-D01 would be generated for each NID-VER-NO in the list. At 2228, a SQL "WHERE IN LIST" clause (or something equivalent) would be incorporated in the query to search for a row where a CSID-D01 is included in the list of generated CSID-D01 numbers instead of searching for a row matching just one generated CSID-D01. At 2232, the Base Service 1230 would look for a match of the generated NID-VER-NO in the list of NID-VER-NOs that were sent at 2218. This completes the changes needed to be made. Step 2220 and each step before 2212 and each step after 2232 would remain the same.

The present invention can be embodied in the form of methods and apparatus for practicing those methods. The present invention can also be embodied in the form of program code embodied in tangible media, such as secure digital ("SD") cards, USB flash drives, diskettes, CD-ROMs, DVD-ROMs, Blu-ray disks, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It may be emphasized that the above-described embodiments, are merely possible examples of implementations, and merely set forth a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

While various embodiments have been described, it is to be understood that the embodiments described are illustrative only and that the scope of the subject matter is to be accorded a full range of equivalents, many variations and modifications naturally occurring to those of skill in the art from a perusal hereof.

What is claimed is:

1. A system for identity management supporting anonymity, comprising:
    one or more storage devices;
    one or more network interfaces; and
    one or more processors coupled to the one or more storage devices and communicably coupled to the one or more network interfaces, the one or more storage devices storing instructions that when executed by the one or more processors cause the one or more processors to:
        receive a unique personal identification number, the unique personal identification number being derived from and uniquely associated to a individually unique national identification (NID) number, the NID number having been previously exclusively claimed by or for an individual through an exclusive claim process after issuance of the NID number to the individual;
        manage an online user account, wherein the user account is associated with the respective individual while requiring no personal identity-related data for the individual other than the received unique personal identification number or another unique personal identification number derived from the received unique personal identification number; and
        generate context specific identifiers (CSIDs) for use in transactions, wherein each CSID is a personal identification number that uniquely identifies an individual within a specific context, wherein each CSID is deterministically reproducible and derived at least from a numerical representation of a defined context and the received unique personal identification number or the another unique personal identification numbers associated to the individual's user account, such that the same CSID is always generated for the same individual within the same defined context.

2. The system of claim 1, wherein the one or more processors is configured to:
    respond to an online request from a third party to authenticate an individual, wherein responding includes prompting the individual for user credentials, and, upon verification of valid user credentials, returning a CSID that identifies the individual within a context that is relevant to the request to authenticate an individual, wherein use of the CSID allows for the individual to remain anonymous within the context.

3. The apparatus of claim 2, wherein the one or more processors is configured to:
    generate a targeted personal identification number (PIN) in response to a request by the individual through the individual's user account;
    receive the targeted PIN and a CSID from a targeted entity, and
    return to the targeted entity verification of whether the CSID is associated to the individual.

4. The apparatus of claim 1, wherein the processor is configured to:
    generate a targeted data disclosure token in response to a request by an individual through the individual's user account;
    receive the generated data disclosure token from a targeted entity; and
    return to the targeted entity a CSID that identifies the individual to the targeted entity, wherein use of the CSID allows for the individual to remain anonymous to the targeted entity.

5. The apparatus of claim 4, wherein the one or more processors is configured to:
    generate a targeted personal identification number (PIN) in response to a request by the individual through the individual's user account;
    receive the targeted PIN and the returned CSID from the targeted entity, and
    return to the targeted entity verification of whether the received returned CSID is associated to the individual.

6. The apparatus of claim 1, wherein the one or more processors is configured to:
    in response to a request by an individual through the individual's user account, redirect the individual to an online site of a selected email service provider and send the email service provider a CSID that uniquely identifies the individual to the email service provider within a context that identifies the email service provider.

7. The apparatus of claim 1, wherein the one or more processors is configured to:

generate a proxy email address in response to a request by an individual through the individual's user account, wherein the proxy email address is composed of a tag, a CSID, and the domain of an email service provider selected by the user, wherein the CSID of the proxy email address uniquely identifies the individual in a context that is defined by the combination of the tag and the domain; and receive a generated proxy email address from the email service provider; and provide the email service provider in response to receiving the generated proxy email address, a CSID, different from the CSID of the proxy email address, that uniquely identifies the individual to the email service provider within a context identifies the email service provider.

8. A system for identity management, comprising:
one or more storage devices;
one or more network interfaces; and
one or more processors coupled to the one or more storage devices and communicably coupled to the one or more network interfaces, the one or more storage devices storing instructions that when executed by the one or more processors cause the one or more processors to:
maintain a user account database comprising a plurality of user accounts, wherein a respective user account is associated with a respective individually unique national identification (NID) number, the NID number having been previously exclusively claimed by or for an individual through an exclusive claim process after issuance of the NID number to the individual, each respective user account having a respective individual's personal data for conditional distribution subject to authorization by the respective individual;
generate context specific identifiers (CSIDs) for use in transactions, wherein each CSID is a personal identification number that uniquely identifies an individual within a specific context, wherein each CSID is deterministically reproducible and derived at least from a numerical representation of a defined context and a unique personal identification number associated to the individual's user account, such that the same CSID is always generated for the same individual within the same defined context; and
maintain an institutional subscriber account database comprising a plurality of subscriber accounts;
process an information request received from a subscriber account from the plurality of subscriber accounts, wherein processing the information request includes:
receiving parameters for an information request;
assigning the information request a request ID;
receiving the request ID through a user account;
presenting the user with the information request through the user account;
receiving responsive information from the user to the information request;
storing the responsive information for provision to the institutional subscriber associated with the subscriber account; and
providing a CSID with the responsive information to the institutional subscriber, wherein the CSID uniquely identifies the user to the institutional subscriber in a context associated with the information request, thereby allow the user to be anonymous within the context associated to the information request.

9. The system of claim 8, wherein the parameters for the information request include a context for which the information is to be gathered and an indication of information to be gathered from the user.

10. The system of claim 8, wherein the one or more processors is configured to receive multiple sets of responsive information from the user responsive to information requests having the same context and associate the same CSID with each of the multiple sets of responsive information received from the user.

* * * * *

UNITED STATES PATENT AND TRADEMARK OFFICE
CERTIFICATE OF CORRECTION

PATENT NO. : 11,750,617 B2  
APPLICATION NO. : 17/349994  
DATED : September 5, 2023  
INVENTOR(S) : Michael J. Boland Page 1 of 1

It is certified that error appears in the above-identified patent and that said Letters Patent is hereby corrected as shown below:

In the Claims

Claim 3, in Column 94, Line 29, change "The apparatus of claim 2" to -- The system of claim 2 --

Claim 4, in Column 94, Line 38, change "The apparatus of claim 1" to -- The system of claim 1 --

Claim 5, in Column 94, Line 49, change "The apparatus of claim 4" to -- The system of claim 4 --

Claim 6, in Column 94, Line 58, change "The apparatus of claim 1" to -- The system of claim 1 --

Claim 7, in Column 94, Line 66, change "The apparatus of claim 1" to -- The system of claim 1 --

Signed and Sealed this  
Tenth Day of October, 2023

Katherine Kelly Vidal  
*Director of the United States Patent and Trademark Office*